US012509505B2

(12) United States Patent
Buee et al.

(10) Patent No.: US 12,509,505 B2
(45) Date of Patent: Dec. 30, 2025

(54) ANTI TAU SVQIVYKPV EPITOPE SINGLE DOMAIN ANTIBODY

(71) Applicants: INSERM (INSTITUT NATIONAL DE LA SANTÉ ET DE LA RECHERCHE MÉDICALE), Paris (FR); UNIVERSITÉ DE LILLE, Lille (FR); CENTRE HOSPITALIER REGIONAL UNIVERSITAIRE DE LILLE, Lille (FR); CENTRE NATIONAL DE LA RECHERCHE SCIENTIFIQUE (CNRS), Paris (FR); HYBRIGENICS SERVICES SAS, Paris (FR)

(72) Inventors: Luc Buee, Lille (FR); Isabelle Landrieu, Villeneneuve d'Ascq (FR); Jean-Christophe Rain, Paris (FR); Elian Dupre, Villeneneuve d'Asq (FR); Alexis Arrial, Paris (FR); Clément Danis, Lille (FR)

(73) Assignees: INSERM (INSTITUTE NATIONAL DE LA SANTÉ ET DE LA RECHERCHE MÉDICALE), Paris (FR); UNIVERSITÉ DE LILLE, Lille (FR); CENTRE HOSPITALIER REGIONAL UNIVERSITAIRE DE LILLE, Lille (FR); CENTRE NATIONAL DE LA RECHERCHE SCIENTIFIQUE (CNRS), Paris (FR); HYBRIGENICS SERVICES SAS, Paris (FR)

( * ) Notice: Subject to any disclaimer, the term of this patent is extended or adjusted under 35 U.S.C. 154(b) by 1120 days.

(21) Appl. No.: 17/413,215

(22) PCT Filed: Dec. 12, 2019

(86) PCT No.: PCT/EP2019/084774
§ 371 (c)(1),
(2) Date: Jun. 11, 2021

(87) PCT Pub. No.: WO2020/120644
PCT Pub. Date: Jun. 18, 2020

(65) Prior Publication Data
US 2022/0017611 A1  Jan. 20, 2022

(30) Foreign Application Priority Data
Dec. 13, 2018 (EP) .................................... 18306684

(51) Int. Cl.
*C07K 16/18* (2006.01)
*A61P 25/28* (2006.01)
*G01N 33/68* (2006.01)

(52) U.S. Cl.
CPC .............. *C07K 16/18* (2013.01); *A61P 25/28* (2018.01); *G01N 33/6896* (2013.01); *C07K 2317/24* (2013.01); *C07K 2317/34* (2013.01); *C07K 2317/565* (2013.01); *C07K 2317/567* (2013.01); *C07K 2317/569* (2013.01); *C07K 2317/76* (2013.01); *G01N 2333/4709* (2013.01); *G01N 2800/2828* (2013.01); *G01N 2800/2835* (2013.01)

(58) Field of Classification Search
CPC ............ C07K 2317/24; C07K 2317/34; C07K 2317/565; C07K 2317/567; C07K 2317/569; C07K 2317/76; C07K 2317/92
USPC ...................................... 424/133.1
See application file for complete search history.

(56) References Cited

FOREIGN PATENT DOCUMENTS

| WO | 2013/007839 A1 | 1/2013 | |
|---|---|---|---|
| WO | WO-2013041962 A1 * | 3/2013 | ......... A61K 38/1709 |
| WO | 2016/112078 A2 | 7/2016 | |
| WO | 2016/137811 A1 | 9/2016 | |
| WO | 2017/005732 A1 | 1/2017 | |
| WO | 2017/005734 A1 | 1/2017 | |

OTHER PUBLICATIONS

Almagro & Fransson, Frontiers in Bioscience 2008; 13:1619-33.*
De Genst et al., Dev Comp Immunol 2006; 30:187-98.*
Yoshinaga et al., J. Biochem 2008; 143: 593-601.*
Rudikoff et al (Proc. Natl. Acad. Sci. USA, 79(6):1979-1983, Mar. 1982).*
Harmsen and Haard (Appl Microbiol Biotechnol 2007, 77:13-22).*
Anonymous: "Product Datasheet Tau [p Ser305] Antibody (EP2456Y) NBP1-40476", Novusbio, May 2, 2017.

(Continued)

*Primary Examiner* — Yan Xiao
(74) *Attorney, Agent, or Firm* — WCF IP

(57) ABSTRACT

The invention relates to generation, optimization and characterisation of VHH targeted against Tau MTBD (microtubule-binding domain) with high affinity, obtained by screening from a naïve synthetic library. The inventors optimized version of a lead VHH which is able to inhibit Tau aggregation in vitro and in HEK 293 aggregation-reporting cellular model, providing a new tool in Tau immunotherapies. Accordingly the invention relates to new VHH antibody that specifically binds with high affinity Tau species, especially the epitope region involved in Tau aggregation. Moreover, the inventors found that immunization with the optimized version of this lead VHH prevented the formation of neurofibrillary tangles induced by injection of extracellular h-AD in mouse model. Thus, these specific antibodies can be used for the therapy of tauopathy disorders such as Progressive supranuclear palsy (PSP).

Figure 1A:
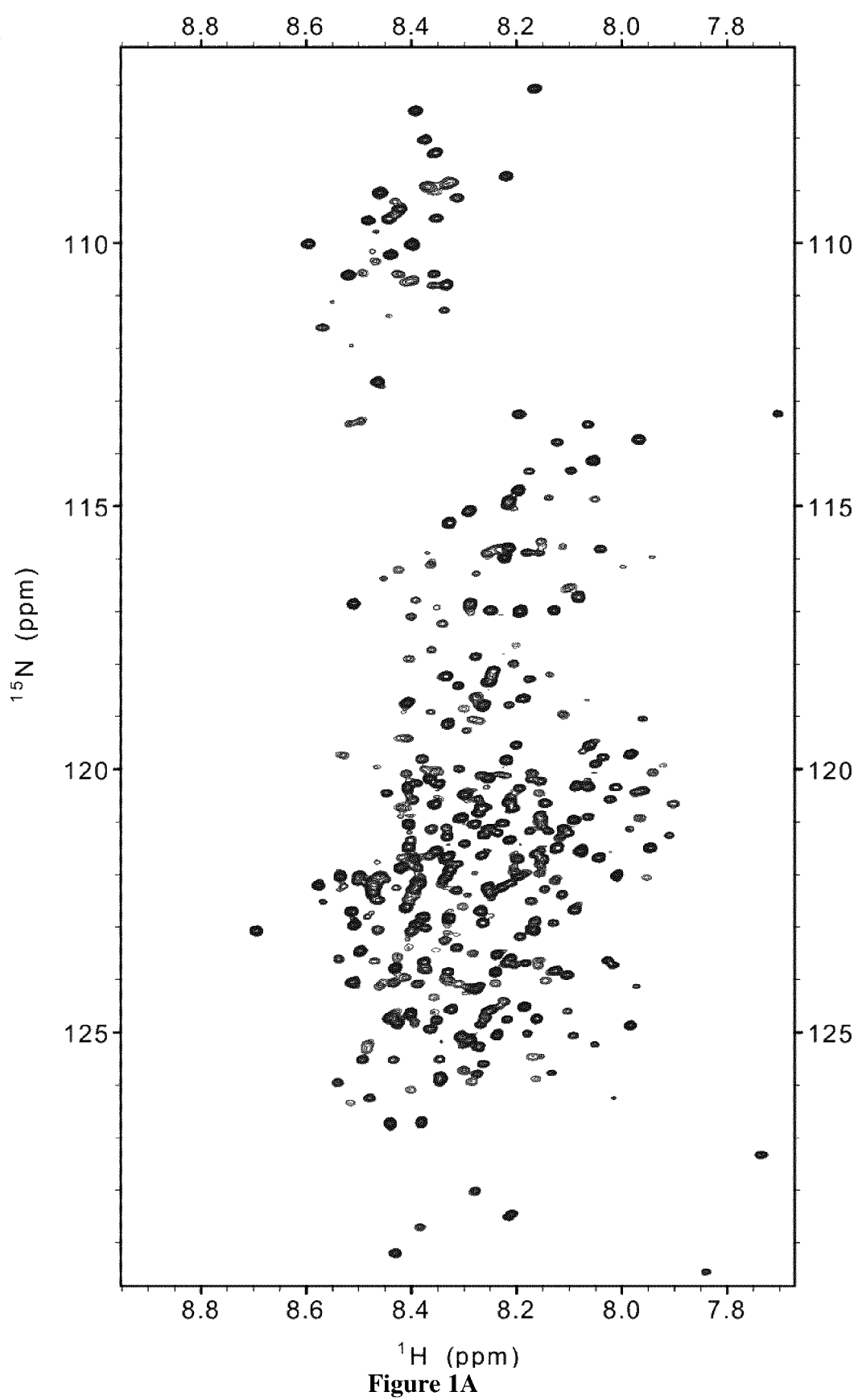

7 Claims, 15 Drawing Sheets
Specification includes a Sequence Listing.

(56) References Cited

OTHER PUBLICATIONS

Apetri et al: "A common antigenci motif recognized by naturally occurring human V5-51/V4-1 anti-tau antibodies with distinct functionalities", Acta Neuropathologica Communications, vol. 6, No. 1, pp. 1-17, May 31, 2018.
Courade et al: "Epitope determines efficacy of therapeutic anti-Tau antibodies in a functional assay with human Alzheimer Tau", Acta Neuropathologica, vol. 136, No. 5, pp. 729-745, Sep. 20, 2018.
Kobayashi et al: "Binding Sites on Tau Proteins as Components for Antimicrobial Peptides", Biocontrol Science, vol. 13, No. 2, pp. 49-56, Jan. 1, 2008.
Kontsekova et al: Identification of structural determinants on tau protein essential for its pathological function "novel therapeutic target for tau immunotherapy in Alzheimer?s disease", Alzheimers Res Ther, vol. 6, No. 4, Aug. 1, 2014.
Simonyan: "Conformational Epitope Mapping by Cross-link Mass Spectrometry: Analysis of Ipilimumab, Nivolumab and Pembrolizumab", Jun. 3, 2017.
Strang et al: "Phosphorylation of serine 305 in tau inhibits aggregation", Neuroscience Letters, vol. 692, pp. 187-192, Nov. 10, 2018.

\* cited by examiner

A

B

A

| Bait | Smad | Tau | Tau | Tau |
|------|------|-----|-----|-----|
| Prey | Smurf | E4-1 | Z70 | Ø |

Growth

| Bait | Smad | Tau | Tau | Tau |
|------|------|-----|-----|-----|
| Prey | Smurf | E4-1 | Z70 | Ø |

Interaction

B

```
                                    CDR1                    CDR2
          10        20        30        40        50        60
E4-1  MAEVQLQASGGGFVQPGGSLRLSCAASG ATSTFDG MGWFRQAPGKEREFVSAIS YEQGSYT YYA
Z70   MAEVQLQASGGVFVQSGGSLRLSCAASG ATSTFDG MGWFRQAPGKEREFVSAIS YEQGSYT YYA
               *    *
          70        80        90       100       110       120
E4-1  DSVKGRFTISRDNSKNTVYLQMNSLRAEDTATYYCA PAYEGDLYAFDS YWGQGTQVTVSSAA
Z70   DSVKGRFTISRDNSKNMVYLQMNSLRAEDTATYYCA PAYEGDLYAFDS YGGQGTQVTVSSAA
                     *                       CDR3         *
``` d e

C MTBD seeds

D MTBD seeds

F F8-2

G F8-2 + MTBD seeds

H F8-2 + MTBD seeds

I Z70 + MTBD seeds

SEQUENCE LISTING

```
<160> NUMBER OF SEQ ID NOS: 32

<210> SEQ ID NO 1
<211> LENGTH: 9
<212> TYPE: PRT
<213> ORGANISM: Artificial
<220> FEATURE:
<223> OTHER INFORMATION: Synthetic minimal epitope sequence of Tau

<400> SEQUENCE: 1

Ser Val Gln Ile Val Tyr Lys Pro Val
1               5

<210> SEQ ID NO 2
<211> LENGTH: 124
<212> TYPE: PRT
<213> ORGANISM: Artificial
<220> FEATURE:
<223> OTHER INFORMATION: Synthetic VH of Z70

<400> SEQUENCE: 2

Met Ala Glu Val Gln Leu Gln Ala Ser Gly Gly Val Phe Val Gln Ser
1               5                   10                  15

Gly Gly Ser Leu Arg Leu Ser Cys Ala Ala Ser Gly Ala Thr Ser Thr
            20                  25                  30

Phe Asp Gly Met Gly Trp Phe Arg Gln Ala Pro Gly Lys Glu Arg Glu
        35                  40                  45

Phe Val Ser Ala Ile Ser Tyr Glu Gln Gly Ser Tyr Thr Tyr Tyr Ala
    50                  55                  60

Asp Ser Val Lys Gly Arg Phe Thr Ile Ser Arg Asp Asn Ser Lys Asn
65                  70                  75                  80

Met Val Tyr Leu Gln Met Asn Ser Leu Arg Ala Glu Asp Thr Ala Thr
                85                  90                  95

Tyr Tyr Cys Ala Pro Ala Tyr Glu Gly Asp Leu Tyr Ala Phe Asp Ser
```

-continued

```
                100             105             110
Tyr Gly Gly Gln Gly Thr Gln Val Thr Val Ser Ser
        115                 120

<210> SEQ ID NO 3
<211> LENGTH: 7
<212> TYPE: PRT
<213> ORGANISM: Artificial
<220> FEATURE:
<223> OTHER INFORMATION: Synthetic VH-CDR1 of Z70

<400> SEQUENCE: 3

Ala Thr Ser Thr Phe Asp Gly
1               5

<210> SEQ ID NO 4
<211> LENGTH: 7
<212> TYPE: PRT
<213> ORGANISM: Artificial
<220> FEATURE:
<223> OTHER INFORMATION: Synthetic VH-CDR2 of Z70

<400> SEQUENCE: 4

Tyr Glu Gln Gly Ser Tyr Thr
1               5

<210> SEQ ID NO 5
<211> LENGTH: 12
<212> TYPE: PRT
<213> ORGANISM: Artificial
<220> FEATURE:
<223> OTHER INFORMATION: Synthetic VH-CDR3 of Z70

<400> SEQUENCE: 5

Pro Ala Tyr Glu Gly Asp Leu Tyr Ala Phe Asp Ser
1               5                   10

<210> SEQ ID NO 6
<211> LENGTH: 28
<212> TYPE: PRT
<213> ORGANISM: Artificial
<220> FEATURE:
<223> OTHER INFORMATION: Synthetic VH FR1 of Z70

<400> SEQUENCE: 6

Met Ala Glu Val Gln Leu Gln Ala Ser Gly Gly Val Phe Val Gln Ser
1               5                   10                  15

Gly Gly Ser Leu Arg Leu Ser Cys Ala Ala Ser Gly
            20                  25

<210> SEQ ID NO 7
<211> LENGTH: 19
<212> TYPE: PRT
<213> ORGANISM: Artificial
<220> FEATURE:
<223> OTHER INFORMATION: Synthetic VH-FR2 of Z70

<400> SEQUENCE: 7

Met Gly Trp Phe Arg Gln Ala Pro Gly Lys Glu Arg Glu Phe Val Ser
1               5                   10                  15

Ala Ile Ser

<210> SEQ ID NO 8
<211> LENGTH: 39
<212> TYPE: PRT
```

<213> ORGANISM: Artificial
<220> FEATURE:
<223> OTHER INFORMATION: Synthetic VH-FR3 of Z70

<400> SEQUENCE: 8

Tyr Tyr Ala Asp Ser Val Lys Gly Arg Phe Thr Ile Ser Arg Asp Asn
1               5                   10                  15

Ser Lys Asn Met Val Tyr Leu Gln Met Asn Ser Leu Arg Ala Glu Asp
            20                  25                  30

Thr Ala Thr Tyr Tyr Cys Ala
        35

<210> SEQ ID NO 9
<211> LENGTH: 12
<212> TYPE: PRT
<213> ORGANISM: Artificial
<220> FEATURE:
<223> OTHER INFORMATION: Synthetic VH-FR4 of Z70

<400> SEQUENCE: 9

Tyr Gly Gly Gln Gly Thr Gln Val Thr Val Ser Ser
1               5                   10

<210> SEQ ID NO 10
<211> LENGTH: 124
<212> TYPE: PRT
<213> ORGANISM: Artificial
<220> FEATURE:
<223> OTHER INFORMATION: Synthetic VH Mut1

<400> SEQUENCE: 10

Met Ala Glu Val Gln Leu Gln Ala Ser Gly Gly Val Phe Val Gln Ser
1               5                   10                  15

Gly Gly Ser Leu Arg Leu Ser Cys Ala Ala Ser Gly Ala Thr Ser Thr
            20                  25                  30

Phe Asp Gly Met Gly Trp Phe Arg Gln Ala Pro Gly Lys Glu Arg Glu
        35                  40                  45

Phe Val Ser Ala Ile Ser Tyr Glu Gln Gly Ser Tyr Thr Tyr Tyr Ala
    50                  55                  60

Asp Ser Val Lys Gly Arg Phe Thr Ile Ser Arg Asp Asn Ser Lys Asn
65                  70                  75                  80

Met Val Tyr Leu Gln Met Asn Ser Leu Arg Ala Glu Asp Thr Ala Thr
                85                  90                  95

Tyr Tyr Cys Ala Pro Ala Tyr Glu Gly Asp Leu Tyr Ala Phe Asp Ser
            100                 105                 110

Tyr Gly Glu Gln Gly Thr Gln Val Thr Val Ser Ser
        115                 120

<210> SEQ ID NO 11
<211> LENGTH: 124
<212> TYPE: PRT
<213> ORGANISM: Artificial
<220> FEATURE:
<223> OTHER INFORMATION: Synthetic VH Mut3

<400> SEQUENCE: 11

Met Ala Glu Val Gln Leu Gln Ala Ser Gly Gly Val Phe Val Gln Ser
1               5                   10                  15

Gly Gly Ser Leu Arg Leu Ser Cys Ala Ala Ser Gly Ala Thr Ser Thr
            20                  25                  30

Phe Asp Gly Met Gly Trp Phe Arg Gln Ala Pro Gly Lys Glu Lys Glu

```
                    35                  40                  45
Phe Val Ser Ala Ile Ser Tyr Glu Gln Gly Ser Tyr Thr Tyr Ala
             50                  55                  60
Asp Ser Val Lys Gly Arg Phe Thr Ile Ser Arg Asp Asn Ser Lys Asn
 65                  70                  75                  80
Met Val Tyr Leu Gln Met Asn Ser Leu Arg Ala Glu Asp Thr Ala Thr
                 85                  90                  95
Tyr Tyr Cys Ala Pro Ala Tyr Glu Gly Asp Leu Tyr Ala Phe Asp Ser
                100                 105                 110
Tyr Gly Gly Gln Gly Thr Gln Val Thr Val Ser Ser
            115                 120

<210> SEQ ID NO 12
<211> LENGTH: 124
<212> TYPE: PRT
<213> ORGANISM: Artificial
<220> FEATURE:
<223> OTHER INFORMATION: Synthetic VH-Mut5

<400> SEQUENCE: 12

Met Ala Glu Val Gln Leu Gln Ala Ser Gly Gly Val Phe Val Gln Ser
 1               5                  10                  15
Gly Gly Ser Leu Arg Leu Ser Cys Ala Ala Ser Gly Ala Thr Ser Thr
             20                  25                  30
Phe Asp Gly Met Gly Trp Phe Arg Gln Ala Pro Gly Lys Glu Arg Glu
                 35                  40                  45
Phe Val Ser Ala Ile Ser Tyr Glu Gln Gly Ser Tyr Thr Tyr Ala
             50                  55                  60
Asp Ser Val Lys Gly Arg Phe Thr Ile Ser Arg Asp Asn Ser Lys Asn
 65                  70                  75                  80
Met Val Tyr Leu Gln Met Asn Ser Leu Arg Ala Glu Asp Thr Ala Ser
                 85                  90                  95
Tyr Tyr Cys Ala Pro Ala Tyr Glu Gly Asp Leu Tyr Ala Phe Asp Ser
                100                 105                 110
Tyr Gly Gly Gln Gly Thr Gln Val Thr Val Ser Ser
            115                 120

<210> SEQ ID NO 13
<211> LENGTH: 124
<212> TYPE: PRT
<213> ORGANISM: Artificial
<220> FEATURE:
<223> OTHER INFORMATION: Synthetic VH Mut9

<400> SEQUENCE: 13

Met Ala Glu Val Gln Leu Gln Ala Ser Gly Gly Val Phe Val Gln Ser
 1               5                  10                  15
Gly Gly Ser Leu Arg Leu Ser Cys Ala Ala Ser Gly Ala Thr Ser Thr
             20                  25                  30
Phe Asp Gly Met Gly Trp Phe Arg Gln Ala Pro Gly Lys Glu Arg Glu
                 35                  40                  45
Phe Val Ser Ala Ile Ser Tyr Glu Gln Gly Ser Tyr Thr Tyr Ala
             50                  55                  60
Asp Ser Val Lys Gly Arg Phe Thr Ile Ser Arg Asp Asn Ser Lys Asn
 65                  70                  75                  80
Met Val Tyr Leu Gln Met Asn Ser Leu Arg Ala Glu Asp Thr Ala Thr
                 85                  90                  95
```

Tyr Tyr Cys Ala Ser Ala Tyr Glu Gly Asp Leu Tyr Ala Phe Asp Ser
            100                 105                 110

Tyr Gly Glu Gln Gly Thr Gln Val Thr Val Ser Ser
        115                 120

<210> SEQ ID NO 14
<211> LENGTH: 124
<212> TYPE: PRT
<213> ORGANISM: Artificial
<220> FEATURE:
<223> OTHER INFORMATION: Synthetic VH Mut12

<400> SEQUENCE: 14

Met Ala Glu Val Gln Leu Gln Ala Ser Gly Gly Val Phe Val Gln Ser
1               5                   10                  15

Gly Gly Ser Leu Arg Leu Cys Cys Ala Ala Ser Gly Ala Thr Ser Thr
            20                  25                  30

Phe Asp Gly Met Gly Trp Phe Arg Gln Ala Pro Gly Lys Glu Arg Glu
        35                  40                  45

Phe Val Ser Ala Ile Ser Tyr Glu Gln Gly Ser Tyr Thr Tyr Tyr Ala
    50                  55                  60

Asp Ser Val Lys Gly Arg Phe Thr Ile Ser Arg Asp Asn Ser Lys Asn
65                  70                  75                  80

Met Val Tyr Leu Gln Met Asn Ser Leu Arg Ala Glu Asp Thr Ala Thr
                85                  90                  95

Tyr Tyr Cys Ala Pro Ala Tyr Glu Gly Asp Leu Tyr Ala Phe Asp Ser
            100                 105                 110

Tyr Gly Glu Gln Gly Thr Gln Val Thr Val Ser Ser
        115                 120

<210> SEQ ID NO 15
<211> LENGTH: 124
<212> TYPE: PRT
<213> ORGANISM: Artificial
<220> FEATURE:
<223> OTHER INFORMATION: Synthetic VH Mut14

<400> SEQUENCE: 15

Met Ala Glu Val Gln Leu Gln Ala Ser Gly Gly Val Phe Val Gln Ser
1               5                   10                  15

Gly Gly Ser Leu Arg Leu Ser Cys Ala Ala Ser Gly Ala Thr Ser Ile
            20                  25                  30

Phe Asp Gly Met Gly Trp Phe Arg Gln Ala Pro Gly Lys Glu Arg Glu
        35                  40                  45

Phe Val Ser Ala Ile Ser Tyr Gly Gln Gly Ser Tyr Thr Tyr Tyr Ala
    50                  55                  60

Asp Ser Val Lys Gly Arg Phe Thr Ile Ser Arg Asp Asn Ser Lys Asn
65                  70                  75                  80

Met Val Tyr Leu Gln Met Asn Ser Leu Arg Ala Glu Asp Thr Ala Thr
                85                  90                  95

Tyr Tyr Cys Ala Pro Ala Tyr Glu Gly Asp Leu Tyr Ala Phe Asp Ser
            100                 105                 110

Tyr Gly Glu Gln Gly Thr Gln Val Thr Val Ser Ser
        115                 120

<210> SEQ ID NO 16
<211> LENGTH: 124
<212> TYPE: PRT
<213> ORGANISM: Artificial

```
<220> FEATURE:
<223> OTHER INFORMATION: Synthetic VH Mut15

<400> SEQUENCE: 16

Met Ala Glu Val Gln Leu Gln Ala Ser Gly Gly Val Phe Val Gln Ser
1               5                   10                  15

Gly Gly Ser Leu Arg Leu Ser Cys Ala Ala Ser Gly Ala Thr Ser Thr
            20                  25                  30

Phe Asp Gly Met Gly Trp Phe Arg Gln Ala Pro Gly Lys Glu Arg Glu
        35                  40                  45

Phe Val Ser Ala Ile Ser Tyr Glu Gln Gly Ser Tyr Thr Tyr Tyr Ala
    50                  55                  60

Asp Ser Val Lys Gly Arg Phe Thr Ile Ser Arg Asp Asn Ser Lys Asn
65                  70                  75                  80

Met Val Tyr Leu Gln Met Asn Ser Leu Gly Ala Glu Asp Thr Ala Thr
                85                  90                  95

Tyr Tyr Cys Ala Ser Ala Tyr Glu Gly Asp Leu Tyr Ala Phe Asp Ser
            100                 105                 110

Tyr Glu Gly Gln Gly Thr Gln Val Thr Val Ser Ser
        115                 120

<210> SEQ ID NO 17
<211> LENGTH: 124
<212> TYPE: PRT
<213> ORGANISM: Artificial
<220> FEATURE:
<223> OTHER INFORMATION: Synthetic VH Mut20

<400> SEQUENCE: 17

Met Ala Glu Val Gln Leu Gln Ala Ser Gly Gly Val Phe Val Gln Ser
1               5                   10                  15

Gly Gly Ser Leu Arg Leu Ser Cys Ala Ala Ser Gly Ala Thr Ser Thr
            20                  25                  30

Phe Asp Gly Met Gly Trp Phe Arg Gln Ala Pro Gly Lys Glu Lys Glu
        35                  40                  45

Phe Val Ser Ala Ile Ser Tyr Glu Gln Gly Ser Tyr Thr Tyr Tyr Ala
    50                  55                  60

Asp Ser Val Lys Gly Arg Phe Thr Ile Ser Arg Asp Asn Ser Lys Asn
65                  70                  75                  80

Met Val Tyr Leu Gln Met Asn Ser Leu Arg Ala Glu Asp Thr Ala Thr
                85                  90                  95

Tyr Tyr Cys Ala Pro Ala Tyr Glu Gly Asp Leu Tyr Ala Phe Asp Ser
            100                 105                 110

Tyr Gly Glu Gln Gly Thr Gln Val Thr Val Ser Ser
        115                 120

<210> SEQ ID NO 18
<211> LENGTH: 46
<212> TYPE: PRT
<213> ORGANISM: Artificial
<220> FEATURE:
<223> OTHER INFORMATION: Synthetic Tau[273-318]

<400> SEQUENCE: 18

Gly Lys Val Gln Ile Ile Asn Lys Lys Leu Asp Leu Ser Asn Val Gln
1               5                   10                  15

Ser Lys Cys Gly Ser Lys Asp Asn Ile Lys His Val Pro Gly Gly Gly
            20                  25                  30
```

```
Ser Val Gln Ile Val Tyr Lys Pro Val Asp Leu Ser Lys Val
            35                  40                  45
```

<210> SEQ ID NO 19
<211> LENGTH: 6
<212> TYPE: PRT
<213> ORGANISM: Artificial
<220> FEATURE:
<223> OTHER INFORMATION: Synthetic PHF6 peptide

<400> SEQUENCE: 19

```
Val Gln Ile Val Tyr Lys
1               5
```

<210> SEQ ID NO 20
<211> LENGTH: 124
<212> TYPE: PRT
<213> ORGANISM: Artificial
<220> FEATURE:
<223> OTHER INFORMATION: VH of AbX
<220> FEATURE:
<221> NAME/KEY: MISC_FEATURE
<222> LOCATION: (23)..(23)
<223> OTHER INFORMATION: S or C
<220> FEATURE:
<221> NAME/KEY: MISC_FEATURE
<222> LOCATION: (32)..(32)
<223> OTHER INFORMATION: T or C
<220> FEATURE:
<221> NAME/KEY: MISC_FEATURE
<222> LOCATION: (47)..(47)
<223> OTHER INFORMATION: R or K
<220> FEATURE:
<221> NAME/KEY: MISC_FEATURE
<222> LOCATION: (56)..(56)
<223> OTHER INFORMATION: E or G
<220> FEATURE:
<221> NAME/KEY: MISC_FEATURE
<222> LOCATION: (90)..(90)
<223> OTHER INFORMATION: R or G
<220> FEATURE:
<221> NAME/KEY: MISC_FEATURE
<222> LOCATION: (96)..(96)
<223> OTHER INFORMATION: T or S
<220> FEATURE:
<221> NAME/KEY: MISC_FEATURE
<222> LOCATION: (101)..(101)
<223> OTHER INFORMATION: P or S
<220> FEATURE:
<221> NAME/KEY: MISC_FEATURE
<222> LOCATION: (114)..(114)
<223> OTHER INFORMATION: G or E
<220> FEATURE:
<221> NAME/KEY: MISC_FEATURE
<222> LOCATION: (115)..(115)
<223> OTHER INFORMATION: G or E

<400> SEQUENCE: 20

```
Met Ala Glu Val Gln Leu Gln Ala Ser Gly Gly Val Phe Val Gln Ser
1               5                   10                  15

Gly Gly Ser Leu Arg Leu Xaa Cys Ala Ala Ser Gly Ala Thr Ser Xaa
            20                  25                  30

Phe Asp Gly Met Gly Trp Phe Arg Gln Ala Pro Gly Lys Glu Xaa Glu
            35                  40                  45

Phe Val Ser Ala Ile Ser Tyr Xaa Gln Gly Ser Tyr Thr Tyr Tyr Ala
            50                  55                  60

Asp Ser Val Lys Gly Arg Phe Thr Ile Ser Arg Asp Asn Ser Lys Asn
65                  70                  75                  80

Met Val Tyr Leu Gln Met Asn Ser Leu Xaa Ala Glu Asp Thr Ala Xaa
                85                  90                  95
```

```
Tyr Tyr Cys Ala Xaa Ala Tyr Glu Gly Asp Leu Tyr Ala Phe Asp Ser
            100                 105                 110

Tyr Xaa Xaa Gln Gly Thr Gln Val Thr Val Ser Ser
        115                 120
```

<210> SEQ ID NO 21
<211> LENGTH: 28
<212> TYPE: PRT
<213> ORGANISM: Artificial
<220> FEATURE:
<223> OTHER INFORMATION: Synthetic VH FR1 of Abx
<220> FEATURE:
<221> NAME/KEY: MISC_FEATURE
<222> LOCATION: (23)..(23)
<223> OTHER INFORMATION: S or C

<400> SEQUENCE: 21

```
Met Ala Glu Val Gln Leu Gln Ala Ser Gly Gly Val Phe Val Gln Ser
1               5                   10                  15

Gly Gly Ser Leu Arg Leu Xaa Cys Ala Ala Ser Gly
            20                  25
```

<210> SEQ ID NO 22
<211> LENGTH: 7
<212> TYPE: PRT
<213> ORGANISM: Artificial
<220> FEATURE:
<223> OTHER INFORMATION: Synthetic VH CDR1 of Abx
<220> FEATURE:
<221> NAME/KEY: MISC_FEATURE
<222> LOCATION: (4)..(4)
<223> OTHER INFORMATION: T or C

<400> SEQUENCE: 22

```
Ala Thr Ser Xaa Phe Asp Gly
1               5
```

<210> SEQ ID NO 23
<211> LENGTH: 19
<212> TYPE: PRT
<213> ORGANISM: Artificial
<220> FEATURE:
<223> OTHER INFORMATION: Synthetic VH FR2 of Abx
<220> FEATURE:
<221> NAME/KEY: MISC_FEATURE
<222> LOCATION: (12)..(12)
<223> OTHER INFORMATION: R or K

<400> SEQUENCE: 23

```
Met Gly Trp Phe Arg Gln Ala Pro Gly Lys Glu Xaa Glu Phe Val Ser
1               5                   10                  15

Ala Ile Ser
```

<210> SEQ ID NO 24
<211> LENGTH: 7
<212> TYPE: PRT
<213> ORGANISM: Artificial
<220> FEATURE:
<223> OTHER INFORMATION: Synthetic VH CDR2 of Abx
<220> FEATURE:
<221> NAME/KEY: MISC_FEATURE
<222> LOCATION: (2)..(2)
<223> OTHER INFORMATION: E or G

<400> SEQUENCE: 24

```
Tyr Xaa Gln Gly Ser Tyr Thr
1               5
```

```
<210> SEQ ID NO 25
<211> LENGTH: 39
<212> TYPE: PRT
<213> ORGANISM: Artificial
<220> FEATURE:
<223> OTHER INFORMATION: Synthetic VH FR3 of Abx
<220> FEATURE:
<221> NAME/KEY: MISC_FEATURE
<222> LOCATION: (29)..(29)
<223> OTHER INFORMATION: R or G
<220> FEATURE:
<221> NAME/KEY: MISC_FEATURE
<222> LOCATION: (35)..(35)
<223> OTHER INFORMATION: T or S

<400> SEQUENCE: 25

Tyr Tyr Ala Asp Ser Val Lys Gly Arg Phe Thr Ile Ser Arg Asp Asn
1               5                   10                  15

Ser Lys Asn Met Val Tyr Leu Gln Met Asn Ser Leu Xaa Ala Glu Asp
            20                  25                  30

Thr Ala Xaa Tyr Tyr Cys Ala
        35

<210> SEQ ID NO 26
<211> LENGTH: 12
<212> TYPE: PRT
<213> ORGANISM: Artificial
<220> FEATURE:
<223> OTHER INFORMATION: Synthetic VH CDR3 of Abx
<220> FEATURE:
<221> NAME/KEY: MISC_FEATURE
<222> LOCATION: (1)..(1)
<223> OTHER INFORMATION: P or S

<400> SEQUENCE: 26

Xaa Ala Tyr Glu Gly Asp Leu Tyr Ala Phe Asp Ser
1               5                   10

<210> SEQ ID NO 27
<211> LENGTH: 12
<212> TYPE: PRT
<213> ORGANISM: Artificial
<220> FEATURE:
<223> OTHER INFORMATION: Synthetic VH FR4 of Abx
<220> FEATURE:
<221> NAME/KEY: MISC_FEATURE
<222> LOCATION: (2)..(2)
<223> OTHER INFORMATION: G or E
<220> FEATURE:
<221> NAME/KEY: MISC_FEATURE
<222> LOCATION: (3)..(3)
<223> OTHER INFORMATION: G or E

<400> SEQUENCE: 27

Tyr Xaa Xaa Gln Gly Thr Gln Val Thr Val Ser Ser
1               5                   10

<210> SEQ ID NO 28
<211> LENGTH: 126
<212> TYPE: PRT
<213> ORGANISM: Artificial
<220> FEATURE:
<223> OTHER INFORMATION: Synthetic VH of E4-1 antibody

<400> SEQUENCE: 28

Met Ala Glu Val Gln Leu Gln Ala Ser Gly Gly Gly Phe Val Gln Pro
1               5                   10                  15
```

```
Gly Gly Ser Leu Arg Leu Ser Cys Ala Ala Ser Gly Ala Thr Ser Thr
            20                  25                  30

Phe Asp Gly Met Gly Trp Phe Arg Gln Ala Pro Gly Lys Glu Arg Glu
            35                  40                  45

Phe Val Ser Ala Ile Ser Tyr Glu Gln Gly Ser Tyr Thr Tyr Tyr Ala
        50                  55                  60

Asp Ser Val Lys Gly Arg Phe Thr Ile Ser Arg Asp Asn Ser Lys Asn
65                  70                  75                  80

Thr Val Tyr Leu Gln Met Asn Ser Leu Arg Ala Glu Asp Thr Ala Thr
                85                  90                  95

Tyr Tyr Cys Ala Pro Ala Tyr Glu Gly Asp Leu Tyr Ala Phe Asp Ser
            100                 105                 110

Tyr Trp Gly Gln Gly Thr Gln Val Thr Val Ser Ser Ala Ala
            115                 120                 125

<210> SEQ ID NO 29
<211> LENGTH: 379
<212> TYPE: PRT
<213> ORGANISM: Artificial
<220> FEATURE:
<223> OTHER INFORMATION: Synthetic Minibody Z70

<400> SEQUENCE: 29

Met Tyr Arg Met Gln Leu Leu Ser Cys Ile Ala Leu Ser Leu Ala Leu
1               5                   10                  15

Val Thr Asn Ser Ile Ser Ala Met Ala Glu Val Gln Leu Gln Ala Ser
            20                  25                  30

Gly Gly Val Phe Val Gln Ser Gly Gly Ser Leu Arg Leu Ser Cys Ala
            35                  40                  45

Ala Ser Gly Ala Thr Ser Thr Phe Asp Gly Met Gly Trp Phe Arg Gln
        50                  55                  60

Ala Pro Gly Lys Glu Arg Glu Phe Val Ser Ala Ile Ser Tyr Glu Gln
65                  70                  75                  80

Gly Ser Tyr Thr Tyr Tyr Ala Asp Ser Val Lys Gly Arg Phe Thr Ile
                85                  90                  95

Ser Arg Asp Asn Ser Lys Asn Met Val Tyr Leu Gln Met Asn Ser Leu
            100                 105                 110

Arg Ala Glu Asp Thr Ala Thr Tyr Tyr Cys Ala Pro Ala Tyr Glu Gly
            115                 120                 125

Asp Leu Tyr Ala Phe Asp Ser Tyr Gly Gly Gln Gly Thr Gln Val Thr
        130                 135                 140

Val Ser Ser Ala Ala Ala Arg Ser Pro Pro Leu Lys Glu Cys Pro Pro
145                 150                 155                 160

Cys Ala Ala Pro Asp Leu Leu Gly Gly Pro Ser Val Phe Ile Phe Pro
                165                 170                 175

Pro Lys Ile Lys Asp Val Leu Met Ile Ser Leu Ser Pro Met Val Thr
            180                 185                 190

Cys Val Val Val Asp Val Ser Glu Asp Pro Asp Val Gln Ile Ser
            195                 200                 205

Trp Phe Val Asn Asn Val Glu Val His Thr Ala Gln Thr Gln Thr His
        210                 215                 220

Arg Glu Asp Tyr Asn Ser Thr Leu Arg Val Val Ser Ala Leu Pro Ile
225                 230                 235                 240

Gln His Gln Asp Trp Met Ser Gly Lys Glu Phe Lys Cys Lys Val Asn
                245                 250                 255
```

```
Asn Arg Ala Leu Pro Ser Pro Ile Glu Lys Thr Ile Ser Lys Pro Arg
                260                 265                 270

Gly Pro Val Arg Ala Pro Gln Val Tyr Val Leu Pro Pro Ala Glu
            275                 280                 285

Glu Met Thr Lys Lys Glu Phe Ser Leu Thr Cys Met Ile Thr Gly Phe
        290                 295                 300

Leu Pro Ala Glu Ile Ala Val Asp Trp Thr Ser Asn Gly Arg Thr Glu
305                 310                 315                 320

Gln Asn Tyr Lys Asn Thr Ala Thr Val Leu Asp Ser Asp Gly Ser Tyr
                325                 330                 335

Phe Met Tyr Ser Lys Leu Arg Val Gln Lys Ser Thr Trp Glu Arg Gly
            340                 345                 350

Ser Leu Phe Ala Cys Ser Val Val His Glu Gly Leu His Asn His Leu
        355                 360                 365

Thr Thr Lys Thr Ile Ser Arg Ser Leu Gly Lys
    370                 375

<210> SEQ ID NO 30
<211> LENGTH: 126
<212> TYPE: PRT
<213> ORGANISM: Artificial
<220> FEATURE:
<223> OTHER INFORMATION: Synthetic VH of Z70 antibody (figure 2B)

<400> SEQUENCE: 30

Met Ala Glu Val Gln Leu Gln Ala Ser Gly Gly Val Phe Val Gln Ser
1               5                   10                  15

Gly Gly Ser Leu Arg Leu Ser Cys Ala Ala Ser Gly Ala Thr Ser Thr
            20                  25                  30

Phe Asp Gly Met Gly Trp Phe Arg Gln Ala Pro Gly Lys Glu Arg Glu
        35                  40                  45

Phe Val Ser Ala Ile Ser Tyr Glu Gln Gly Ser Tyr Thr Tyr Tyr Ala
    50                  55                  60

Asp Ser Val Lys Gly Arg Phe Thr Ile Ser Arg Asp Asn Ser Lys Asn
65                  70                  75                  80

Met Val Tyr Leu Gln Met Asn Ser Leu Arg Ala Glu Asp Thr Ala Thr
                85                  90                  95

Tyr Tyr Cys Ala Pro Ala Tyr Glu Gly Asp Leu Tyr Ala Phe Asp Ser
            100                 105                 110

Tyr Gly Gly Gln Gly Thr Gln Val Thr Val Ser Ser Ala Ala
        115                 120                 125

<210> SEQ ID NO 31
<211> LENGTH: 372
<212> TYPE: DNA
<213> ORGANISM: Artificial
<220> FEATURE:
<223> OTHER INFORMATION: Synthetic VH of Z70 antibody

<400> SEQUENCE: 31
atggcggaag tgcagctgca ggcttccggg ggagtatttg tgcagtcggg ggggtcattg        60
cgactgagct cgccgcatc cggagcaact tcaacatttg acggtatggg ctggtttcgt       120
caggcccctg gcaaggagag agagttcgtt tccgccatct cctacgaaca agggtcgtat       180
acatactacg ctgacagcgt aaagggaaga tttacaatta gccgggataa ctccaaaaac       240
atggtctatc tccagatgaa cagcctcagg gccgaggaca cagctacgta ttactgtgca       300
cctgcatatg agggtgacct gtatgcattt gactcgtacg ggggacaggg gacgcaggta       360
```
actgtgagta gc                                                         372

<210> SEQ ID NO 32
<211> LENGTH: 4571
<212> TYPE: DNA
<213> ORGANISM: Artificial
<220> FEATURE:
<223> OTHER INFORMATION: Synthetic plasmid sequence with Z70 minibody

<400> SEQUENCE: 32

```
cgaaggatct gcgatcgctc cggtgcccgt cagtgggcag agcgcacatc gcccacagtc    60
cccgagaagt tgggggagg ggtcggcaat tgaacgggtg cctagagaag gtggcgcggg   120
gtaaactggg aaagtgatgt cgtgtactgg ctccgccttt ttcccgaggg tgggggagaa   180
ccgtatataa gtgcagtagt cgccgtgaac gttcttttc gcaacgggtt tgccgccaga   240
acacagctga agcttcgagg ggctcgcatc tctccttcac gcgcccgccg ccctacctga   300
ggccgccatc cacgccggtt gagtcgcgtt ctgccgcctc ccgcctgtgg tgcctcctga   360
actgcgtccg ccgtctaggt aagtttaaag ctcaggtcga gaccgggcct ttgtccggcg   420
ctcccttgga gcctacctag actcagccgg ctctccacgc tttgcctgac cctgcttgct   480
caactctacg tctttgtttc gttttctgtt ctgcgccgtt acagatccaa gctgtgaccg   540
gcgcctacct gagatcaccg gcgaaggagg gccaccatgt acaggatgca actcctgtct   600
tgcattgcac taagtcttgc acttgtcacg aattcgatat cggccatggc ggaagtgcag   660
ctgcaggctt ccgggggagt atttgtgcag tcgggggggg cattgcgact gagctgcgcc   720
gcatccggag caacttcaac atttgacggt atgggctggt tcgtcaggc ccctggcaag   780
gagagagagt tcgtttccgc catctcctac gaacaagggt cgtatacata ctacgctgac   840
agcgtaaagg gaagatttac aattagccgg gataactcca aaaacatggt ctatctccag   900
atgaacagcc tcagggccga ggacacagct acgtattact gtgcacctgc atatgagggt   960
gacctgtatg catttgactc gtacggggga caggggacgc aggtaactgt gagtagcgcg  1020
gccgctagat ctcctccact caaagagtgt ccccatgcg cagctccaga cctcttgggt  1080
ggaccatccg tcttcatctt ccctccaaag atcaaggatg tactcatgat ctccctgagc  1140
cctatggtca catgtgtggt ggtggatgtg agcgaggatg acccagacgt ccagatcagc  1200
tggtttgtga acaacgtgga agtacacaca gctcagacac aaacccatag agaggattac  1260
aacagtactc tccgggtggt cagtgccctc cccatccagc accaggactg gatgagtggc  1320
aaggagttca aatgcaaggt caacaacaga gccctcccat ccccatcga gaaaccatc  1380
tcaaacccca gagggccagt aagagctcca caggtatatg tcttgcctcc accagcagaa  1440
gagatgacta agaagagtt cagtctgacc tgcatgatca caggcttctt acctgccgaa  1500
attgctgtgg actggaccag caatgggcgt acagagcaaa actacaagaa caccgcaaca  1560
gtcctggact ctgatggttc ttacttcatg tacagcaagc tcagagtaca aaagagcact  1620
tgggaaagag gaagtctttt cgcctgctca gtggtccacg agggtctgca caatcacctt  1680
acgactaaga ccatctcccg gtctctgggt aaatgagcta gctggccaga catgataaga  1740
tacattgatg agtttggaca aaccacaact agaatgcagt gaaaaaaatg ctttatttgt  1800
gaaatttgtg atgctattgc tttatttgta accattataa gctgcaataa acaagttaac  1860
aacaacaatt gcattcattt tatgtttcag gttcagggg aggtgtggga ggttttttaa  1920
agcaagtaaa acctctacaa atgtggtatg gaattaattc taaaatacag catagcaaaa  1980
```

```
ctttaacctc caaatcaagc ctctacttga atccttttct gagggatgaa taaggcatag    2040
gcatcagggg ctgttgccaa tgtgcattag ctgtttgcag cctcaccttc tttcatggag    2100
tttaagatat agtgtatttt cccaaggttt gaactagctc ttcatttctt tatgttttaa    2160
atgcactgac ctcccacatt cccttttag taaaatattc agaataatt taaatacatc     2220 attgcaatga aaataaatgt tttttattag gcagaatcca gatgctcaag gcccttcata   2280
atatccccca gtttagtagt tggacttagg gaacaaagga acctttaata gaaattggac   2340
agcaagaaag cgagcttcta gcttatcctc agtcctgctc ctctgccaca aagtgcacgc   2400
agttgccggc cgggtcgcgc agggcgaact cccgccccca cggctgctcg ccgatctcgg   2460
tcatggccgg cccggaggcg tcccggaagt tcgtggacac gacctccgac cactcggcgt   2520
acagctcgtc caggccgcgc acccacaccc aggccagggt gttgtccggc accacctggt   2580
cctggaccgc gctgatgaac agggtcacgt cgtcccggac cacaccggcg aagtcgtcct   2640
ccacgaagtc ccgggagaac ccgagccggt cggtccagaa ctcgaccgct ccggcgacgt   2700
cgcgcgcggt gagcaccgga acggcactgg tcaacttggc catgatggct cctcctgtca   2760
ggagaggaaa gagaagaagg ttagtacaat tgctatagtg agttgtatta tactatgcag   2820
atatactatg ccaatgatta attgtcaaac tagggctgca gggttcatag tgccactttt   2880
cctgcactgc cccatctcct gcccacccctt tcccaggcat agacagtcag tgacttacca   2940
aactcacagg agggagaagg cagaagcttg agacagaccc gcgggaccgc cgaactgcga   3000
ggggacgtgg ctagggcggc ttcttttatg gtgcgccggc cctcggaggc agggcgctcg   3060
gggaggccta gcggccaatc tgcggtggca ggaggcgggg ccgaaggccg tgcctgacca   3120
atccggagca cataggagtc tcagcccccc gccccaaagc aagggaagt cacgcgcctg    3180 tagcgccagc gtgttgtgaa atgggggctt ggggggggttg gggccctgac tagtcaaaac  3240
aaactcccat tgacgtcaat ggggtggaga cttggaaatc cccgtgagtc aaaccgctat   3300
ccacgcccat tgatgtactg ccaaaaccgc atcatcatgg taatagcgat gactaatacg   3360
tagatgtact gccaagtagg aaagtcccat aaggtcatgt actgggcata atgccaggcg   3420
ggccatttac cgtcattgac gtcaataggg gcgtacttg gcatatgata cacttgatgt    3480
actgccaagt gggcagttta ccgtaaatac tccacccatt gacgtcaatg gaaagtccct   3540
attggcgtta ctatgggaac atacgtcatt attgacgtca atgggcgggg gtcgttgggc    3600
ggtcagccag gcgggccatt taccgtaagt tatgtaacgc ctgcaggtta attaagaaca   3660
tgtgagcaaa aggccagcaa aaggccagga accgtaaaaa ggccgcgttg ctggcgtttt   3720
tccataggct ccgccccct gacgagcatc acaaaaatcg acgctcaagt cagaggtggc    3780
gaaacccgac aggactataa agataccagg cgtttccccc tggaagctcc ctcgtgcgct   3840
ctcctgttcc gaccctgccg cttaccggat acctgtccgc ctttctccct tcgggaagcg   3900
tggcgctttc tcatagctca cgctgtaggt atctcagttc ggtgtaggtc gttcgctcca   3960
agctgggctg tgtgcacgaa ccccccgttc agcccgaccc tgcgccttta ccggtaact    4020 atcgtcttga gtccaacccg gtaagacacg acttatcgcc actggcagca gccactggta   4080
acaggattag cagagcgagg tatgtaggcg gtgctacaga gttcttgaag tggtggccta   4140
actacggcta cactagaaga acagtatttg gtatctgcgc tctgctgaag ccagttacct   4200
tcggaaaaag agttggtagc tcttgatccg gcaaacaaac caccgctggt agcggtggtt   4260 ttttttgtttg caagcagcag attacgcgca gaaaaaagg atctcaagaa gatcctttga   4320
tcttttctac ggggtctgac gctcagtgga acgaaaactc acgttaaggg attttggtca   4380
```

```
tggctagtta attaacattt aaatcagcgg ccggccgcaa taaaatatct ttattttcat    4440
tacatctgtg tgttggtttt ttgtgtgaat cgtaactaac atacgctctc catcaaaaca    4500
aaacgaaaca aaacaaacta gcaaaatagg ctgtccccag tgcaagtgca ggtgccagaa    4560
catttctcta t                                                        4571
```

ANTI TAU SVQIVYKPV EPITOPE SINGLE DOMAIN ANTIBODY

FIELD OF THE INVENTION

The invention relates to new single domain antibody that specifically binds Tau species, especially the epitope region involved in Tau aggregation. These specific antibodies can be used for the therapy of Tauopathy disorders such as progressive supranuclear palsy (PSP).

BACKGROUND OF THE INVENTION

Aggregation of the intrinsically disordered neuronal Tau protein to form fibrillary amyloid structures is related to neurodegenerative disorders called tauopathies, including the most prevalent, Alzheimer's disease (AD). AD is characterized by both extracellular amyloid deposits made of AB (amyloid) peptides and intraneuronal neurofibrillary tangles (NFTs) formed by Tau protein aggregates[1]. Intervention strategies based on the Aß hypothesis had, up to date, limited success despite being the primary target of clinical assays[2]. In AD, the severity of cognitive decline is better correlated with the evolution of neurofibrillary tangles (NFTs) than amyloid deposits[3-5]. This emphasizes the need to pursue other biological hypotheses, including the Tau pathway, in search for disease-mitigating treatments for AD and other tauopathies.

In the pathological context, Tau is the principal component of paired helical filaments (PHFs) and straight filaments (SFs), which form the intracellular fibrillary deposits leading to the NFTs and ultimately to neurofibrillary degeneration. The longest Tau isoform constituted of 441-amino acid residues can be divided into 4 domains comprising the N-terminal domain (N1-N2), the proline-rich domain (P1-P2), the microtubule-binding domain (MTBD) constituted itself of 4 partially repeated regions, R1 to R4, and the C-terminal domain (FIG. 1). Two homologous hexapeptides named PHF6* ($_{275}$VQIINK$_{280}$) and PHF6 ($_{306}$VQIVYK$_{311}$) located at the start of R2 and R3 repeat regions (FIG. 1) of Tau MTBD are nuclei of Tau aggregation[6], PHF6* being the strongest driver of aggregation[7]. PHF6* and PHF6 peptides spontaneously aggregate in solution contrary to the full-length Tau that is a highly soluble protein. Their atomic structures reveal the capacity of these segments to form interdigitated steric-zipper interfaces that seed Tau aggregation[7,8]. In addition, the first structures of PHF and SF coming from Tau fibers isolated from AD's brain patients were resolved by cryo-electron microscopy. The core of these fibrillary structures is composed of the subdomains R3 including the PHF6, R4 and a part of the C-terminal domain (V306-F378), mainly forming a β-sheet structure[9]. Although the mechanisms leading to these pathological Tau species is not clearly understood, different molecular features have been identified as involved in the aggregation process including specific mutations identified in frontotemporal dementia[10], specific pattern(s) of phosphorylation[11], acetylation[12] and Tau N- and C-terminal truncations[13-15]. Tau aggregates are toxic at several levels. First, PHFs formation disrupts cellular functions upon accumulation at the disease late stages, by depleting the pool of soluble Tau protein. In addition, it has also become clear in recent years that extracellular Tau aggregates are taken up in cells, leading to intracellular Tau seeding[16-19]. The neuronal Tau protein has been historically described as a cytosolic protein principally localized in axons and involved in the regulation of tubulin polymerization and microtubule stability[20]. This simplified view has been enriched by multiple studies demonstrating roles of Tau in many additional biological processes in various localizations including nucleus, dendrites and extracellular medium[21-24] In pathological conditions, the formation of Tau aggregates leads to the dysregulation of all its relative functions. These new findings generated new hypotheses in the understanding of the pathological consequences of Tau aggregation. However, the related search for in-depth comprehension of the Tau physiopathology and effective therapies remains a challenging task. Advances in the field of neurodegeneration require development of new experimental tools that may help to decipher key aspects of tauopathies.

SUMMARY OF THE INVENTION

The present invention provides for an isolated anti Tau single domain antibody, wherein said antibody binds to an epitope comprising residues SVQIVYKPV (SEQ ID NO:1) of the Tau protein, said antibody binds to Tau protein with a KD of 150 nM or less, 80 nM or less, 50 nM or less.

The invention further relates to a method for detecting human Tau polypeptide using the anti-Tau single domain antibody according to the invention, and/or evaluating its amount in a biological sample.

The invention further relates to a therapeutic method of tauopathies using the anti Tau single domain antibody according to the invention.

DETAILED DESCRIPTION OF THE INVENTION

Here, inventors used VHHs (Variable Heavy-chain of the Heavy-chain-only antibodies), also called camelid heavy-chain-only antibodies, targeting Tau and preventing its aggregation. VHHs are constituted of an unique heavy-chain that corresponds to the variable heavy-chain from Camelidae immunoglobulin G[25]. They can be modified to penetrate into the cytoplasm of cells, or expressed inside the cells, and bind specifically to their target epitope[26,27]. In addition, due to their small size, VHHs have been described to cross the blood-brain-barrier more easily than classical antibodies. Inventors generated, optimized and characterized a VHH targeted against Tau MTBD, obtained by screening from a naïve synthetic library. The optimized version of this lead VHH inhibits Tau aggregation in vitro and in HEK 293 aggregation-reporting cellular model, providing a new tool in Tau immunotherapies. Moreover, the inventors found that immunization with the optimized version of this lead VHH prevented the formation of neurofibrillary tangles induced by injection of extracellular h-AD in mouse model.

Antibodies According to the Invention

Epitope

The present invention provides for an isolated anti-Tau single domain antibody, wherein said antibody binds to an epitope comprising residues SVQIVYKPV (SEQ ID NO:1) of the Tau protein, said antibody binds to Tau protein with a KD of 150 nM or less, 80 nM or less, 50 nM or less.

As used herein the term "single domain antibody" has its general meaning in the art and refers to the single heavy chain variable domain of antibodies of the type that can be found in Camelid mammals which are naturally devoid of light chains. Such single domain antibody is also called VHH or "Nanobody®". For a general description of (single) domain antibodies, reference is also made to the prior art cited above, as well as to EP 0 368 684, Ward et al. (Nature 1989 Oct. 12; 341 (6242): 544-6), Holt et al., Trends Biotechnol., 2003, 21(11):484-490; and WO 06/030220, WO 06/003388. VHHs have a molecular weight of about one-tenth of human IgG molecule ones and have a physical diameter of only a few nanometers. One consequence of the small size is the ability of single domain antibodies (or VHHs) to bind to antigenic sites that are functionally invisible to larger antibody proteins, i.e., single domain antibody (or VHHs) are useful as reagents to detect antigens that are otherwise cryptic using classical immunological techniques, and as possible therapeutic agents. Thus yet another consequence of small size is that a single domain antibody (or VHH) can inhibit activity/interactions as a result of binding to a specific site in a groove or narrow cleft of a target protein, and hence can serve in a capacity that more closely resembles the function of a classical low molecular weight drug than that of a classical antibody. The low molecular weight and compactness of the fold result in VHHs being extremely thermostable, stable to extreme pH and to proteolytic digestion, and the absence of Fc fragment provides a low antigenic character. Another consequence is that VHHs readily move from the circulatory system into tissues, and have a higher probability to cross the blood-brain barrier and can treat disorders that affect nervous tissue. Single domain antibodies (or VHHs) can further facilitate drug transport across the blood brain barrier. See U.S. patent application 20040161738 published Aug. 19, 2004. These features combined with the low antigenicity to humans indicate great therapeutic potential. The amino acid sequence and structure of a single domain antibody can be considered to be comprised of four framework regions or "FRs" which are referred to in the art and herein as "Framework region 1" or "FR1"; as "Framework region 2" or "FR2"; as "Framework region 3" or "FR3"; and as "Framework region 4" or "FR4" respectively; which framework regions are interrupted by three complementary determining regions or "CDRs", which are referred to in the art as "Complementarity Determining Region for "CDR1"; as "Complementarity Determining Region 2" or "CDR2" and as "Complementarity Determining Region 3" or "CDR3", respectively. Accordingly, the single domain antibody can be defined as an amino acid sequence with the general structure: FR1-CDR1-FR2-CDR2-FR3-CDR3-FR4 in which FR1 to FR4 refer to framework regions 1 to 4 respectively, and in which CDR1 to CDR3 refer to the complementarity determining regions 1 to 3. In the context of the invention, the amino acid residues of the single domain antibody are numbered according to the general numbering for VH (variable heavy chain) domains given by the International ImMunoGeneTics information system aminoacid numbering (http://imgt.org/).

The term "Tau" as used herein denotes the Tau protein from mammals and especially from primates (and Tupaiidae). Human Tau is a neuronal microtubule-associated protein found predominantly in axons and functions to promote tubulin polymerization and stabilize microtubules. Eight isoforms (isoform A, B, C, D, E, F, G, fetal-Tau) are found in Human and only isoforms B, C, D, E, F, and fetal-Tau are found in brain, the longest isoform comprising 441 amino acids (isoform F, Uniprot P10636-8). Tau and its properties are also described by Reynolds, C. H. et al., J. Neurochem. 69 (1997) 191-198. Tau, in its hyperphosphorylated form, is the major component of paired helical filaments (PHF), the building block of neurofibrillary lesions in Alzheimer's disease (AD) brain. Tau can be phosphorylated at its serine or threonine residues by several different kinases including GSK3beta, cdk5, MARK and members of the MAP kinase family.

The protein sequence of human Tau protein, and its isoforms, may be found in Uniprot database with the following access numbers:
Tau isoform Fetal (352 Amino Acids) Uniprot P10636-2
Tau isoform A (316 Amino Acids) Uniprot P10636-3
Tau isoform B (381 AA) Uniprot P10636-4
Tau isoform D (383 AA) Uniprot P10636-6
Tau isoform C (410 AA) Uniprot P10636-5
Tau isoform E (412 AA) Uniprot P10636-7
Tau isoform F (441AA) Uniprot P10636-8
Tau isoform G (776 AA) Uniprot P10636-9

As used herein, the term KD is intended to refer to the dissociation constant, which is obtained from the ratio of Kon to Koff (i.e. Kon/Koff) and is expressed as a molar concentration (M). KD values for antibodies can be determined using methods well established in the Art. One method for determining the KD of an antibody is by using surface Plasmon resonance, using a biosensor system such as a Biacore® system In some embodiments, the single domain antibody is a "humanized" single domain antibody.

Figure 2A:
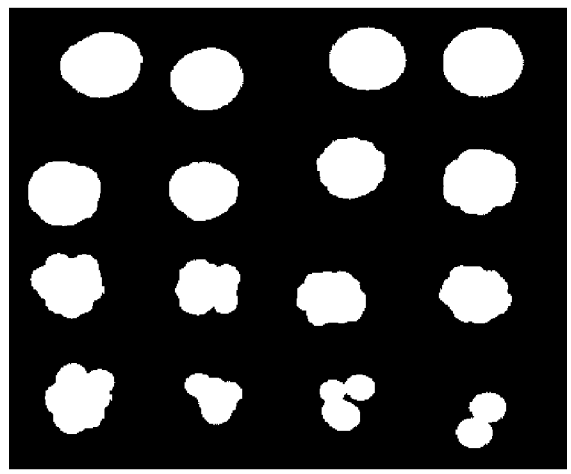
Figure 2A:
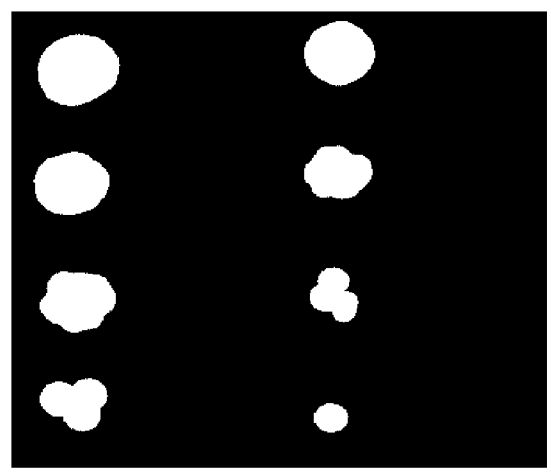
Figures 2B, 2C:
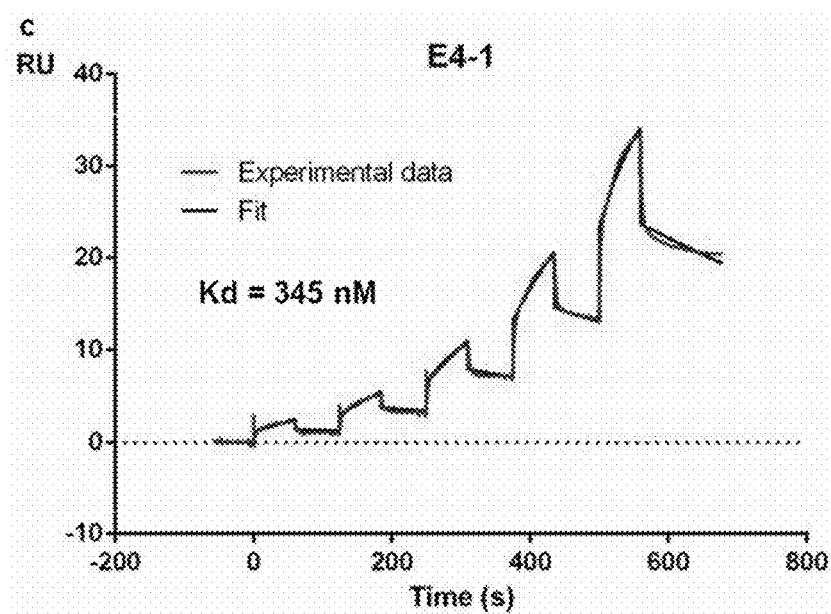

As used herein the term "humanized" refers to a single domain antibody of the invention wherein an amino acid sequence that corresponds to the amino acid sequence of a naturally occurring VHH domain has been "humanized", i.e. by replacing one or more amino acid residues in the amino acid sequence of said naturally occurring VHH sequence (and in particular in the framework sequences) by one or more of the amino acid residues that occur at the corresponding position(s) in a variable heavy chain (VH) from a conventional chain antibody from a human being. Methods for humanizing single domain antibodies are well known in the art. Typically, the humanizing substitutions should be chosen such that the resulting humanized single domain antibodies still retain the favourable properties of single domain antibodies of the invention. The one skilled in the art is able to determine and select suitable humanizing substitutions or suitable combinations of humanizing substitutions. For example, the single domain antibodies of the invention may be suitably humanized at any framework residue depicted in FIG. 2B provided that the single domain antibodies remain soluble and do not significantly lose their affinity for Tau.

Single Domain Antibody (Z70) and Derivative

In a particular embodiment, the invention relates to an anti-Tau single domain antibody (Z70) comprising:
  a variable heavy chain (VH) having at least 70% of identity with sequence set forth as SEQ ID NO:2

According to the invention a first amino acid sequence having at least 70% of identity with a second amino acid sequence means that the first sequence has 70; 71; 72; 73; 74; 75; 76; 77; 78; 79; 80; 81; 82; 83; 84; 85; 86; 87; 88; 89; 90; 91; 92; 93; 94; 95; 96; 97; 98; or 99% of identity with the second amino acid sequence. Amino acid sequence identity is typically determined using a suitable sequence alignment algorithm and default parameters, such as CLUSTAL or BLAST P (Karlin and Altschul, 1990).

In some embodiments, the isolated single domain antibody according to the invention has the sequence of variable heavy chain (VH) set forth as SEQ ID NO:2 ("Z70").

In some embodiments the isolated single domain antibody ([Z70] derivative) according to the invention comprises a CDR1 having a sequence set forth as SEQ ID NO: 3, a CDR2 having a sequence set forth as SEQ ID NO:4 and a CDR3 having a sequence set forth as SEQ ID NO:5.

In a particular embodiment, the single domain antibodies described above bind to the same antigen and have the same or improved properties (see definition of "Z70 analogue") of the single domain antibody of the invention i.e. the antibody with the CDRs of SEQ ID NO: 3 to 5.

These sequences are described below in Table 1 for the variable heavy chain (VH) and domains (CDRs or FRs) of Single Domain antibody Z70.

TABLE 1

| Single Domain antibody Z70 Domains | Aminoacid Sequence |
|---|---|
| VH (CDR in bold) FR1-CDR1-FR2-2 CDR2-FR3-CDR3-FR4 | MAEVQLQASGGVFVQSGGSLRLSCA ASGATSTFDGMGWFRQAPGKEREFV SAISYEQGSYTYYADSVKGRFTISRDN SKNMVYLQMNSLRAEDTATYYCAPAY EGDLYAFDSYGGQGTQVTVSS (SEQ ID NO: 2) |
| VH-CDR1 | ATSTFDG (SEQ ID NO: 3) |
| VH-CDR2 | YEQGSYT (SEQ ID NO: 4) |
| VH-CDR3 | PAYEGDLYAFDS (SEQ ID NO: 5) |
| VH FR1 | MAEVQLQASGGVFVQSGGSLRLSCA ASG (SEQ ID NO: 6) |
| VH-FR2 | MGWFRQAPGKEREFVSAIS (SEQ ID NO: 7) |
| VH-FR3 | YYADSVKGRFTISRDNSKNMVYLQMN SLRAEDTATYYCA (SEQ ID NO: 8) |
| VH-FR4 | YGGQGTQVTVSS (SEQ ID NO: 9) |

The inventors generate several mutants or variants of Z70 single domain antibody, namely Mut1, Mut3, Mut5, Mut9, Mut12, Mut14 Mut15 and Mut20 (see Example 2)

Sequences of Z70 variants are described below in Table 2 for the variable heavy chain (VH) of the single domain antibodies

TABLE 2

| Single Domain antibody Z70 and Variants | Aminoacid Sequence |
|---|---|
| VH Z70 | MAEVQLQASGGVFVQSGGSLRLSCAASGATSTFDGM GWFRQAPGKEREFVSAISYEQGSYTYYADSVKGRFTIS RDNSKNMVYLQMNSLRAEDTATYYCAPAYEGDLYAFD SYGGQGTQVTVSS (SEQ ID NO: 2) |
| VH Mut1 | MAEVQLQASGGVFVQSGGSLRLSCAASGATSTFDGM GWFRQAPGKEREFVSAISYEQGSYTYYADSVKGRFTIS RDNSKNMVYLQMNSLRAEDTATYYCAPAYEGDLYAFD SYGEQGTQVTVSS (SEQ ID NO: 10) |
| VH Mut3 | MAEVQLQASGGVFVQSGGSLRLSCAASGATSTFDGM GWFRQAPGKEKEFVSAISYEQGSYTYYADSVKGRFTIS RDNSKNMVYLQMNSLRAEDTATYYCAPAYEGDLYAFD SYGGQGTQVTVSS (SEQ ID NO: 11) |
| VH-Mut5 | MAEVQLQASGGVFVQSGGSLRLSCAASGATSTFDGM GWFRQAPGKEREFVSAISYEQGSYTYYADSVKGRFTIS RDNSKNMVYLQMNSLRAEDTASYYCAPAYEGDLYAFD SYGGQGTQVTVSS (SEQ ID NO: 12) |
| VH Mut9 | MAEVQLQASGGVFVQSGGSLRLSCAASGATSTFDGM GWFRQAPGKEREFVSAISYEQGSYTYYADSVKGRFTIS RDNSKNMVYLQMNSLRAEDTATYYCASAYEGDLYAFD SYGEQGTQVTVSS (SEQ ID NO: 13) |
| VH Mut12 | MAEVQLQASGGVFVQSGGSLRLCCAASGATSTFDGM GWFRQAPGKEREFVSAISYEQGSYTYYADSVKGRFTIS RDNSKNMVYLQMNSLRAEDTATYYCAPAYEGDLYAFD SYGEQGTQVTVSS (SEQ ID NO: 14) |
| VH Mut14 | MAEVQLQASGGVFVQSGGSLRLSCAASGATSIFDGMG WFRQAPGKEREFVSAISYGQGSYTYYADSVKGRFTISR DNSKNMVYLQMNSLRAEDTATYYCAPAYEGDLYAFDS YGEQGTQVTVSS (SEQ ID NO: 15) |
| VH Mut15 | MAEVQLQASGGVFVQSGGSLRLSCAASGATSTFDGM GWFRQAPGKEREFVSAISYEQGSYTYYADSVKGRFTIS RDNSKNMVYLQMNSLGAEDTATYYCASAYEGDLYAFD SYEGQGTQVTVSS (SEQ ID NO: 16) |
| VH Mut20 | MAEVQLQASGGVFVQSGGSLRLSCAASGATSTFDGM GWFRQAPGKEKEFVSAISYEQGSYTYYADSVKGRFTIS RDNSKNMVYLQMNSLRAEDTATYYCAPAYEGDLYAFD SYGEQGTQVTVSS (SEQ ID NO: 17) |

The CDRs sequences of Z70 and variants are in bold.

In a specific embodiment, the sequence of the single domain antibody of the invention, may contain at the C-terminal end, two additional amino-acid residues such Alanine corresponding to the cloning site, when the single domain antibody are produced with a plasmid (see for example the VHH Z70 SEQ ID No 30, the minibody of Z70 (SEQ ID No 29) and the nucleic sequences encoding for Z70 (SEQ ID No 31) and the plasmid vector encoding for Z70 minibody SEQ ID No 32)

The present invention thus provides antibodies comprising functional variants of the VH region including FRs and/or one or more CDRs of single domain antibody Z70. A functional variant of a VH (FR, or CDR) used in the context of a single domain antibody of the present invention still allows the antibody to retain at least a substantial proportion (at least about 50%, 60%, 70%, 80%, 90%, 95% or more) of the affinity/avidity and/or the specificity/selectivity of the parent antibody (i.e. single domain antibody Z70) and in some cases such a single domain antibody of the present invention may be associated with greater affinity, selectivity and/or specificity than the parent single domain antibody (or VHH). Such variants can be obtained by a number of affinity maturation protocols including mutating the CDRs (Yang et al., J. Mol. Biol., 254, 392-403, 1995), chain shuffling (Marks et al., Bio/Technology, 10, 779-783, 1992), use of mutator strains of *E. coli* (Low et al., J. Mol. Biol., 250, 359-368, 1996), DNA shuffling (Patten et al., Curr. Opin. Biotechnol., 8, 724-733, 1997), phage display (Thompson et al., J. Mol. Biol., 256, 77-88, 1996) and sexual PCR (Crameri et al., Nature, 391, 288-291, 1998). Vaughan et al. (supra) discusses these methods of affinity maturation. Such functional variants typically retain significant sequence identity to the parent single domain antibody (or VHH). The sequence of CDR variants may differ from the sequence of the CDR of the parent antibody sequences through mostly conservative substitutions; for instance at least about 35%, about 50% or more, about 60% or more, about 70% or more, about 75% or more, about 80% or more, about 85% or more, about 90% or more, (e.g., about 65-95%, such as about 92%, 93% or 94%) of the substitutions in the variant are conservative amino acid residue replacements. The sequences of CDR variants may differ from the sequence of the CDRs of the parent antibody sequences through mostly conservative substitutions; for instance at least 10, such as at least 9, 8, 7, 6, 5, 4, 3, 2 or 1 of the substitutions in the variant are conservative amino acid residue replacements. In the context of the present invention, conservative substitutions may be defined by substitutions within the classes of amino acids reflected as follows:

Aliphatic residues I, L, V, and M
Cycloalkenyl-associated residues F, H, W, and Y
Hydrophobic residues A, C, F, G, H, I, L, M, R, T, V, W, and Y
Negatively charged residues D and E
Polar residues C, D, E, H, K, N, Q, R, S, and T
Positively charged residues H, K, and R
Small residues A, C, D, G, N, P, S, T, and V
Very small residues A, G, and S
Residues involved in turn formation A, C, D, E, G, H, K, N, Q, R, S, P, and T
Flexible residues Q, T, K, S, G, P, D, E, and R More conservative substitutions groupings include: valine-leucine-isoleucine, phenylalanine-tyrosine, lysine-arginine, alanine-valine, and asparagine-glutamine. Conservation in terms of hydropathic/hydrophilic properties and residue weight/size also is substantially retained in a variant CDR as compared to a CDR of Z70. The importance of the hydropathic amino acid index in conferring interactive biologic function on a protein is generally understood in the art. It is accepted that the relative hydropathic character of the amino acid contributes to the secondary structure of the resultant protein, which in turn defines the interaction of the protein with other molecules, for example, enzymes, substrates, receptors, DNA, antibodies, antigens, and the like. Each amino acid has been assigned a hydropathic index on the basis of their hydrophobicity and charge characteristics these are: isoleucine (+4.5); valine (+4.2); leucine (+3.8); phenylalanine (+2.8); cysteine/cystine (+2.5); methionine (+1.9); alanine (+1.8); glycine (−0.4); threonine (−0.7); serine (−0.8); tryptophane (−0.9); tyrosine (−1.3); proline (−1.6); histidine (−3.2); glutamate (−3.5); glutamine (−3.5); aspartate (−3.5); asparagine (−3.5); lysine (−3.9); and arginine (−4.5). The retention of similar residues may also or alternatively be measured by a similarity score, as determined by use of a BLAST program (e.g., BLAST 2.2.8 available through the NCBI using standard settings BLOSUM62, Open Gap=1 and Gap extension=1). Suitable variants typically exhibit at least about 70% of identity to the parent protein. According to the present invention a first amino acid sequence having at least 70% of identity with a second amino acid sequence means that the first sequence has 70; 71; 72; 73; 74; 75; 76; 77; 78; 79; 80; 81; 82; 83; 84; 85; 86; 87; 88; 89; 90; 91; 92; 93; 94; 95; 96; 97; 98; 99; or 100% of identity with the second amino acid sequence. According to the present invention a first amino acid sequence having at least 90% of identity with a second amino acid sequence means that the first sequence has 90; 91; 92; 93; 94; 95; 96; 97; 98; 99; or 100% of identity with the second amino acid sequence.

In the present invention, inventors generate mutant or variant of Z70 single domain antibody, with conservative substitutions in the CDRs (Mut9, Mut14 and Mut15) and with mutations in the framework regions (Mut1, Mut3, Mut5, Mut12, Mut14, Mut15 and Mut20). All mutants or variants of Z70 single domain antibody binds to the same epitope of the Tau protein (SVQIVYKPV: SEQ ID NO:1) said antibodies have at least the same, or better, binding affinity than Z70 (see Example 2 ant tableau 3)

In some embodiments, the single domain antibody of the present invention is a single domain antibody having a variable heavy chain comprising i) a VH-CDR1 having at least 90; 91; 92; 93; 94; 95; 96; 97; 98; or 99% of identity with the VH-CDR1 of single domain antibody Z70, ii) a VH-CDR2 having at least 90; 91; 92; 93; 94; 95; 96; 97; 98; or 99% of identity with the VH-CDR2 of single domain antibody Z70 and iii) a VH-CDR3 having at least 90; 91; 92; 93; 94; 95; 96; 97; 98; or 99% of identity with the VH-CDR3 of single domain antibody Z70.

In some embodiments, the single domain antibody of the present invention is a single domain antibody having a variable heavy chain comprising i) a VH-CDR1 having at least 7, 6, 5, 4, 3, 2, 1 conservative substitutions within the VH-CDR1 of single domain antibody Z70 (SEQ ID No 3), ii) a VH-CDR2 having at least having at least 7, 6, 5, 4, 3, 2, 1 conservative substitutions within the VH-CDR2 of single domain antibody Z70 (SEQ ID No 4) and iii) a VH-CDR3 having at least 10, 9, 8, 7, 6, 5, 4, 3, 2, 1 conservative substitutions within the VH-CDR3 of single domain antibody Z70 (SEQ ID No 5).

In some embodiments, the single domain antibody of the present invention is a single domain antibody which comprises a variable heavy chain framework region sharing a homology or identity of 80% or more with a framework region having an amino acid sequence consisting of SEQ ID NOs: 8 to 11.

As used herein, a "Z70 analogue" or "Z70 derivative" refers to a single domain antibody exhibiting at least the same, or better, binding to Tau protein and at least one of the biological activities of a single domain antibody Z70 with a VH of SEQ ID NO: 2. The Z70 analogue may for example be characterized in that it is capable of inhibiting pathological aggregation of Tau protein through experiments (see Example 1: Aggregation seeding assays in HEK293 reporter cell-line). Briefly, the cell line constitutively expresses Tau RD (MTBD), with a P301S mutation, fused to either CFP (Cyan Fluorescent Protein) or YFP (Yellow Fluorescent Protein) that together generate a FRET (Forster Resonance Energy Transfer) signal upon MTBD-P301S aggregation. The intracellular aggregation of MTBD-P301S protein is induced by treating the cells with Tau seeds, the MTBD fragment in vitro aggregated in HEPES buffer with heparin, associated to liposomes to help cell penetration, leading to a FRET signal (Holmes et al. 2014).

The biological activities of the antibody of the invention are, for example, to reduce the level of pathological aggregation of Tau protein as described above. The evaluation of the Tau pathological aggregation level allows to determine the therapeutic properties of the antibody such as the correction of cognitive impairment observed in tauopathies.

Said antibodies may be assayed for specific binding by any method known in the art. Many different competitive binding assay format(s) can be used for epitope binding. The immunoassays which can be used include, but are not limited to, competitive assay systems using techniques such as western blots, radioimmunoassays, ELISA, "sandwich" immunoassays, immunoprecipitation assays, precipitin assays, gel diffusion precipitin assays, immunoradiometric assays, fluorescent immunoassays, protein A immunoassays, and complement-fixation assays. Such assays are routine and well known in the art (see, e.g., Ausubel et al., eds, 1994 Current Protocols in Molecular Biology, Vol. 1, John Wiley & sons, Inc., New York). For example, the BIACORE® (GE Healthcare, Piscataway, NJ) is one of a variety of surface plasmon resonance assay formats that are routinely used to epitope bin panels of monoclonal antibodies. Additionally, routine cross-blocking assays such as those described in Antibodies, A Laboratory Manual, Cold Spring Harbor Laboratory, Ed Harlow and David Lane, 1988, can be performed.

In another embodiment the invention related to an isolated anti-Tau single domain antibody, comprising a heavy chain (VH) having the following sequence:

```
                                            (SEQ ID NO 20)
M-A-E-V-Q-L-Q-A-S-G-G-V-F-V-Q-S-G-G-S-L-R-L-Xaa1-
C-A-A-S-G-A-T-S-Xaa2-F-D-G-M-G-W-F-R-Q-A-P-G-K-E-
Xaa3-E-F-V-S-A-I-S -Y- Xaa4-Q-G-S-Y-T-Y-Y-A-D-S-V-
K-G-R-F-T-I-S-R-D-N-S-K-N-M-V-Y-L-Q-M-N-S-L-Xaa5-
A-E-D-T-A- Xaa6-Y-Y-C-A Xaa7-A-Y-E-G-D-L-Y-A-F-D-
S-Y- Xaa8- Xaa9-Q-G-T-Q-V-T-V-S-S-
```

Wherein Xaa1 is Serine (S) or Cystein (C)
Wherein Xaa2 is Threonine (T) or Cystein (C)
Wherein Xaa3 is Arginine (R) or Lysine (K)
Wherein Xaa4 is Glutamic acid (E) or Glycine (G)
Wherein Xaa5 is Arginine (R) or Glycine (G)
Wherein Xaa6 is Threonine (T)) or Serine (S)
Wherein Xaa5 is Proline (P) or Serine (S)
Wherein Xaa8 is Glycine (G) or Glutamic acid (E)
Wherein Xaa9 is Glycine (G) or Glutamic acid (E)

In this embodiment, the isolated single domain antibody according to the invention has the sequence of variable heavy chain (VH) set forth as SEQ ID NO:20.

The sequences of the domains (CDRs or FRs) for the variable heavy chain (VH) in this embodiment are described below:

```
VH FR1
                                            (SEQ ID NO 21)
M-A-E-V-Q-L-Q-A-S-G-G-V-F-V-Q-S-G-G-S-L-R-L-Xaa1-
C-A-A-S-G
```

Wherein Xaa1 is Serine (S) or Cystein (C)

```
        VH-CDR1
                                            (SEQ ID NO 22)
            A-T-S- Xaa2-F-D-G
```

Wherein Xaa2 is Threonine (T) or Cystein (C)

```
    VH-FR2
                                            (SEQ ID No 23)
        M-G-W-F-R-Q-A-P-G-K-E-Xaa3-E-F-V-S-A-I-S
```

Wherein Xaa3 is Arginine (R) or Lysine (K)

```
        VH-CDR2
                                            (SEQ ID No 24)
                Y-Xaa4-Q-G-S-Y-T
```

Wherein Xaa4 is Glutamic acid (E) or Glycine (G)

```
    VH-FR3
                                            (SEQ ID No 25)
        Y-Y-A-D-S-V-K-G-R-F-T-I-S-R-D-N-S-K-N-M-V-
        Y-L-Q-M-N-S-L-Xaa5-A-E-D-T-A-Xaa6-Y-Y-C-A
```

Wherein Xaa5 is Arginine (R) or Glycine (G)
Wherein Xaa6 is Threonine (T)) or Serine (S)

```
        VH-CDR3
                                            ((SEQ ID No 26)
            Xaa7-A-Y-E-G-D-L-Y-A-F-D-S
```

Wherein Xaa7 is Proline (P) or Serine (S)

```
        VH-FR4
                                            (SEQ ID No 27)
            Y-Xaa8-Xaa9-Q-G-T-Q-V-T-V-S-S-
```

Wherein Xaa8 is Glycine (G) or Glutamic acid (E)
Wherein Xaa9 is Glycine (G) or Glutamic acid (E)

In some embodiments, the invention relates to an isolated anti-Tau single domain antibody according to the invention, wherein Xaa5 is Arginine (R); Xaa7 is Proline (P) and Xaa8 is Glycine (G).

In another embodiments the invention related to an isolated single domain antibody according to the invention comprises a CDR1 having a sequence set forth as SEQ ID NO: 22, a CDR2 having a sequence set forth as SEQ ID NO:24 and a CDR3 having a sequence set forth as SEQ ID NO:26.

Single Domain Antibody (Z70) Polypeptide and Derivatives Monospecific

A further aspect of the invention refers to a polypeptide comprising at least one single domain antibody of the invention.

Typically, the polypeptide of the invention comprises a single domain antibody of the invention, which is fused at its N terminal end, at its C terminal end, or both at its N terminal end and at its C terminal end to at least one further amino acid sequence, i.e. so as to provide a fusion protein. According to the invention the polypeptides that comprise a sole single domain antibody are referred to herein as "monovalent" polypeptides. Polypeptides that comprise or essentially consist of two or more single domain antibodies according to the invention are referred to herein as "multivalent" polypeptides.

In some embodiments, the two or more single domain antibodies according to the invention ("multivalent" polypeptides) can be linked to each other directly (i.e. without use of a linker) or via a linker.

The linker is typically a linker peptide and will, according to the invention, be selected so as to allow binding of the two single domain antibodies to the same epitopes of two different Tau protein. Suitable linkers inter alia depend on the epitopes and, specifically, the distance between the epitopes on two different Tau protein to which the single domain antibodies bind, and will be clear to the skilled person based on the disclosure herein, optionally after some limited degree of routine experimentation. Also, when the two single domain antibodies that bind to two different Tau protein may also be linked to each other via a third single domain antibody (in which the two single domain antibodies may be linked directly to the third domain antibody or via suitable linkers). Such a third single domain antibody may for example be a single domain antibody that provides for an increased half-life. For example, the latter single domain antibody may be a single domain antibody that is capable of binding to a (human) serum protein such as (human) serum albumin or (human) transferrin, as further described herein. In some embodiments, two or more single domain antibodies that bind to different Tau protein are linked in series (either directly or via a suitable linker) and the third (single) single domain antibody (which may provide for increased half-life, as described above) is connected directly or via a linker to one of these two or more aforementioned single domain antibodies.

Suitable linkers are described herein in connection with specific polypeptides of the invention and may—for example and without limitation—comprise an amino acid sequence, which amino acid sequence preferably has a length of 9 or more amino acids, more preferably at least 17 amino acids, such as about 20 to 40 amino acids. However, the upper limit is not critical but is chosen for reasons of convenience regarding e.g. biopharmaceutical production of such polypeptides. The linker sequence may be a naturally occurring sequence or a non-naturally occurring sequence. If used for therapeutical purposes, the linker is preferably non-immunogenic in the subject to which the anti-Tau protein polypeptide of the invention is administered. One useful group of linker sequences are linkers derived from the hinge region of heavy chain antibodies as described in WO 96/34103 and WO 94/04678. Other examples are polyalanine linker sequences such as Ala-Ala-Ala. Further preferred examples of linker sequences are Gly/Ser linkers of different length including (gly4ser)3, (gly4ser)4, (gly4ser), (gly3ser), gly3, and (gly3ser2)3.

According to a specific embodiment, the at least two single domain antibodies according to the invention ("monospecific multivalent" polypeptides) are connected with linkers derived from the hinge region of heavy chain antibodies. Such polypeptides are also called "minibody" The term "minibody" corresponds to an antibody format containing the CH3 domain of the Fc fragment (from classic Ig) followed by a hinge sequence fused to a VHH (or a ScFv domain (example of "minibody" with ScFv domain are described in Hu S Z et al Cancer Research 56. 3055-3061. Jul. 1, 1996; Kim Y P et al PLOS ONE DOI:10.1371/journal.pone.0113442 Dec. 1, 2014; NUNEZ-PRADO N. et al Drug Discovery Today Volume 20, Number 5 May 2015 and WO 94/04678).

Accordingly, the minibody can be defined as an amino acid sequence with the general structure: CH3-Hinge-VHH.

In some embodiments, a polypeptide comprising at least one single domain antibody according to the invention has the sequence set forth as SEQ ID NO:29 ("minibody Z70").

The Aminoacids sequence of the full minibody (including the VHH Z70) are described below:

(SEQ ID NO: 29)
MYRMQLLSCIALSLALVTNSISAMAEVQLQASGGVFVQSGGSLRLSC

AASGATSTFDGMGWFRQAPGKEREFVSAISYEQGSYTYYADSVKGRF

TISRDNSKNMVYLQMNSLRAEDTATYYCAPAYEGDLYAFDSYGGQGT

-continued

QVTVSSAAARSPPLKECPPCAAPDLLGGPSVFIFPPKIKDVLMISLS

PMVTCVVVDVSEDDPDVQISWFVNNVEVHTAQTQTHREDYNSTLRVV

SALPIQHQDWMSGKEFKCKVNNRALPSPIEKTISKPRGPVRAPQVYV

LPPPAEEMTKKEFSLTCMITGFLPAEIAVDWTSNGRTEQNYKNTATV

LDSDGSYFMYSKLRVQKSTWERGSLFACSVVHEGLHNHLTTKTISRS

LGK

AA1-20: ILss sequence (signal peptide)
AA24-147: VHH (Z70 t)
AA153-379: minibody CH3 sequence
Example of plasmid nucleic sequence with Z70 minibody are described in SEQ ID NO:32.

According to the invention, the single domain antibodies and polypeptides of the invention may be produced by conventional automated peptide synthesis methods or by recombinant expression. General principles for designing and making proteins are well known to those of skill in the art. The single domain antibodies and polypeptides of the invention may be synthesized in solution or on a solid support in accordance with conventional techniques. Various automatic synthesizers are commercially available and can be used in accordance with known protocols as described in Stewart and Young; Tam et al., 1983; Merrifield, 1986 and Barany and Merrifield, Gross and Meienhofer, 1979. The single domain antibodies and polypeptides of the invention may also be synthesized by solid-phase technology employing an exemplary peptide synthesizer such as a Model 433A from Applied Biosystems Inc. The purity of any given protein; generated through automated peptide synthesis or through recombinant methods may be determined using reverse phase HPLC analysis. Chemical authenticity of each peptide may be established by any method well known to those of skill in the art. As an alternative to automated peptide synthesis, recombinant DNA technology may be employed wherein a nucleotide sequence which encodes a protein of choice is inserted into an expression vector, transformed or transfected into an appropriate host cell and cultivated under conditions suitable for expression as described herein below. Recombinant methods are especially preferred for producing longer polypeptides.

Multispecific

In some embodiments, the polypeptide comprises at least one single domain antibody of the invention and at least one other binding unit (i.e. directed against another epitope, antigen, target, protein or polypeptide), which is typically also a single domain antibody. Such a polypeptide is referred to herein as "multispecific" polypeptide; in opposition to a polypeptide comprising the same single domain antibodies ("monospecific" polypeptide). Thus, in some embodiments, the polypeptide of the invention may also provide at least one further binding site directed against any desired protein, polypeptide, antigen, antigenic determinant or epitope. Said binding site is directed against to the same protein, polypeptide, antigen, antigenic determinant or epitope for which the single domain antibody of the invention is directed against, or may be directed against a different protein, polypeptide, antigen, antigenic determinant or epitope) from the single domain antibody of the invention.

Typically, the one or more further binding site may comprise one or more parts, fragments or domains of conventional chain antibodies (and in particular human antibodies) and/or of heavy chain antibodies. For example, a single domain antibody of the invention may be linked to a conventional (typically human) VH or VL optionally via a linker sequence.

A "bispecific" polypeptide of the invention is a polypeptide that comprises at least one single domain antibody directed against a first antigen (i.e. Tau protein) and at least one further binding site directed against a second antigen (i.e. different from Tau protein), whereas a "trispecific" polypeptide of the invention is a polypeptide that comprises at least one single domain antibody directed against a first antigen (i.e. Tau protein), at least one further binding site directed against a second antigen (i.e. different from [antigen]) and at least one further binding site directed against a third antigen (i.e. different from both i.e. first and second antigen); etc.

In some embodiments, the polypeptide is as described in WO2006064136. In particular the polypeptide may consist of i) a first fusion protein wherein the CL constant domain of an antibody is fused by its N-terminal end to the C-terminal end to a single domain antibody according to the invention (i.e. a single antibody directed against Tau protein) and ii) a second fusion protein wherein the CH1 constant domain of an antibody is fused by its N-terminal end to the C-terminal end of a single domain antibody directed against an antigen different from Tau protein. In another particular embodiment, the polypeptide consists of a first fusion protein wherein the CH1 constant domain of an antibody is fused by its N-terminal end to the C-terminal end of a single domain antibody directed against an antigen different from Tau protein and a second fusion protein wherein the CL constant domain of an antibody is fused by its N-terminal end to the C-terminal end to a single domain antibody of the invention (i.e. Tau protein).

In some embodiments, the polypeptide is a biparatopic polypeptide. As used herein, the term "biparatopic" polypeptide means a polypeptide comprising a single domain antibody and a second single domain antibody as herein defined, wherein these two single domain antibodies are capable of binding to two different epitopes of one antigen (e.g. Tau protein), which epitopes are not normally bound at the same time by one monospecific immunoglobulin, such as e.g. a conventional antibody or one single domain antibody. The biparatopic polypeptides according to the invention are composed of single domain antibodies which have different epitope specificities, and do not contain mutually complementary variable domain pairs which bind to the same epitope. They do therefore not compete with each other for binding to Tau protein.

In some embodiments, the two single domain antibodies of the biparatopic polypeptide of the present invention can be linked to each other directly (i.e. without use of a linker) or via a linker.

The linker is typically a linker peptide and will, according to the invention, be selected so as to allow binding of the two single domain antibodies to each of their at least two different epitopes of Tau protein. Suitable linkers inter alia depend on the epitopes and, specifically, the distance between the epitopes on Tau protein to which the single domain antibodies bind, and will be clear to the skilled person based on the disclosure herein, optionally after some limited degree of routine experimentation. Also, when the two single domain antibodies that bind to Tau protein may also be linked to each other via a third single domain antibody (in which the two single domain antibodies may be linked directly to the third domain antibody or via suitable linkers). Such a third single domain antibody may for example be a single domain antibody that provides for an increased half-life. For example, the latter single domain antibody may be a single domain antibody that is capable of binding to a (human) serum protein such as (human) serum albumin or (human) transferrin, as further described herein. In some embodiments, two or more single domain antibodies that bind to Tau protein are linked in series (either directly or via a suitable linker) and the third (single) single domain antibody (which may provide for increased half-life, as described above) is connected directly or via a linker to one of these two or more aforementioned single domain antibodies. Suitable linkers are described herein in connection with specific polypeptides of the invention and may— for example and without limitation—comprise an amino acid sequence, which amino acid sequence preferably has a length of 9 or more amino acids, more preferably at least 17 amino acids, such as about 20 to 40 amino acids. However, the upper limit is not critical but is chosen for reasons of convenience regarding e.g. biopharmaceutical production of such polypeptides. The linker sequence may be a naturally occurring sequence or a non-naturally occurring sequence. If used for therapeutical purposes, the linker is preferably non-immunogenic in the subject to which the anti-Tau protein polypeptide of the invention is administered. One useful group of linker sequences are linkers derived from the hinge region of heavy chain antibodies as described in WO 96/34103 and WO 94/04678. Other examples are poly-alanine linker sequences such as Ala-Ala-Ala. Further preferred examples of linker sequences are Gly/Ser linkers of different length including (gly4ser)3, (gly4ser)4, (gly4ser), (gly3ser), gly3, and (gly3ser2)3.

Methods of Producing Antibodies of the Invention and Immunoconjugates

Methods for obtaining such antibodies are well known in the art.

Camel Ig can be modified by genetic engineering to yield a small protein having high affinity for a target, resulting in a low molecular weight antibody-derived protein known as a "nanobody" or "VHH". See U.S. Pat. No. 5,759,808 issued Jun. 2, 1998; see also Stijlemans, B. et al., 2004 J Biol Chem 279: 1256-1261; Dumoulin, M. et al., 2003 Nature 424: 783-788; Pleschberger, M. et al. 2003 Bioconjugate Chem 14: 440-448; Cortez-Retamozo, V. et al. 2002 Int J Cancer 89: 456-62; and Lauwereys, M. et al. 1998 EMBO J 17: 3512-3520. Engineered libraries of camelid antibodies and antibody fragments are commercially available, for example, from Ablynx, Ghent, Belgium. In certain embodiments herein, the single-chain camelid antibody or nanobody is naturally produced in the camelid animal, i.e., is produced by the camelid following immunization with Tau protein or a peptide fragment thereof, using techniques described herein for other antibodies. The Tau protein-binding camelid nanobody (VHH) is next engineered from the camelid single-chain antibodies. Selection is performed for example from a library of phage displaying appropriately mutagenized camelid nanobody (VHH) proteins using panning procedures with Tau protein as a target. Alternatively, VHHs can be selected from a naïve phage library (without immunization) using panning procedures with Tau protein as a target (see MOUTEL S. et al Elife. 2016 Jul. 19; 5. pii: e16228. doi: 10.7554/eLife.16228.).

A single domain antibody of the invention can be conjugated with a detectable label to form an immunoconjugate. Suitable detectable labels include, for example, a radioisotope, a fluorescent label, a chemiluminescent label, an enzyme label, a bioluminescent label or colloidal gold. Methods of making and detecting such detectably-labeled immunoconjugates are well-known to those of ordinary skill in the art, and are described in more detail below.

The detectable label can be a radioisotope that is detected by autoradiography. Isotopes that are particularly useful for the purpose of the present invention are 3H, 125I, 131I, 35S and 14C.

Immunoconjugates can also be labeled with a fluorescent compound. The presence of a fluorescently-labeled antibody is determined by exposing the immunoconjugate to light of the proper wavelength and detecting the resultant fluorescence. Fluorescent labeling compounds include fluorescein isothiocyanate, rhodamine, phycoerytherin, phycocyanin, allophycocyanin, o-phthaldehyde and fluorescamine.

Alternatively, immunoconjugates can be detectably labeled by coupling an antibody to a chemiluminescent compound. The presence of the chemiluminescent-tagged immunoconjugate is determined by detecting the presence of luminescence that arises during the course of a chemical reaction. Examples of chemiluminescent labeling compounds include luminol, isoluminol, an aromatic acridinium ester, an imidazole, an acridinium salt and an oxalate ester.

Similarly, a bioluminescent compound can be used to label immunoconjugates of the present invention. Bioluminescence is a type of chemiluminescence found in biological systems in which a catalytic protein increases the efficiency of the chemiluminescent reaction. The presence of a bioluminescent protein is determined by detecting the presence of luminescence. Bioluminescent compounds that are useful for labeling include luciferin, luciferase and aequorin.

Alternatively, immunoconjugates can be detectably labeled by linking an antibody to an enzyme. When the enzyme conjugate is incubated in the presence of the appropriate substrate, the enzyme moiety reacts with the substrate to produce a chemical moiety which can be detected, for example, by spectrophotometric, fluorometric or visual means. Examples of enzymes that can be used to detectably label polyspecific immunoconjugates include β-galactosidase, glucose oxidase, peroxidase and alkaline phosphatase.

An antibody of the invention may be labelled with a metallic chemical element such as lanthanides. Lanthanides offer several advantages over other labels in that they are stable isotopes, there are a large number of them available, up to 100 or more distinct labels, they are relatively stable, and they are highly detectable and easily resolved between detection channels when detected using mass spectrometry. Lanthanide labels also offer a wide dynamic range of detection. Lanthanides exhibit high sensitivity, are insensitive to light and time, and are therefore very flexible and robust and can be utilized in numerous different settings. Lanthanides are a series of fifteen metallic chemical elements with atomic numbers 57-71. They are also referred to as rare earth elements. Lanthanides may be detected using CyTOF technology. CyTOF is inductively coupled plasma time-of-flight mass spectrometry (ICP-MS). CyTOF instruments are capable of analyzing up to 1000 cells per second for as many parameters as there are available stable isotope tags.

Those of skill in the art will know of other suitable labels which can be employed in accordance with the present invention. The binding of marker moieties to single domain antibodies can be accomplished using standard techniques known to the art.

Moreover, the convenience and versatility of immunochemical detection can be enhanced by using monoclonal antibodies that have been conjugated with avidin, streptavidin, and biotin.

The single domain antibodies of the invention may be produced by any technique known in the art, such as, without limitation, any chemical, biological, genetic or enzymatic technique, either alone or in combination.

Knowing the amino acid sequence of the desired sequence, one skilled in the art can readily produce said antibodies, by standard techniques for production of polypeptides. For instance, they can be synthesized using well-known solid phase method, preferably using a commercially available peptide synthesis apparatus (such as that made by Applied Biosystems, Foster City, California) and following the manufacturer's instructions. Alternatively, antibodies of the invention can be synthesized by recombinant DNA techniques well-known in the art. For example, antibodies can be obtained as DNA expression products after incorporation of DNA sequences encoding the antibodies into expression vectors and introduction of such vectors into suitable eukaryotic or prokaryotic hosts that will express the desired antibodies, from which they can be later isolated using well-known techniques.

Accordingly, a further object of the invention relates to a nucleic acid sequence encoding a single domain antibody according to the invention.

In a particular embodiment, the invention relates to a nucleic acid sequence encoding the VH domain of the antibody of the invention (e.g. single domain antibody Z70). Example of nucleic sequence encoding the VH of Z70 in a plasmid are described in SEQ ID NO:31.

Typically, said nucleic acid is a DNA or RNA molecule, which may be included in any suitable vector, such as a plasmid, cosmid, episome, artificial chromosome, phage or a viral vector.

The terms "vector", "cloning vector" and "expression vector" mean the vehicle by which a DNA or RNA sequence (e.g. a foreign gene) can be introduced into a host cell, so as to transform the host and promote expression (e.g. transcription and translation) of the introduced sequence.

So, a further object of the invention relates to a vector comprising a nucleic acid of the invention. Such vectors may comprise regulatory elements, such as a promoter, enhancer, terminator and the like, to cause or direct expression of said antibody upon administration to a subject. Examples of promoters and enhancers used in the expression vector for animal cell include early promoter and enhancer of SV40, LTR promoter and enhancer of Moloney mouse leukemia virus, promoter and enhancer of immunoglobulin H chain and the like. Examples of plasmids include replicating plasmids comprising an origin of replication, or integrative plasmids, such as for instance pUC, pcDNA, pBR, and the like. Examples of viral vector include adenoviral, retroviral, herpes virus and AAV vectors. Such recombinant viruses may be produced by techniques known in the art, such as by transfecting packaging cells or by transient transfection with helper plasmids or viruses.

A further object of the present invention relates to a host cell which has been transfected, infected or transformed by a nucleic acid and/or a vector according to the invention and expressing a single domain antibody according to the invention.

Accordingly such recombinant host cells can be used for the production of antibodies of the invention.

The term "transformation" means the introduction of a "foreign" (i.e. extrinsic or extracellular) gene, DNA or RNA sequence to a host cell, so that the host cell will express the introduced gene or sequence to produce a desired substance, typically a protein or enzyme coded by the introduced gene or sequence. A host cell that receives and expresses introduced DNA or RNA bas been "transformed".

The nucleic acids of the invention may be used to produce an antibody of the invention in a suitable expression system. The term "expression system" means a host cell and compatible vector under suitable conditions, e.g. for the expression of a protein coded for by foreign DNA carried by the vector and introduced to the host cell. Common expression systems include E. coli host cells and plasmid vectors, insect host cells and Baculovirus vectors, and mammalian host cells and vectors. Other examples of host cells include, without limitation, prokaryotic cells (such as bacteria) and eukaryotic cells (such as yeast cells, mammalian cells, insect cells, plant cells, etc.). Specific examples include E. coli, Kluyveromyces or Saccharomyces yeasts, mammalian cell lines (e.g., Vero cells, CHO cells, 3T3 cells, COS cells, etc.) as well as primary or established mammalian cell cultures (e.g., produced from lymphoblasts, fibroblasts, embryonic cells, epithelial cells, nervous cells, adipocytes, etc.). Examples also include mouse SP2/0-Ag14 cell (ATCC CRL1581), mouse P3X63-Ag8.653 cell (ATCC CRL1580), CHO cell in which a dihydrofolate reductase gene (hereinafter referred to as "DHFR gene") is defective (Urlaub G et al; 1980), rat YB2/3HL.P2.G11.16Ag.20 cell (ATCC CRL1662, hereinafter referred to as "YB2/0 cell"), and the like.

The present invention also relates to a method of producing a single domain antibody according to the invention, said method comprising the steps of: (i) introducing in vitro or ex vivo a recombinant nucleic acid or a vector as described above into a competent host cell, (ii) culturing in vitro or ex vivo the recombinant host cell obtained (iii), recovering the expressed antibody.

Diagnostic and Therapeutic Methods of the Invention:

Single Domain antibodies of the present invention and immunoconjugates can be used for detecting human Tau protein (e.g. Fibrillary aggregates comprising thereof), and/or evaluating its amount in a biological sample, in particular a culture medium sample, a whole blood sample, a serum sample, a plasma sample, a cerebrospinal fluid sample, or a brain tissue sample. Therefore they can be used for diagnosing all diseases associated with abnormal Tau aggregate levels, whether they are associated or not with Tau phosphorylated.

Accordingly, the method of detection of the invention is consequently useful for the in vitro diagnosis of tauopathy.

The term "tauopathy" has its general meaning in the art and refers to a disease characterized by Tau aggregation (Buee et al. Biochem Soc Trans. 2010 August; 38(4):967-72.). Tauopathies include among others, Alzheimer's Disease, Down syndrome; Guam parkinsonism dementia complex; Dementia pugilistica and other chronic traumatic encephalopathies; myotonic dystrophies; Niemann-Pick disease type C; Pick disease; argyrophilic grain disease; Fronto-temporal dementia; Cortico-basal degeneration; Pallido-ponto-nigral degeneration; Progressive supranuclear palsy; and Prion disorders such as Gerstmann-Sträussler-Scheinker disease with tangles.

An object of the invention is a method for detecting human Tau protein and/or evaluating their amount in a biological sample, wherein said method comprises contacting said sample with an antibody or immunoconjugate of the invention under conditions allowing the formation of an immune complex between human Tau protein and said antibody/immunoconjugate, and detecting or measuring the immune complex formed.

The immune complex formed can be detected or measured by a variety of methods using standard techniques, including, by way of non-limitative examples, enzyme-linked immunosorbent assay (ELISA) or other solid phase immunoassays, radioimmunoassay, electrophoresis, immunofluorescence, or Western blot.

A further object of the invention is a method for diagnosing a tauopathy, wherein said method comprising evaluating the amount of human Tau protein, as indicated above, in a biological sample from a subject to be tested, and comparing the determined amount with a control value of Tau in a normal subject.

Finally, the invention also provides kits comprising at least one single domain antibody of the invention. Kits of the invention can contain a single domain antibody coupled to a solid support, e.g., a tissue culture plate or beads (e.g., sepharose beads). Kits can be provided which contain antibodies for detection and quantification of Tau protein in vitro, e.g. in an ELISA or a Western blot. Such single domain antibody useful for detection may be provided with a label such as a fluorescent or radiolabel.

A further object of the invention relates to a pharmaceutical composition comprising a single domain antibody or a nucleic acid sequence of the invention or a vector of the invention.

A further object of the invention relates to a pharmaceutical composition comprising a single domain antibody of the invention or a nucleic acid sequence of the invention or a vector of the invention for use in therapy.

A further object of the invention relates to a pharmaceutical composition comprising a single domain antibody of the invention or a nucleic acid sequence of the invention or a vector of the invention for use in the treatment of tauopathies.

A further object of the invention relates to a method for treating a tauopathy comprising administering a subject in need thereof with a therapeutically effective amount of a single domain antibody of the invention or the nucleic acid sequence of the invention or the vector of the invention.

By a "therapeutically effective amount" of the single domain antibody of the invention is meant a sufficient amount of the single domain antibody to treat said tauopathy, at a reasonable benefit/risk ratio applicable to any medical treatment. It will be understood, however, that the total daily usage of the antibodies and compositions of the present invention will be decided by the attending physician within the scope of sound medical judgment. The specific therapeutically effective dose level for any particular patient will depend upon a variety of factors including the disorder being treated and the severity of the disorder; activity of the specific antibody employed; the specific composition employed, the age, body weight, general health, sex and diet of the patient; the time of administration, route of administration, and rate of excretion of the specific antibody employed; the duration of the treatment; drugs used in combination or coincidental with the specific antibody employed; and like factors well known in the medical arts. For example, it is well known within the skill of the art to start doses of the compound at levels lower than those required to achieve the desired therapeutic effect and to gradually increase the dosage until the desired effect is achieved.

For administration, the single domain antibody of the invention or the fragment thereof is formulated as a pharmaceutical composition. A pharmaceutical composition comprising an antibody of the invention or a fragment thereof can be formulated according to known methods to prepare pharmaceutically useful compositions, whereby the therapeutic molecule is combined in a mixture with a pharmaceutically acceptable carrier. A composition is said to be a "pharmaceutically acceptable carrier" if its administration can be tolerated by a recipient patient. Sterile phosphate-buffered saline is one example of a pharmaceutically acceptable carrier. Formulations may further include one or more excipients, preservatives, solubilizers, buffering agents, albumin to prevent protein loss on vial surfaces, etc. The form of the pharmaceutical compositions, the route of administration, the dosage and the regimen naturally depend upon the condition to be treated, the severity of the illness, the age, weight, and sex of the patient, etc. The pharmaceutical compositions of the invention can be formulated for a topical, oral, parenteral, intranasal, intravenous, intramuscular, subcutaneous or intraocular. To prepare pharmaceutical compositions, an effective amount of the antibody may be dissolved or dispersed in a pharmaceutically acceptable carrier or aqueous medium. The pharmaceutical forms include sterile aqueous solutions or dispersions; formulations including sesame oil, peanut oil or aqueous propylene glycol; and sterile powders for the extemporaneous preparation of sterile injectable solutions or dispersions. It must be stable under the conditions of manufacture and storage and must be preserved against the contaminating action of microorganisms, such as bacteria and fungi. A single domain antibody of the invention can be formulated into a composition in a neutral or salt form. Pharmaceutically acceptable salts include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like. The carrier can also be a solvent or dispersion medium containing, for example, water, ethanol, polyol (for example, glycerol, propylene glycol, and liquid polyethylene glycol, and the like), suitable mixtures thereof, and vegetables oils. The proper fluidity can be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminium monostearate and gelatin.

The single domain antibodies of the invention may be formulated within a therapeutic mixture to comprise about 0.0001 to 1.0 milligrams, or about 0.001 to 0.1 milligrams, or about 0.1 to 1.0 or even about 10 milligrams per dose or so. Multiple doses can also be administered.

The invention will be further illustrated by the following figures and examples. However, these examples and figures should not be interpreted in any way as limiting the scope of the present invention.

FIGURES

FIG. 1. VHH E4-1 binds to the MTBR of Tau. A. Overlay of two-dimensional $^1$H, $^{15}$N HSQC spectra of Tau (black) with Tau mixed with non-labelled VHH E4-1 (overlayed in gray) (n=1). B. Same spectra enlargements showing broadened resonances corresponding to residues implicated in the interaction. C. Normalized intensities I/I0 of corresponding resonances in the two-dimensional spectra of Tau with equimolar quantity of VHH E4-1 (I) or free in solution (T0) for residues along the Tau sequence. Overlapping resonances are not considered (x-axis is not scaled). A double-arrow indicates the region containing the corresponding major broadened resonances, which was mapped to the R2-R3 repeats in the MTBD.

FIG. 2 VHH Z70 is optimized for intracellular activity and has a better affinity for Tau than VHH E4-1 A. Results from yeast two-hybrid. A growth test on non-selective medium (labeled growth, lacking only leucine and tryptophane) or on selective medium (labeled interaction, lacking leucine, tryptophane and histidine) was performed with dilutions 1/10, 1/100, 1/1000 and 1/10000 (top to bottom) of the diploid yeast culture expressing both bait and prey constructs. Positive and negative controls of interaction consist respectively in Smad/Smurf interaction[54] and Tau alone (empty vector). VHH E4-1 did not interact with Tau in yeast whereas VHH Z70 did. B. Structure of the VHHs and sequence alignment between VHH E4-1 and VHH Z70 resulting in 4 mutations in the framework domain: G12V, P16S, T81M and W114G. C, D. Sensorgrams (reference subtracted data) of single cycle kinetics analysis performed on immobilized biotinylated Tau, with five injections of VHH at 0.125 µM, 0.25 µM, 0.5 µM, 1 µM, and 2 µM. C of VHH E4-1 and D of VHH Z70 (n=1). Dissociation equilibrium constant Kd were calculated from the ratio of off-rate and on-rate kinetic constants koff/kon. E. Sensorgram (reference subtracted data) of single-cycle kinetics analysis performed on immobilized VHH Z70 on a CMS chip, with five injections of SUMO-Tau peptide Tau[273-318] (n=1). kon, Koff and KD are included in the table 3. Red line corresponds to the fit curve, black line to the measurement.

FIG. 3. VHH E4-1 and VHH Z70 inhibit in vitro Tau aggregation of Tau (10 µM) in the absence of heparin (black curve), in the presence of heparin and of increasing concentration of A. VHH F8-2 B. VHH E4-1 and C. VHH Z70 (0, 1, 2,5, 5 and 10 µM) followed by Thioflavin T fluorescence at 490 nm (n=3). Error bars: standard deviation.

Figure 4:
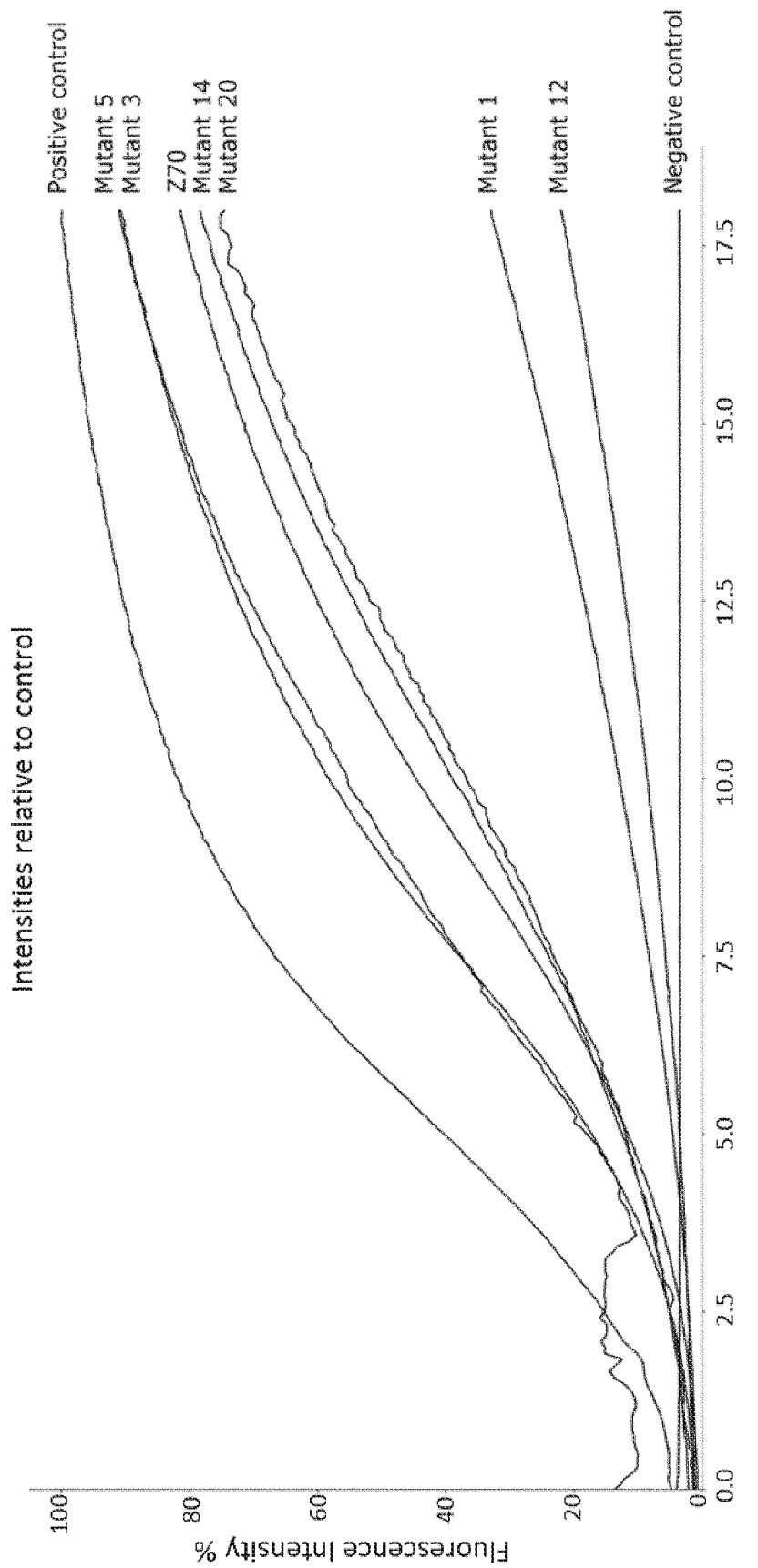

FIG. 4. VHH Z70 mutants inhibit in vitro Tau aggregation. Aggregation of Tau (10 µM) in the absence of heparin (negative control), in the presence of heparin and of VHH mutants (ratio 1 Tau/0.2 VHH) followed by Thioflavin T fluorescence at 490 nm. (n=3): Mean value is presented FIG. 5. VHH Z70 and optimized Z70 blocks intracellular aggregation of Tau MTBD in HEK 293 Tau RD P301S FRET Biosensor cells. A-D. Analysis of Tau seeding in HEK 293 Tau RD P301S FRET Biosensor cells A) by confocal microscopy for cells transfected with vehicle (HEPES buffer) B) by flow cytometry with a FRET-gate for cells transfected with vehicle C) by confocal microscopy for cells transfected with MTBD seeds. Positive cells that have incorporated MTBD seeds show yellow dots corresponding to FRET signal D) by flow cytometry with a FRET-gate for cells transfected with MTBD seeds. E. Percentage of FRET positive cells determined from FACS data for cells transfected as in B, D or transfected with mCherry-VHH F8-2 followed by MTBD seeds. F-I Analysis of Tau seeding in HEK 293 Tau RD P301S FRET Biosensor cells F-G by confocal microscopy for cells transfected with F) mCherry-VHH F8-2 or G) with mCherry VHH F8-2 followed by MTBD seeds. Cells transfected with mCherry-VHH have a red color, FRET is visualized as yellow dots H-I by flow cytometry with a mCherry FRET gate for cells transfected with H) mCherry-VHH F8-2 followed by MTBD seeds (n=3) or I) mCherry-VHH Z70 followed by MTBD seeds (n=3). J. Percentage of mCherry-gated FRET positive cells, determined from FACS data for cells transfected with mCherry-VHH, as stated on x-axis, followed by MTBD seeds (at minimum n=3). A significant decrease of FRET signal, reporting a decrease intracellular MTBD aggregation, is observed in the presence of VHH Z70 and mutated Z70. Error bars: standard deviations.

Figure 6:
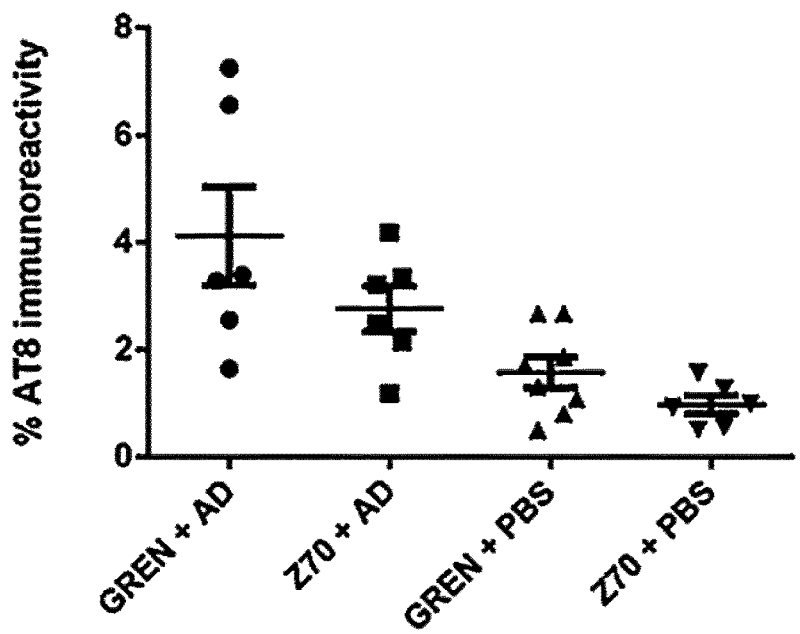

FIG. 6. Activity of VHH Z70 in ThyTau30 mouse model. A data point corresponds to the quantification for one hemisphere of the immunoreactive signal summed over 5 slices (at specific Bregma conserved for all animals). Results are presented as percentage of marker occupancy corresponding to the ratio of immunoreactive area normalized to the area of the region of interest. Lentiviral expression of VHH Z70 (Z70) or a VHH recognizing GFP (GREN), stereotaxic injection of AD brain lysates (AD) or PBS (PBS). Error bars correspond to the S.E.M.

TABLE 3

| VHH | Kon 1/M.s | Koff 1/s | KD (nM) |
| --- | --- | --- | --- |
| E4-1 | 4982 | 0.0017 | 345 |
| Z70 | 18100 | 0.0026 | 147 |

EXAMPLE 1: (SELECTION OF VHHS TARGETING TAU)

Materials and Methods

Screening and Selection of VHHs Directed Against Tau Protein

Recombinant Tau protein was biotinylated using EZ-Link™ Sulfo-NHS-Biotin (Thermo Fisher Scientific) using manufacturer conditions except for a two-fold molecular excess of Sulfo-NHS-Biotin. The unreacted Sulfo-NHS-Biotin was eliminated using Prepacked Columns Sepadextran™ 25 Medium SC (Proteigene). The Nali-H1 library of VHHs was screened against the recombinant biotinylated-Tau as described previously[44]. Briefly, biotinylated-Tau protein was bound to Dynabeads™ M-280 Streptavidin (Invitrogen) at each round of selection, at a concentration gradually decreased: 100 nM in round1, 50 nM in round 2 and 10 nM in round3. Biotinylated-Tau binding was verified by Western Blot using Streptavidin Protein, HRP (Thermo Fisher Scientific). 3×10[11] phages of the Nali-H1 library were used in the first round of selection. After the third round, 186 clones were randomly picked and tested in non-absorbed Phage ELISA assay using avidin-plates and biotinylated-Tau Antigen (5 µg/ml) for cross-validation[45].

Production and Purification of VHHs

Competent *Escherichia coli* BL21 (DE3) bacterial cells were transformed with the various PHEN2-VHH constructs. Recombinant *E. coli* cells produced proteins targeted to the periplasm after induction by 1 mM IPTG (isopropylthiogalactoside). Production was pursued for 4 hours at 28° C. before centrifugation to collect the cell pellet. Pellet was suspended in 200 mM Tris-HCl, 500 mM sucrose, 0.5 mM EDTA, pH 8 and incubated 30 min on ice. 50 mM Tris-HCl, 125 mM sucrose, 0.125 mM EDTA, pH 8 and complete protease inhibitor (Roche) were then added to the cells suspension and incubation continued 30 min on ice. After centrifugation, the supernatant, corresponding to the periplasmic extract, was recovered. The VHHs were purified by immobilized-metal affinity chromatography (HisTrap HP, 1 mL, GE healthcare) followed by size exclusion chromatography (Hiload 16/60, Superdex 75, prep grade, GE healthcare) in NMR buffer (50 mM NaPi pH 6.7, 30 mM NaCl, 2.5 mM EDTA, 1 mM DTT).

Production and Purification of Labelled $^{15}$N Tau 2N4R, $^{15}$N Tau 2N3R and $^{15}$N Tau MTBD pET15b-Tau recombinant T7lac expression plasmid was transformed into competent *E. coli* BL21 (DE3) bacterial cells. A small scale culture was grown in LB medium at 37° C. and was added at 1:10 V/V to 1 L of a modified M9 medium containing MEM vitamin mix 1× (Sigma-Aldrich), 4 g of glucose, 1 g of $^{15}$N—NH4Cl (Sigma-Aldrich), 0.5 g of $^{15}$N-enriched ISOGROW (Sigma-Aldrich), 0.1 mM CaCl2 and 2 mM MgSO4. Recombinant $^{15}$N Tau production was induced with 0.5 mM IPTG when the culture reached an optical density at 600 nm of 0.8. Proteins were first purified by heating the bacterial extract, obtained in 50 mM phosphate buffer pH 6.5, 2.5 mM EDTA and supplemented with complete protease inhibitors cocktail (Sigma-Aldrich), 15 min at 75° C. The resulting supernatant was next passed on a cation exchange chromatography column (Hitrap SP sepharose FF, 5 mL, GE healthcare) with 50 mM sodium phosphate buffer (NaPi) pH 6.5 and eluted with a NaCl gradient. Tau proteins were buffer-exchanged against 50 mM ammonium bicarbonate (Hiload 16/60 desalting column, GE Healthcare) for lyophilization. The same protocol was used to produce and purify Tau 2N3R isoform and Tau[245-368] (designated MTBD, also called K18 fragment). Detailed procedure can be found in[46].

Production and Purification of SUMO-Tau Peptides cDNA encoding Tau[273-318] peptide, was amplified from Tau 2N4R cDNA by PCR. cDNA was cloned by a ligation independent protocol into vector pETNKI-HisSUMO3-LIC as described in[47]. Tau peptide was expressed as N-terminal SUMO protein fusion with a N-terminal HisTag. His-SUMO-Tau peptide was purified by affinity chromatography on Ni-NTA resin followed by size exclusion chromatography (Hiload 16/60, Superdex 75, prep grade, GE healthcare) in SPR buffer (HBS-EP+, GE Healthcare).

Nuclear Magnetic Resonance Spectroscopy Experiments

Analysis of the $^{15}$N Tau/VHH interactions were performed at 298K on a Bruker 900 MHz spectrometer equipped with cryogenic probe. TMSP (trimethyl silyl propionate) was used as internal reference. Lyophilized $^{15}$N Tau were diluted in a buffer containing 50 mM NaPi, 30 mM NaCl, 2.5 mM EDTA, 1 mM DTT, and 10% D20, pH 6.7 and mixed with VHH at 100 µM final concentration for each protein. 200 µL of each mix in 3 mm tubes were sufficient to obtain the 2D $^1$H, $^{15}$N HSQC spectra. $^1$H, $^{15}$N HSQC were acquired with 3072 and 416 points in the direct and indirect dimensions, respectively for 12.6 and 25 ppm, in the $^1$H and $^{15}$N dimensions, respectively, with 32 scans. Data were processed with Bruker Topspin and analyzed with Sparky (T. D. Goddard and D. G. Kneller, SPARKY 3, University of California, San Francisco).

Optimization of VHH E4-1 for Intracellular Expression

VHH E4-1 cDNA was amplified from E4-1-pHEN2 plasmid using Taq polymerase with 14 mM MgCl2 and 0.2 mM MnCl2 and a modified nucleotide pool according to[48]. The amplified cDNAs were transformed in yeast Y187 strain, together with a digested empty derivative of pGADGH vector[49], allowing recombination by gap repair in the vector. The VHH cDNAs are expressed as preys, with an N-terminal Gal4-activation domain fusion (E4-1-Gal4AD). A library of 2.1 million clones was obtained, collected and aliquoted. Tau variant 0N4R isoform (NM_016834.4) was expressed as bait with an N-terminal fusion with lexA (Tau-LexA)

from pB29 vector, which is derived from the original pBTM116[50]. The library was screened at saturation, with 20 million tested diploids, using cell-to-cell mating protocol[51]. A single clone was selected, named VHH Z70. A one-to-one mating assay was used to test for interaction using a mating protocol with L40DGal4 (mata) transformed with the bait and Y187 (mata) yeast strains transformed with the prey[51]. The interaction pairs were tested in triplicate on selective media by streak.

Tau Fragment Library Construction

Tau cDNA (NM_016834.4) was amplified from Tau-LexA bait vector. 5 μg of the PCR product was subjected to Fragmentase® treatment (New England Biolab, NEB) until a smear of fragments was detected around 400-500 pb by agarose gel electrophoresis. The DNA fragments were purified by phenol/chloroform extraction and ethanol precipitation. The DNA fragments were next subjected to end repair (NEB) and dA-tailing adaptation, using Blunt/TA ligase master mix with NEBNext® Adaptor hairpin loop (NEB), followed by AMPure XP bead (Beckman Coulter) purification. After USER® enzyme digestion (NEB), DNA fragments were amplified with 15 cycles of PCR using NEB-Next® Q5® Hot Start HiFi PCR Master Mix (NEB), which allowed to add Gap Repair recombination sequences for the cloning in Gal4-AD prey plasmid pP7. The library comprised 50000 independent clones.

Tau Fragment Library Screening

The coding sequence for VHH Z70 was PCR-amplified and cloned into pB27 as a C-terminal fusion to LexA (LexA-VHHZ70). The construct was used to produce a bait to screen the Tau fragments library constructed into pP7. pB27 and pP7 derived from the original pBTM116[50] and pGADGH[49] plasmids, respectively. The Tau fragment library was screened using a mating approach with YHGX13 (Y187 ade2-101::loxP-kanMX-loxP, mata) and L40DGal4 (mata) yeast strains[51]. 90 His+ colonies corresponding to 267.103 tested diploids were selected on a medium lacking tryptophan, leucine and histidine. The prey fragments of the positive clones were amplified by PCR and sequenced at their 5' and 3' junctions.

Surface Plasmon Resonance Experiments

Affinity measurements were performed on a BIAcore T200 optical biosensor instrument (GE Healthcare). Recombinant Tau proteins were biotinylated with 5 molar excess of NHS-biotin conjugates (Thermofisher) during 4 hours at 4° C. Capture of biotinylated Tau was performed on a streptavidin SA sensorchip in HBS-EP+ buffer (GE Healthcare). One flow cell was used as a reference to evaluate nonspecific binding and provide background correction. Biotinylated-Tau was injected at a flow-rate of 30 μL/min, until the total amount of captured Tau reached 500 resonance units (RUs). VHHs were injected sequentially with increasing concentrations ranging between 0.125 and 2 μM in a single cycle, with regeneration (3 successive washes of 1M NaCl) between each VHH. On the other hand, VHH Z70 was immobilized on a CMS chip in HBS-EP+ buffer (GE Healthcare) and increasing concentrations, ranging between 0.125 and 2 μM of the SUMO-Tau peptide, were successively injected. Single-Cycle Kinetics (SCK) analysis[52] was performed to determine association kon and dissociation Koff rate constants by curve fitting of the sensorgrams using the 1:1 Langmuir model of interaction of the BIAevaluation sotware 2.0 (GE Healthcare). Dissociation equilibrium constants (KD) was calculated as kon/Koff.

Results

Figure 1B:
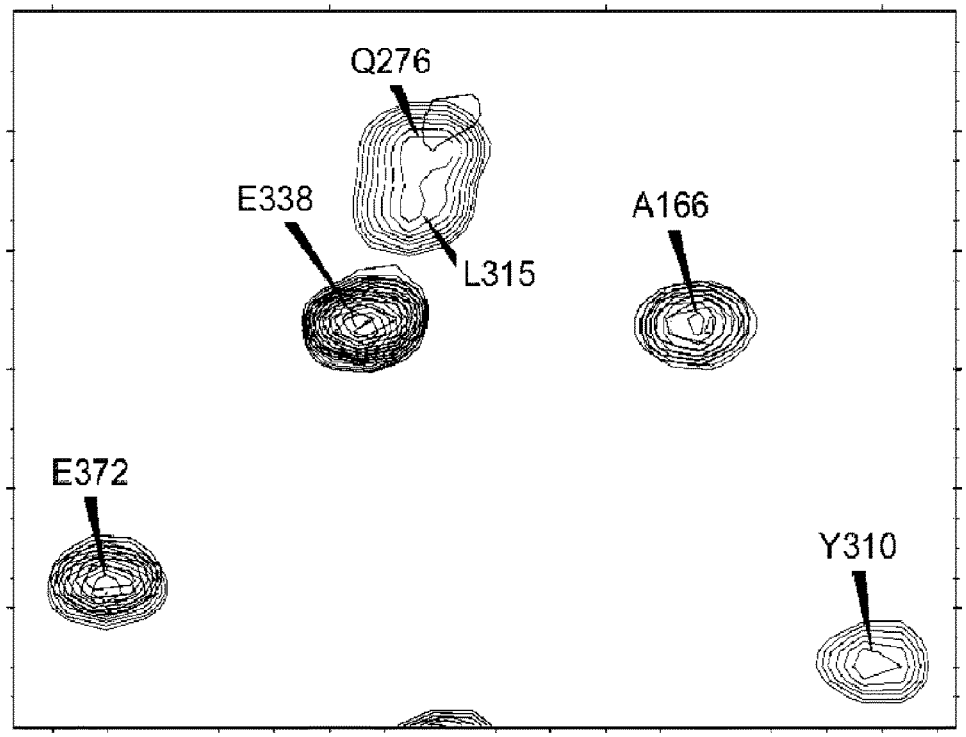
Figure 1B:
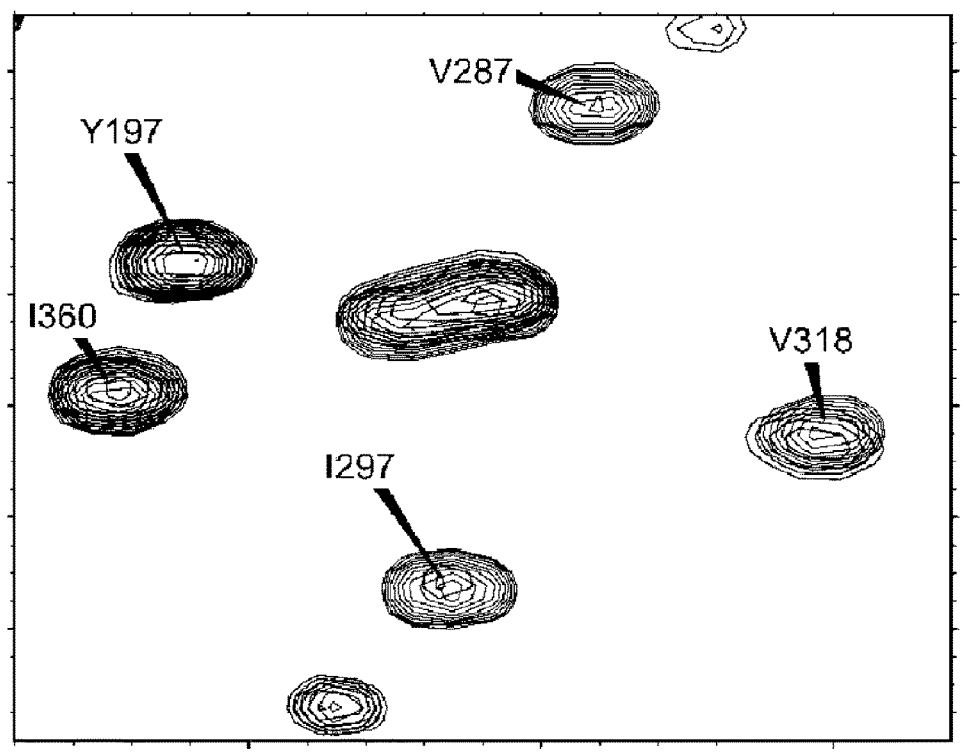
Figure 1C:

Identification of a Synthetic VHH Directed Against Tau Microtubule-Binding Domain A synthetic phage-display library of humanized llama single-domain antibody (Moutel et al., 2016) was screened against a preparation of biotinylated recombinant full-length Tau protein, corresponding to its longest isoform (Tau 2N4R, designated as Tau). After validation with non-absorbed phage ELISA, 20 clones were selected from the screen for further analysis. We used nuclear magnetic resonance (NMR) spectroscopy to identify the epitope site recognized by each of the validated VHHs, based on resonance perturbation mapping in $^1$H, $^{15}$N HSQC spectra of $^{15}$N-Tau. Interaction was visualized as a perturbation of resonance that can be a modification of the chemical shift value or of the peak intensity when comparing spectra of Tau alone in solution or in the presence of a VHH. As most of the resonances from the $^1$H, $^{15}$N spectrum of Tau have been assigned[28,29], each perturbation can be linked to a specific amino acid residue in Tau sequence. One VHH, named VHH E4-1, affected resonances in Tau spectrum corresponding to residues in the MTBD (FIG. 1). In the spectrum of Tau in the presence of VHH E4-1, a number of resonances are broadened beyond detection compared to the Tau control spectrum (FIG. 1a). Intensity ratios of corresponding resonances in these two spectra, plotted along the Tau sequence, allowed the identification of the Tau MTBD domain as the target of VHH E4-1 interaction (FIG. 1b). The epitope mapping was refined using a Tau fragment that corresponded to the isolated MTBD. The smaller size of this Tau fragment resulted in less resonance overlap in the corresponding Tau[245-368]$^1$H, $^{15}$N spectrum and made identification of the binding site easier. The affected resonances corresponded to amino acid residues located in a stretch expanding from residue V275 to K317 (data not shown). VHH E4-1 thus bound within the R2-R3 repeats of the MTBD.

Optimization of Lead VHH E4-1 into Variant VHH Z70

Figure 2D:
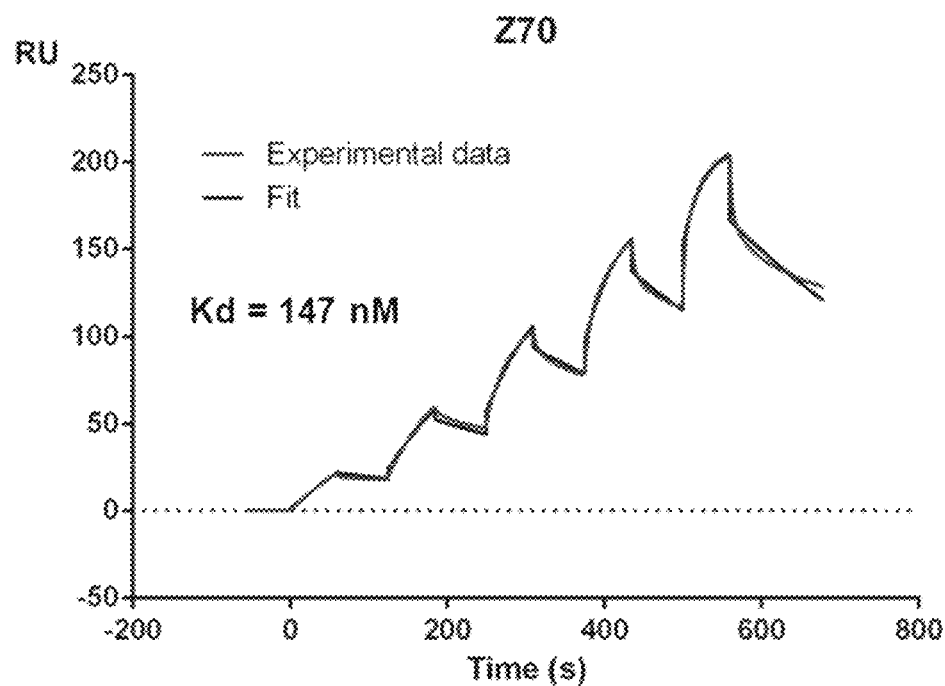
Figure 2E:
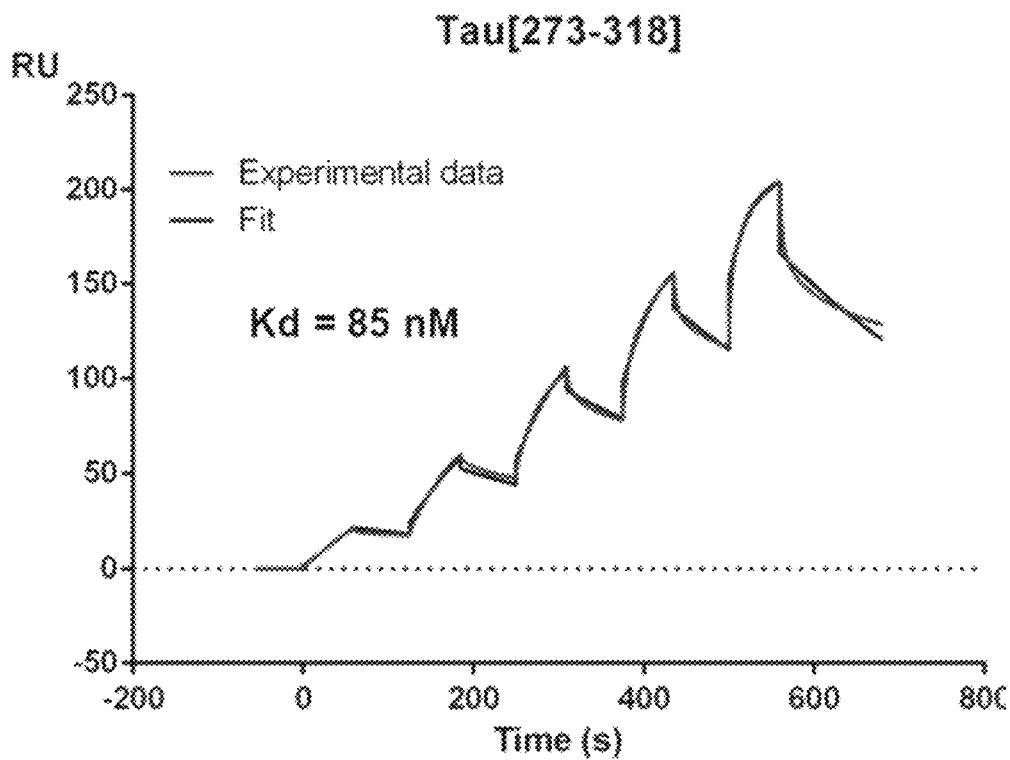

An important property of a VHH is its capacity to be produced and to recognize its targets in the cytoplasmic environment, inside the cells. However, VHHs might not all be efficient once expressed in a cell, due to improper folding and/or poor stability. Indeed, VHH E4-1 proved to be a poor binder of Tau when using Yeast 2-Hybrid to test its intracellular binding capacity[30,31] (FIG. 2a). VHH E4-1 was thus next submitted to a round of optimization, using yeast two-hybrid system, to maximize its capacity to recognize its target when expressed in a cellular environment. First, we built a cDNA mutant library by random mutagenesis, targeting the whole sequence of VHH E4-1 to produce a variety of VHH preys (C-terminal Gal4-activation domain fusion) against the Tau bait (N-terminal LexA fusion). The library was transformed in yeast and screen by cell-to-cell mating to get positive colonies in conditions corresponding to undetected VHH E4-1-Tau interaction (FIG. 2a). An optimized mutant, named VHH Z70, was selected, resulting from 4 mutations G12V, P16S, T81M and W114G located in the framework domains, outside the recognition loops or CDR (FIG. 2a-b), suggesting that the epitope recognized by this mutant is unaltered. Conservation of the epitope was confirmed by resonance perturbation mapping, using labelled MTBD in the same manner as for the lead VHH E4-1. Interaction of VHH E4-1 and VHH Z70 with Tau were further characterized using surface plasmon resonance spectroscopy (SPR) with biotinylated-Tau immobilized at the surface of a streptavidin-functionalized chip. The assay provided the kinetic parameters of the interaction, characterized by dissociation constants Kd of 345 nM for VHH E4-1 (FIG. 2c) and of 147 nM for mutant VHH Z70 (FIG. 2d). VHH Z70, optimized for intracellular activity, had a better affinity for its target than VHH E4-1, the major optimization concerning the association constant (kon). SPR was additionally performed with VHH Z70 immobilized on the chips. A fusion protein corresponding to a SUMO domain fused at its C-terminus to a Tau peptide [273-318], corresponding to the identified VHH binding site, was injected into the flux. VHH Z70 interacted with the fused peptide with a Kd of 85 nM (FIG. 2e), confirming that the region 275 to 317 in Tau sequence was sufficient for VHH-Z70 binding.

Identification of the Minimal Tau Epitope Recognized by VHH Z70

The binding site identified by NMR for both lead VHH E4-1 and optimized VHH Z70 was larger than expected for an epitope, about 40 contiguous amino-acid residues showing strong reduction of their resonance intensities (275 to 317). However, the NMR epitope mapping by resonance intensity decrease does not allow identification of the residues in a direct interaction. The decrease in resonance intensity can result from local immobilization of the disordered protein due to the binding, decreasing local tumbling and increasing relaxation. Accordingly, the Tau domain involved in the VHH interaction, which contained the PHF6 and PHF6*, was described as presenting local extended secondary structure[29] and thus represented a relatively rigid stretch that could explain the extended region of immobilization upon binding. Alternatively, decrease resonance intensity can be due to chemical exchange between bound and unbound states that can result in line broadening, depending on the affinity and chemical shift change resulting from the interaction. In this case, the observed binding in the repeat region of Tau, given the level of sequence redundancy, could correspond to binding to R2 or R3 repeats, even if one is a secondary site of low affinity. To lift the ambiguity, and determine the minimal epitope that VHH Z70 can recognize, an epitope mapping was performed using yeast two-hybrid (267.103 tested interactions) with a library of Tau fragments as preys (GAL4 activation domain-Tau_fragments), and VHH Z70 as bait (LexA-VHH fusion). 90 positive clones were selected from a small-scale cell-to-cell mating screen. Comparison of the Tau prey fragment sequences corresponding to these 90 interactions identified peptide $_{305}$SVQIVYKPV$_{313}$ (SEQ ID No 1) as the minimal recognition sequence of Tau that VHH Z70 can bind. The sequence is localized in the R3 repeat of the MTBD domain and contains the PHF6 peptide VQIVYK (SEQ ID No 19). We next used Tau2N3R isoform, which lacks the R2 repeat and so does not contain the PHF6* peptide, to confirm that the R3 repeat, containing the PHF6 peptide, was sufficient for the interaction. As observed in the resonance intensity profile, the interaction of VHH Z70 with Tau2N3R is maintained, and the most affected resonances in the Tau spectrum corresponded to the PHF6 residues in the R3 repeats.

EXAMPLE 2: (VARIANTS OF Z70)

Materiel and Methods
Optimization of VHH Z70

VHH Z70 was amplified from pHEN2 plasmid using Taq polymerase with 14 mM MgCl2 and 0.2 mM MnCl2 and a modified nucleotide pool according to[48]. The amplified cDNAs were transformed in yeast Y187 strain, together with a digested empty derivative of pGADGH vector 49, allowing recombination by gap repair in the vector. The VHH cDNAs are expressed as preys, with a C-terminal Gal4-activation domain fusion (Gal4AD-Z70). A library of 2.1 million clones was obtained, collected and aliquoted. Tau variant 0N4R isoform (NM_016834.4) was expressed as bait with an N-terminal fusion with lexA (Tau-LexA) from pB29 vector, which is derived from the original pBTM116[50]. The library was screened with 0.5 mM 3-aminotriazol at saturation, with 40 million tested diploids, using cell-to-cell mating protocol[51]. Most redundant mutants with 1 to 4 mutations were selected for further analysis.

Surface Plasmon Resonance Experiments

Affinity measurements were performed on a BIAcore T200 optical biosensor instrument (GE Healthcare). Recombinant Tau proteins were biotinylated with 5 molar excess of NHS-biotin conjugates (Thermofisher) during 4 hours at 4° C. Capture of biotinylated Tau was performed on a streptavidin SA sensorchip in HBS-EP+ buffer (GE Healthcare). One flow cell was used as a reference to evaluate nonspecific binding and provide background correction. Biotinylated-Tau was injected at a flow-rate of 30 µL/min, until the total amount of captured Tau reached 500 resonance units (RUs). VHHs were injected sequentially with increasing concentrations ranging between 0.125 and 2 µM in a single cycle, with regeneration (3 successive washes of 1M NaCl) between each VHH. Single-Cycle Kinetics (SCK) analysis[52] was performed to determine association kon and dissociation Koff rate constants by curve fitting of the sensorgrams using the 1:1 Langmuir model of interaction of the BIAevaluation sotware 2.0 (GE Healthcare). Dissociation equilibrium constants (Kd) was calculated as kon/Koff.

Results
Optimization of VHH Z70

A mutant library of VHH Z70 has been screened for mutants displaying a stronger affinity in yeast two-hybrid system as described above. 8 mutants were selected and their affinity have been further characterized using SPR experiments. All the selected mutants displayed an enhanced affinity toward Tau protein (cf table 4), the best having a KD of 22.6 nM meaning an improvement of more than 6 times.

TABLE 4

| VHH | kon 1/M.s | Koff 1/s | KD (nM) |
| --- | --- | --- | --- |
| Z70 | 1.81E+04 | 0.002671 | 147 |
| Mut1 | 1.07E+05 | 0.0024213 | 22.6 |
| Mut3 | 2.60E+04 | 0.0020972 | 80.5 |
| Mut5 | 1.09E+04 | 0.0008825 | 80.8 |
| Mut9 | 4.01E+04 | 0.0020485 | 51 |
| Mut12 | 3.39E+04 | 0.0020714 | 61.1 |
| Mut14 | 1.88E+04 | 0.0013966 | 74.2 |
| Mut15 | 2.13E+04 | 0.0020344 | 95.6 |
| Mut20 | 2.12E+04 | 0.0008902 | 41.8 |

EXAMPLE 3: (INHIBITION OF TAU AGGREGATION)

Materiel and Methods
In Vitro Kinetic Aggregation Assays

Tau 2N4R aggregation assays were performed with 10 µM Tau and with increasing concentrations of VHHs (between 0 and 10 µM) in buffer containing 50 mM IVIES pH 6.9, 3 mM NaCl, 2.5 mM EDTA, 0.33 mM freshly prepared DTT, 2.5 mM heparin H3 (Sigma-Aldrich) and 50 µM Thioflavin T (Sigma-Aldrich), at 37° C. Experiments were reproduced 3 times in triplicates for each condition. The resulting fluorescence of Thioflavin T was recorded every 5 min/cycle within 200 cycles using PHERAstar plate-reader.

The different measures were normalized in % of fluorescence, 100% being defined as the maximum value reached in the positive Tau control, in each experiment.

Transmission Electron Microscopy

The same samples from the aggregation assays were recovered and a 10 μl sample of each Tau:VHH ratio 1:1 condition was loaded on a formvar/carbon-coated grid (for 5 min and rinsed twice with water). After drying, the grids were stained with 1% uranyl acetate for 1 min. Tau fibrils were observed under a transmission electron microscope (EM 902 Zeiss).

Aggregation Seeding Assays in HEK293 Reporter Cell-Line

Stable HEK293 Tau RD P301S FRET Biosensor cells (ATCC CRL-3275) were plated at a density of 100 k cells/well in 24-well plates. For confocal analysis, cells were plated on poly-D-lysine and laminin coated slides at a density of 100 k cells/well in 24-well plates. At 60% confluency, cells were first transfected with the various pmCherry-N1 plasmid constructs allowing expression of the mCherry-VHHs. Transfection complexes were obtained by mixing 500 ng of plasmid diluted in 40 μL of opti-MEM medium, which include 18.5 μL (46.25% v/v) of opti-MEM medium+1.5 μL (3.75% v/v) Lipofectamine 2000 (Invitrogen). Resulting liposomes were incubated at room temperature for 20 min before addition to the cells. Cells were incubated for 24 hours with the liposomes and 1 mL/well of high glucose DMEM medium (ATCC) with Fetal Bovine Serum 1% (Life technologies). The transfection efficiency was estimated to reach about 46%, for all mCherry-VHHs plasmids. Eight μM of recombinant MTBD seeds were prepared in vitro, in the presence of 8 μM heparin, as described[32]. Cells were then treated with MTBD seeds (10 nM/well) in the presence of transfection reagents forming liposomes as here above described.

Confocal Analysis

Cells were first washed twice with PBS and fixed in 4% paraformaldehyde for 20 min and next washed 3 times with 50 mM NH4Cl in PBS. Glass slides were mounted with DAKO mounting medium (Agilent). Fluorescence imaging acquisitions were performed using an inverted confocal microscope (LSM 710, Zeiss, Jena, Germany) with a 40-times oil-immersion lens (NA 1.3 with an optical resolution of 176 nm). CFP, YFP and FRET, and mCherry fluorescence were imaged using UV, Argon 458/514 nm, DPSS 561 nm and Helium/Neon 633 nm lasers, respectively. A focal plane was collected for each specimen. Images were processed with ZEN software.

FRET Flow Cytometry

Cells were recovered with trypsin 0.05% and fixed in 2% paraformaldehyde for 10 min, then suspended in PBS. Flow cytometry was performed on an ARIA SORP BD (Biosciences). To measure CFP emission fluorescence and FRET, cells were excited with a 405 nm laser. The fluorescence was captured with either a 466/40 or a 529/30 nm filter, respectively. To measure YFP fluorescence, a 488 nm laser was used for excitation and emission fluorescence was captured with a 529/30 nm filter. mCherry cells were excited with a 561 nm laser and fluorescence was captured with a 610/20 nm filter. To selectively detect and quantify FRET, gating was used as described[32, 53]. 3 independent experiments were done in triplicate or quadruplicate, with at least 10,000 cells per replicate analyzed.

Statistical Analysis

Experiments were performed at least in triplicate and obtained from three independent experiments. Statistical analyses were performed using the Mann-Whitney U-Test to determine the p-value.

Results

Inhibition of In Vitro Tau Aggregation

Figures 3A, 3B:
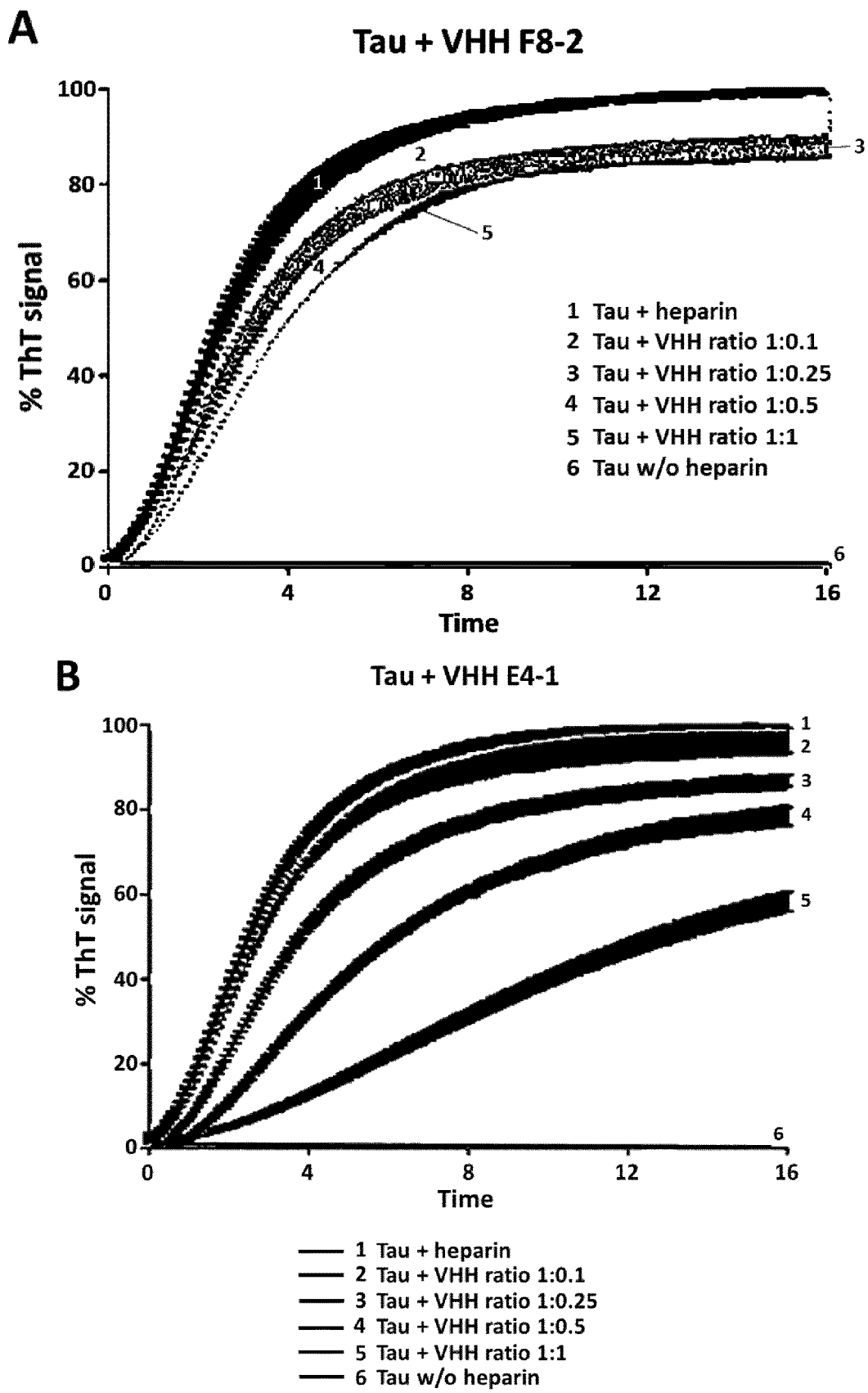
Figure 3C:
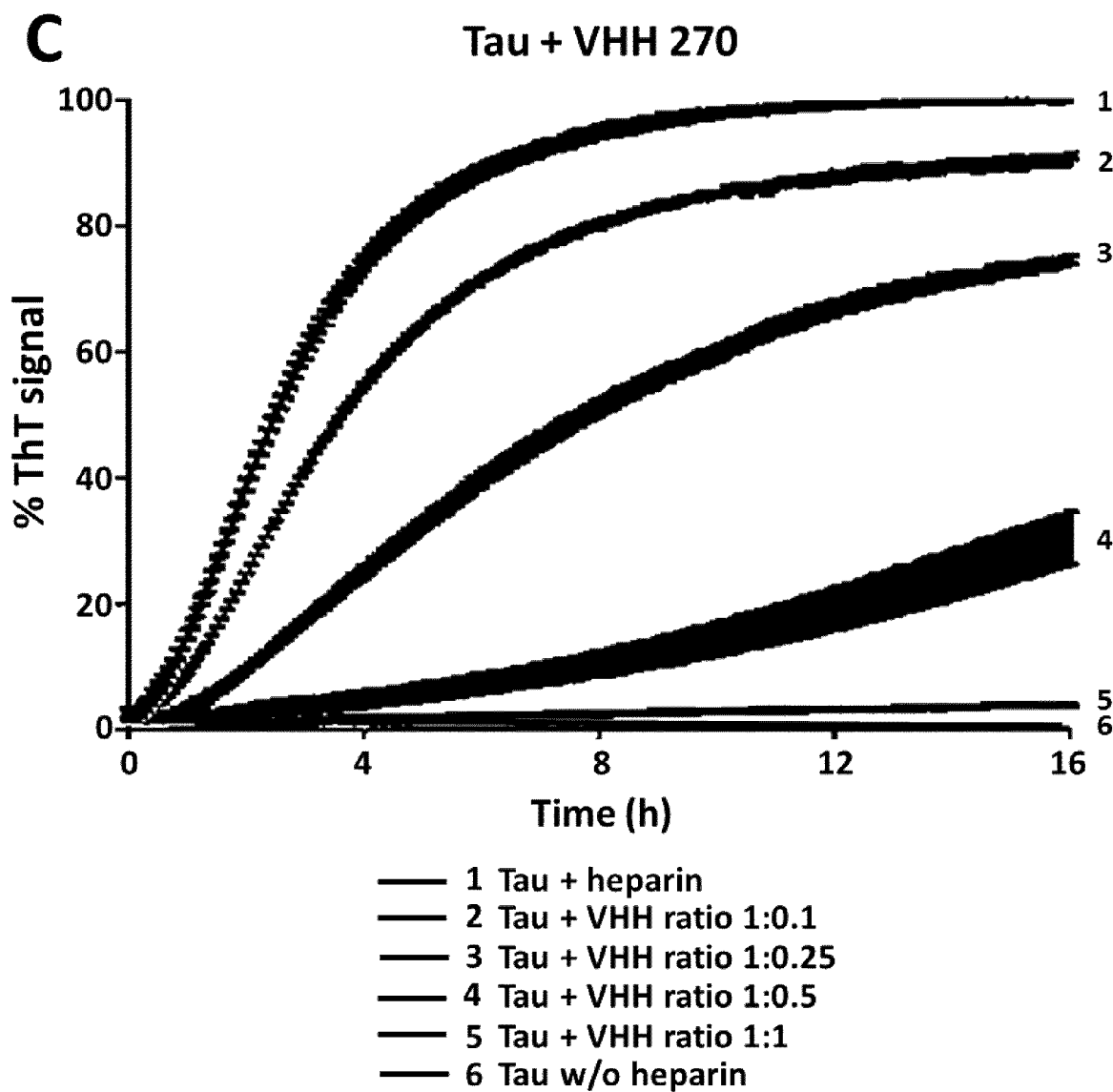

VHHs E4-1 and VHH Z70 recognizing Tau peptide PHF6, known to nucleate the aggregation and to form the core of Tau fibers, were assayed for their capacity to interfere with Tau in vitro aggregation. The assays were carried out with Tau recombinant protein in the presence of heparin, using thioflavin T as a dye whose fluorescence is increased in presence of aggregates (FIG. 3). Negative and positive controls consisted in Tau without or with heparin, respectively. An additional control was performed in the presence of VHH F8-2, a VHH issued from the initial phage-library screen, which targeted Tau C-terminal domain. At 10 μM of Tau, the observed amount of aggregates was maximal (defined as 100%) for the positive control after 8 h of incubation at 37° C., while no fluorescence change was detected for the negative control (FIG. 3A-C). At equimolar concentration of Tau:VHH F8-2, the fluorescence signal reached 91.2% (±3.8%, standard deviation), showing that VHH F8-2 did not affect the aggregation of Tau (FIG. 3A). In contrast, at a molar ratio of 1:0.25 Tau:VHH E4-1, the maximal fluorescence signal reached 86.9% (±2.4%). Additionally, about 3.8 h were needed to gain 50% of maximal signal, compare to 2.5 h for the positive control, showing a slower aggregation kinetic in the presence of VHH E4-1 (FIG. 3B). At a 1:1 Tau:VHH E4-1 molar ratio, the fluorescence signal only reached 58.3% (±3.9%) and more than 12.8 h were necessary to gain 50% of maximal signal (FIG. 3B). VHH Z70 had an even stronger inhibition effect on the aggregation of Tau than the lead VHH E4-1. At a 1:1 Tau:VHH Z70 molar ratio, the maximal fluorescence signal barely reached above the negative control level, at 4.1% (±0.1%) (FIG. 3C). The link between the thioflavin T fluorescence measurements in our assays and the formation of Tau aggregates at the end point of each aggregation assay was confirmed by Transmission Electron Microscopy (TEM) imaging that allowed direct visualization of typical Tau fibers, whether present (data not shown). Large amounts of fibrils were observed for Tau in the presence of heparin only or in the additional presence of VHH F8-2, but shorter filaments with VHH E4-1 and practically none with VHH Z70. In conclusion, lead VHH E4-1 and its optimized variant VHH Z70 had both the capacity to inhibit the aggregation of Tau in vitro and their relative activity is related to their affinity for Tau.

Inhibition of In Vitro Tau Aggregation by Optimized VHH Z70 Mutants

VHH Z70 and the derived mutants recognizing Tau peptide PHF6, known to nucleate the aggregation and to form the core of Tau fibers, were assayed for their capacity to interfere with Tau in vitro aggregation. The assays were carried out with Tau recombinant protein in the presence of heparin, using thioflavin T as a dye whose fluorescence is increased in presence of aggregates (FIG. 3). Negative and positive controls consisted in Tau without or with heparin, respectively. Using 10 μM of Tau, the observed amount of aggregates was maximal (defined as 100%) for the positive control after 18 h of incubation at 37° C., while no fluorescence change was detected for the negative control.

Mut3, Mut5, Mut14 and Mut20 displayed inhibition ability similar to that of VHH Z70 while Mut1 and Mut12 displayed an even better inhibition of Tau aggregation in this assay. Mut1 and Mut12 are able to significantly inhibit Tau aggregation using a ratio of 0.2 VHH to 1 Tau (FIG. 4).

In conclusion, VHH Z70 and the tested derived mutants had the capacity to inhibit the aggregation of Tau in vitro using low ratio of VHH/Tau (FIG. 4).

Figures 5A, 5B:
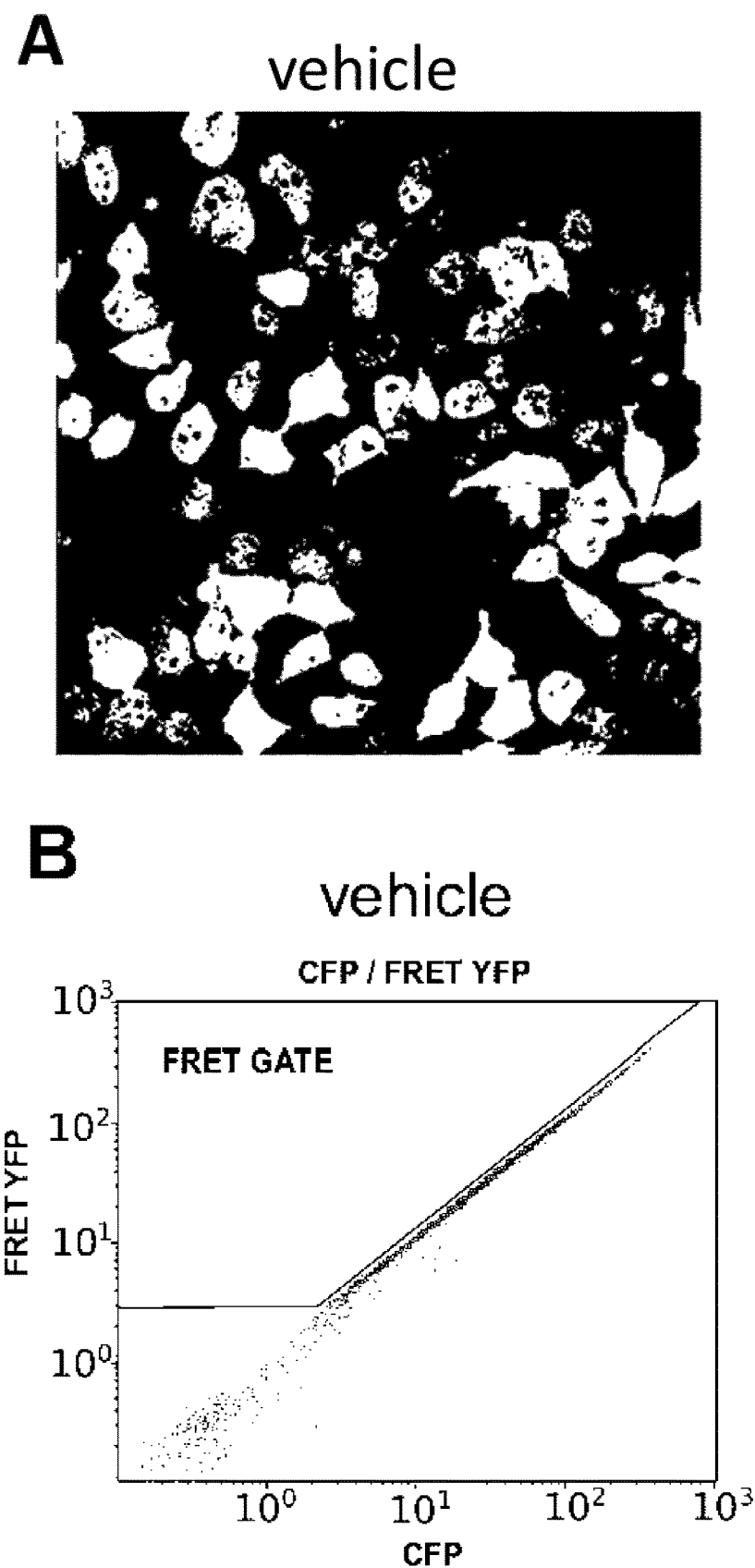
Figure 5C:
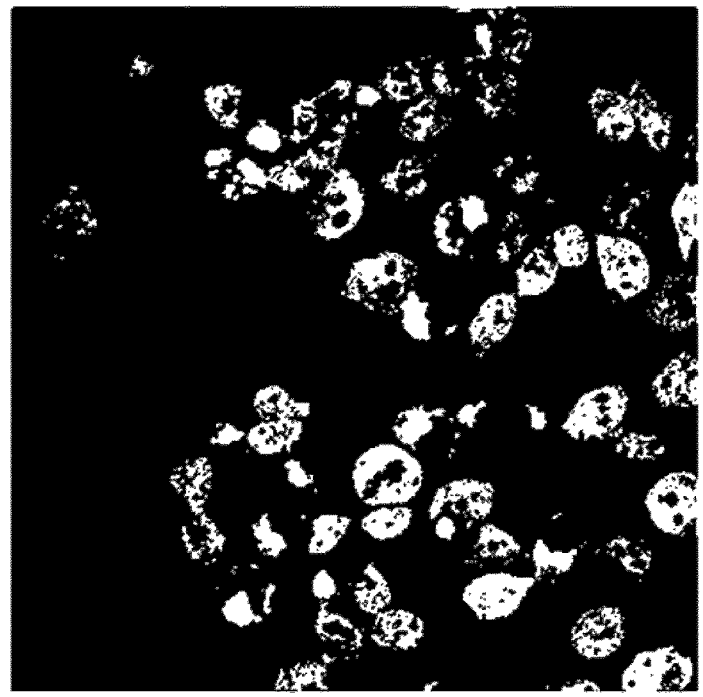
Figure 5D:
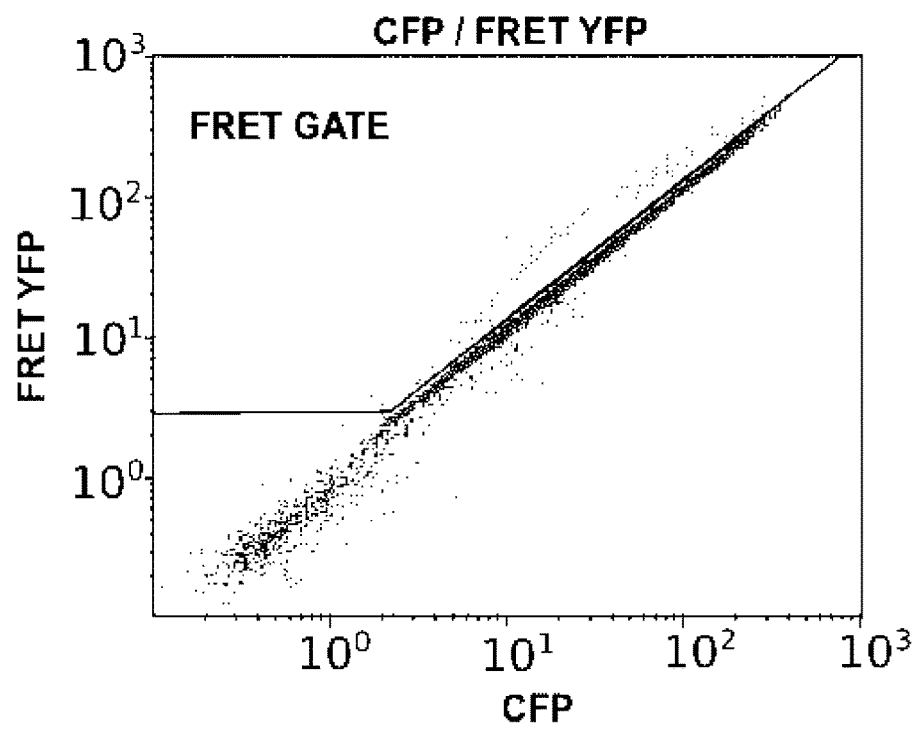
Figure 5E:
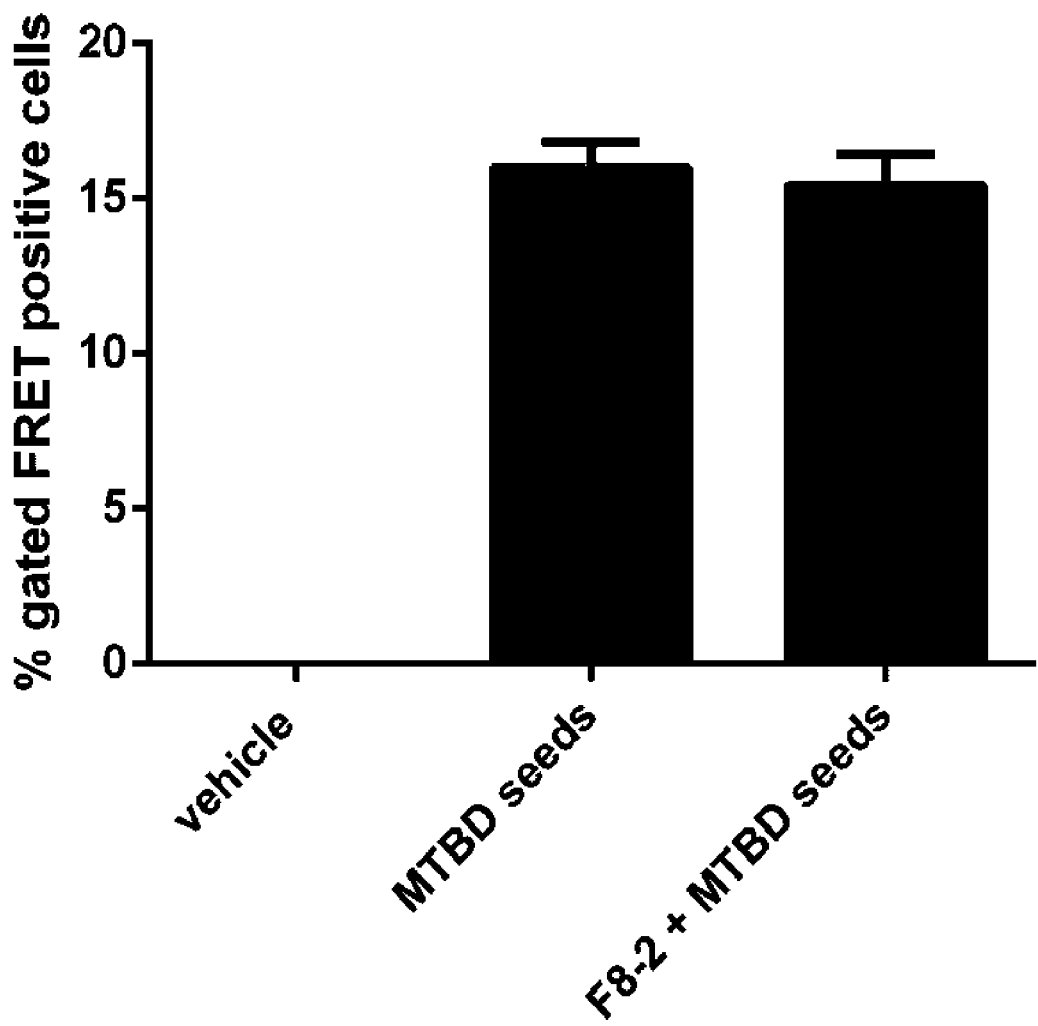
Figure 5F:
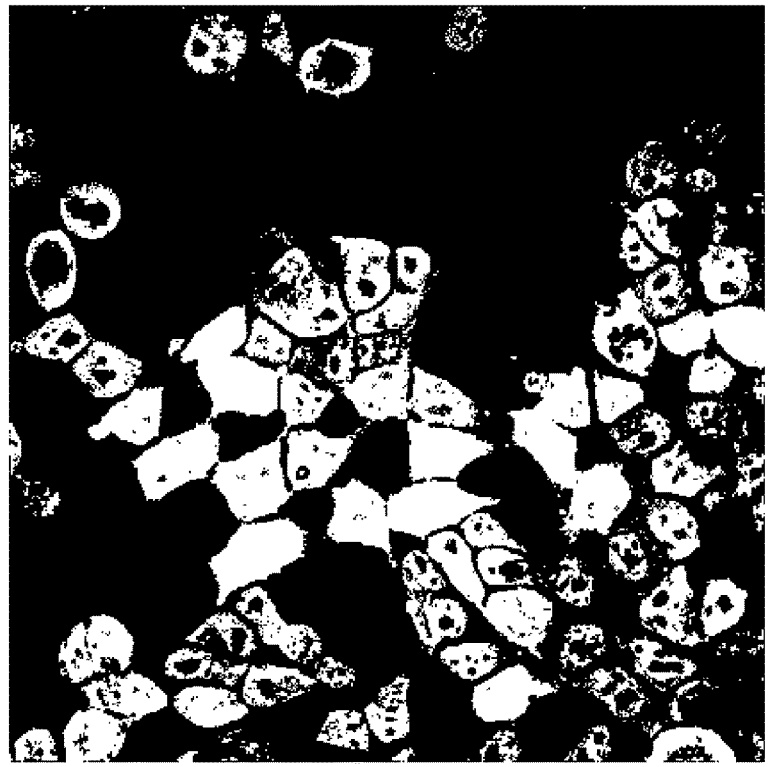
Figure 5G:
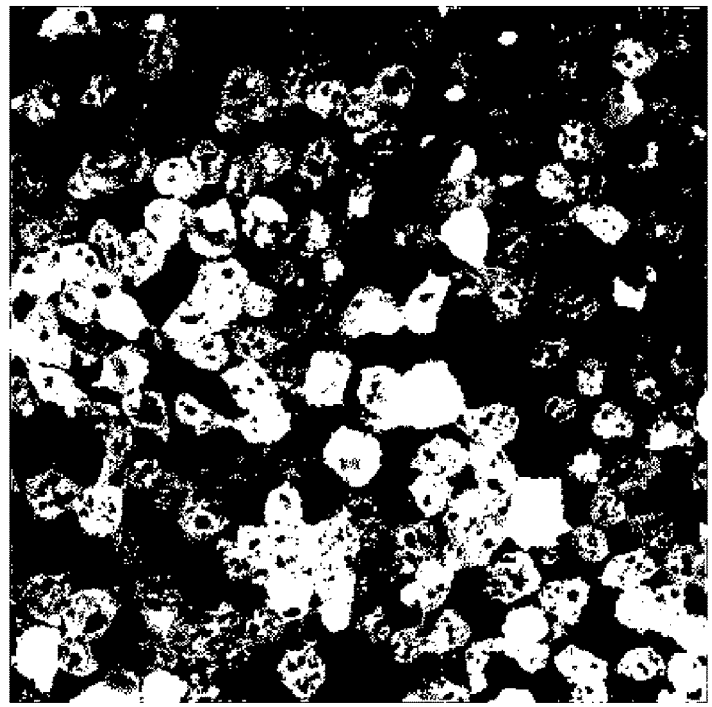
Figure 5H:
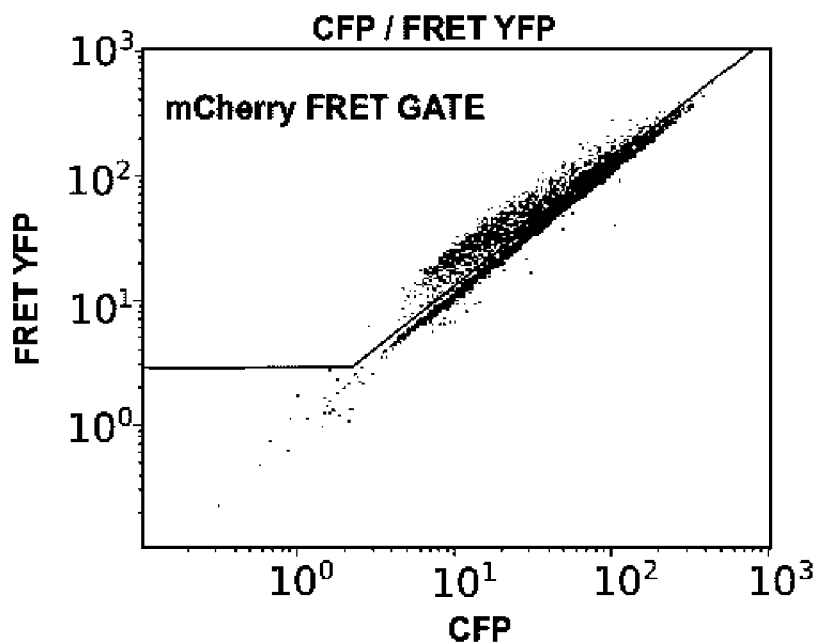
Figure 5I:
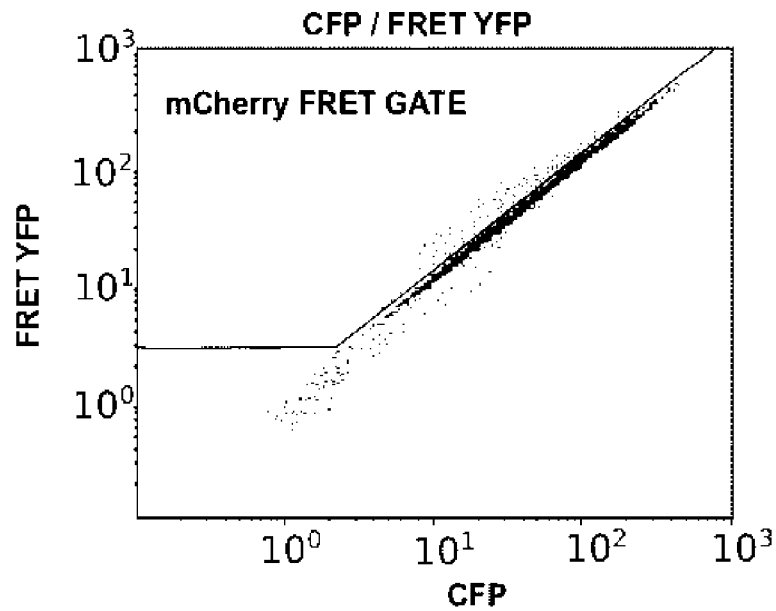
Figure 5J:
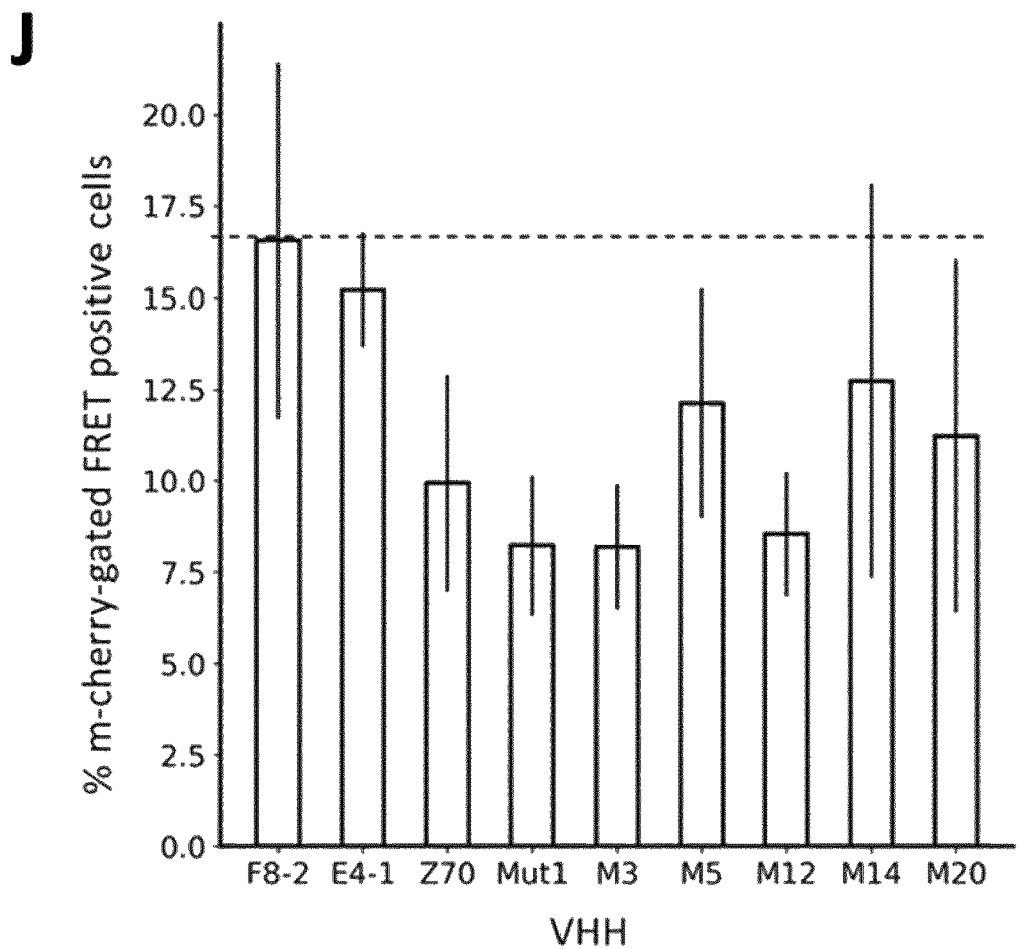

Inhibition of Tau Seeding in HEK293 Tau Repeat Domain (RD) P301S FRET Biosensor Aggregation Reporter Cells The capacity of VHH E4-1 and VHH Z70 to block the intracellular aggregation in the HEK293 Tau RD P301S FRET Biosensor reporter cell line model was next investigated. This cell line constitutively expresses Tau RD (MTBD), with a P301S mutation, fused to either CFP (Cyan Fluorescent Protein) or YFP (Yellow Fluorescent Protein) that together generate a FRET (Forster Resonance Energy Transfer) signal upon MTBD-P301S aggregation[32]. For cells treated with HEPES buffer only, FRET signal is detected neither by confocal microscopy nor by flow cytometry (FIG. 5A-B). The intracellular aggregation of MTBD-P301S protein is induced by treating the cells with Tau seeds, the MTBD fragment in vitro aggregated in HEPES buffer with heparin associated to liposomes to help cell penetration[32], leading to a FRET signal (yellow fluorescence by confocal and 16%±0.8% FRET gated positive cells, FIG. 5C-E). In addition, mCherry-VHH F8-2 was transfected and served as negative control since its binding is outside the MTBD. Similarly to the previous experiment in the absence of any VHH, 15.4% (±1% s.e.m) FRET-gated positive cells were visualized after Tau seeding (FIG. 5E-H), providing a reference for 100% seeding. To evaluate the efficiency of VHHs E4-1 and Z70 to inhibit aggregation in this model, plasmids that expressed each VHH fused to mCherry protein were transfected one day prior to addition of the Tau seeds. With a mCherry gate to detect FRET signal selectively in mCherry-VHH positive cells, the percentage of FRET positive cells transfected by mCherry VHHs E4-1 and Z70 were compared to the cells transfected by mCherry VHH F8-2, which did not affect the seeding in cells (FIG. 5E). The FRET signal reduction for mCherry-VHH E4-1 positive cells was not significant, with a percentage of FRET positive cells decreasing to 15.2±1.6%, compare to 16.5±4.8% FRET signal for mCherry-VHH F8-2 negative control (7.8% seeding inhibition, FIG. 5H-J). Conversely, mCherry-VHH Z70 clearly affected the intracellular aggregation of MTBD-P301S, as the observed FRET signal for the corresponding transfected cells was significantly decreased to 9.9±2.9% (40% seeding inhibition, FIG. 5H-J).

mCherry-VHH Mut1, Mut3 and Mut12 affected the intracellular aggregation of MTBD-P301S similarly to VHHZ70, as the observed FRET signals for the corresponding transfected cells were significantly ($p<0.001$) decreased to 8.2 (±1.9, standard deviation), 8.2±1.7, 8.5±1.6 (50,50,48% seeding inhibition, FIGS. 4H, 4I and 4J). mCherry-VHH Mut5, Mut14 and Mut20 inhibited the intracellular aggregation of MTBD-P301S but were less efficient compare to VHH Z70, as the observed FRET signals for the corresponding transfected cells were decreased to 12.1±3.1, 12.7±5.4 and 11.2±4.8 (27,23,32% seeding inhibition, FIG. 5H-J).

From all that measurements, we concluded that the amount of intracellular aggregates of MTBDP301S Tau was reduced by more than 40% in the presence of the mCherry-VHH Z70, showing the efficiency of VHH Z70 to block Tau seeding in this cellular model. Similarly, the mutated VHH Z70 (VHH Mut) showed a range of inhibition efficiency in the same cellular model, ranging from about 25% inhibition to 50% inhibition, depending on the specific mutation(s) of VHH Z70 (FIG. 5J). The poorer seeding inhibition capacity of VHH-E4-1 is likely due to its poor intracellular activity compared to VHH Z70 (FIG. 2).

EXAMPLE 4: ACTIVITY OF VHH Z70 IN THYTAU30 MOUSE MODEL

Materiel and Methods 3-month-old Tg30tau mice, expressing human 1N4RTau transgene mutated as P301SG272V under the control of Thy1.2 promoter[55], were injected in hippocampus of both hemispheres with lentiviral vectors expressing VHH Z70 or a VHH directed against the green fluorescent protein. 2 weeks later, these mice were submitted to stereotaxic injections of AD human brain homogenate (2 µl, 5.5 µg/µl) or PBS (2 µl) in the hippocampus CA1 region of both hemispheres, as previously described in detail[56]. The combination resulted in four groups of 3 mice per group. The mice were sacrificed after a month delay from the injection of the brain extract. Brains were collected, fixed and sliced. Cryostat section slices were next used for immunohistochemistry. Brain slices were incubated with the primary antibody AT8. Labelling was amplified by incubation with an anti-mouse biotinylated IgG (1:400 in PBS-0.2% Triton™ X-100, Vector) followed by the application of the avidin-biotin-HRP complexe (ABC kit, 1:400 in PBS, Vector) prior to addition of diaminobenzidine tetrahydrochloride (DAB, Vector) in Tris-HCl 0.1 mol/l, pH 7.6, containing H2O2 for visualization. Mounted brain sections were analysed using stereology software (Mercator image analysis system; Explora Nova, La Rochelle, France). The CA1 region of the hippocampus was chosen as quantification zone, at 5 specific bregma locations situated between between 1.7 and 3.7 to remain at close distance to the stereotaxic injection site. The 5 selected locations were conserved for all mice to ensure accurate comparison of the four groups. The quantification was performed for these 5 slides per mouse, at a specific threshold presenting a minimum background. The quantification corresponds to the sum of the detected signal in the 5 slices.

Results

The model consisting of the injection of AD brain-derived material into the hippocampus of Tg30tau mice was previously described[56] and shown to induce development of tauopathy (FIG. 6; GREN+AD circle). At 3-month old age, corresponding to the time of injection, background tau pathology is already present although to a lesser extent compare to injection with seeds (FIG. 6; GREN+PBS triangle). The appearance of tau pathology was evaluated 1 month post-injection by immunohistochemistry with the monoclonal AT8 antibody. For the immunization studies, VHH Z70 and control VHH directed against GFP (not present in mouse brains) were used.

In h-AD injected Tg30tau mice treated with VHH Z70, the AT8 detected in the CA1 fields was on average lower compare to Tg30tau mice treated with the negative-control VHH directed against GFP. The decrease in the average AT8 labeling detected in the CA1 fields in 4.5 month of age also showed the positive effect of VHH Z70 on decreasing the background pathology detected at this age (FIG. 6). These results suggested that immunization with VHH Z70 prevented the formation of neurofibrillary tangles induced by injection of extracellular h-AD or spontaneously developing in Tg30Tau.

TABLE 5

Useful amino acid sequences for practicing the invention

| SEQ ID NO | amino acid sequence |
|---|---|
| 1 (Tau epitope) | SVQIVYKPV |
| 2: VH of Z70 antibody | MAEVQLQASGGVFVQSGGSLRLSCAASGATSTFDGMGWFRQAPGKEREFVSAISYEQGSYTYYADSVKGRFTISRDNSKNMVYLQMNSLRAEDTATYYCAPAYEGDLYAFDSYGGQGTQVTVSS |
| 3: VH-CDR1 of Z70 | ATSTFDG |
| 4: VH-CDR2 of Z70 | YEQGSYT |
| 5: VH-CDR3 of Z70 | PAYEGDLYAFDS |
| 6: VH FR1 of Z70 | MAEVQLQASGGVFVQSGGSLRLSCAASG |
| 7: VH-FR2 of Z70 | MGWFRQAPGKEREFVSAIS |
| 8: VH-FR3 of Z70 | YYADSVKGRFTISRDNSKNMVYLQMNSLRAEDTATYYCA |
| 9: VH-FR4 of Z70 | YGGQGTQVTVSS |
| 10: VH Mut1 | MAEVQLQASGGVFVQSGGSLRLSCAASGATSTFDGMGWFRQAPGKEREFVSAISYEQGSYTYYADSVKGRFTISRDNSKNMVYLQMNSLRAEDTATYYCAPAYEGDLYAFDSYGEQGTQVTVSS |
| 11: VH Mut3 | MAEVQLQASGGVFVQSGGSLRLSCAASGATSTFDGMGWFRQAPGKEKEFVSAISYEQGSYTYYADSVKGRFTISRDNSKNMVYLQMNSLRAEDTATYYCAPAYEGDLYAFDSYGGQGTQVTVSS |
| 12: VH Mut5 | MAEVQLQASGGVFVQSGGSLRLSCAASGATSTFDGMGWFRQAPGKEREFVSAISYEQGSYTYYADSVKGRFTISRDNSKNMVYLQMNSLRAEDTASYYCAPAYEGDLYAFDSYGGQGTQVTVSS |
| 13: VH Mut9 | MAEVQLQASGGVFVQSGGSLRLSCAASGATSTFDGMGWFRQAPGKEREFVSAISYEQGSYTYYADSVKGRFTISRDNSKNMVYLQMNSLRAEDTATYYCASAYEGDLYAFDSYGEQGTQVTVSS |
| 14: VH Mut12 | MAEVQLQASGGVFVQSGGSLRLCCAASGATSTFDGMGWFRQAPGKEREFVSAISYEQGSYTYYADSVKGRFTISRDNSKNMVYLQMNSLRAEDTATYYCAPAYEGDLYAFDSYGEQGTQVTVSS |
| 15: VH Mut14 | MAEVQLQASGGVFVQSGGSLRLSCAASGATSIFDGMGWFRQAPGKEREFVSAISYGQGSYTYYADSVKGRFTISRDNSKNMVYLQMNSLRAEDTATYYCAPAYEGDLYAFDSYGEQGTQVTVSS |
| 16: VH Mut15 | MAEVQLQASGGVFVQSGGSLRLSCAASGATSTFDGMGWFRQAPGKEREFVSAISYEQGSYTYYADSVKGRFTISRDNSKNMVYLQMNSLGAEDTATYYCASAYEGDLYAFDSYGEQGTQVTVSS |
| 17: VH Mut20 | MAEVQLQASGGVFVQSGGSLRLSCAASGATSTFDGMGWFRQAPGKEKEFVSAISYEQGSYTYYADSVKGRFTISRDNSKNMVYLQMNSLRAEDTATYYCAPAYEGDLYAFDSYGEQGTQVTVSS |
| 18: Tau [273-318] | GKVQIINKKLDLSNVQSKCGSKDNIKHVPGGGSVQIVYKPVDLSKV |
| 19: PHF6 peptide | VQIVYK |
| 20: VH of Abx | M-A-E-V-Q-L-Q-A-S-G-G-V-F-V-Q-S-G-G-S-L-R-L-Xaa1-C-A-A-S-G-A-T-S-Xaa2-F-D-G M-G-W-F-R-Q-A-P-G-K-E-Xaa3-E-F-V-S-A-I-S-Y-Xaa4-Q-G-S-Y-T-Y-Y-A-D-S-V-K-G-R-F-T-I-S-R-D-N-S-K-N-M-V-Y-L-Q-M-N-S-L-Xaa5-A-E-D-T-A--Xaa6-Y-Y-C-A-Xaa7-A-Y-E-G-D-L-Y-A-F-D-S-Y-Xaa8-Xaa9-Q-G-T-Q-V-T-V-S-S- |

TABLE 5-continued

Useful amino acid sequences for practicing the invention

| SEQ ID NO | amino acid sequence |
| --- | --- |
| 21: VH FR1 of Abx | M-A-E-V-Q-L-Q-A-S-G-G-V-F-V-Q-S-G-G-S-L-R-L-Xaa1-C-A-A-S-G |
| 22: VH CDR1 of Abx | A-T-S-Xaa2-F-D-G |
| 23: VH FR2 of Abx | M-G-W-F-R-Q-A-P-G-K-E-Xaa3-E-F-V-S-A-I-S |
| 24: VH CDR2 of Abx | Y-Xaa4-Q-G-S-Y-T |
| 25: VH FR3 of Abx | Y-Y-A-D-S-V-K-G-R-F-T-I-S-R-D-N-S-K-N-M-V-Y-L-Q-M-N-S-L-Xaa5-A-E-D-T-A-Xaa6-Y-Y-C-A |
| 26: VH CDR3 of Abx | Xaa7-A-Y-E-G-D-L-Y-A-F-D-S |
| 27: VH FR4 of Abx | Y-Xaa8-Xaa9-Q-G-T-Q-V-T-V-S-S- |
| 28: VH of E4-1 antibody (FIG. 2B) | MAEVQLQASGGGFVQPGGSLRLSCAASGATSTFDG MGWFRQAPGKEREFVSAISYEQGSYTYYADSVKGR FTISRDNSKNTVYLQMNSLRAEDTATYYCAPAYEG DLYAFDSYWGQGTQVTVSSAA |
| 29: Minibody Z70 | MYRMQLLSCIALSLALVTNSISAMAEVQLQASGGV FVQSGGSLRLSCAASGATSTFDGMGWFRQAPGKER EFVSAISYEQGSYTYYADSVKGRFTISRDNSKNMVY LQMNSLRAEDTATYYCAPAYEGDLYAFDSYGGQG TQVTVSSAAARSPPLKECPPCAAPDLLGGPSVFIFPP KIKDVLMISLSPMVTCVVVDVSEDDPDVQISWFVN NVEVHTAQTQTHREDYNSTLRVVSALPIQHQDWM SGKEFKCKVNNRALPSPIEKTISKPRGPVRAPQVYV LPPPAEEMTKKEFSLTCMITGFLPAEIAVDWTSNGR TEQNYKNTATVLDSDGSYFMYSKLRVQKSTWE RGSLFACSVVHEGLHNHLTTKTISRSLGK |
| 30: VH of Z70 antibody (FIG. 2B) | MAEVQLQASGGVFVQSGGSLRLSCAASGATSTFDG MGWFRQAPGKEREFVSAISYEQGSYTYYADSVKGR FTISRDNSKNMVYLQMNSLRAEDTATYYCAPAYEG DLYAFDSYGGQGTQVTVSSAA |

TABLE 6 nucleotide sequences for practicing the invention

| SEQ ID NO | nucleotide sequence |
| --- | --- |
| 31: VH of Z70 antibody | atggcggaagtgcagctgcaggcttccgggggagtatttgtgcagtcggggg gtcattgcgactgagctgcgccgcatccggagcaacttcaacatttgacggtatg ggctggtttcgtcaggcccctggcaaggagagagagttcgtttccgccatctccta cgaacaagggtcgtatacatactacgctgacagcgtaaagggaagatttacaatt agccgggataactccaaaaacatggtctatctccagatgaacagcctcagggcc gaggacacagctacgtattactgtgcacctgcatatgagggtgacctgtatgcattt gactcgtacgggggacaggggacgcaggtaactgtgagtagc |
| 32: plasmid sequence with Z70 minibody | cgaaggatctgcgatcgctccggtgcccgtcagtgggcagagcgcacatcgcc cacagtccccgagaagttgggggggaggggtcggcaattgaacgggtgcctaga gaaggtggcgcggggtaaactgggaaagtgatgtcgtgtactggctccgcc tcccgagggtgggggagaaccgtatataagtgcagtagtcgccgtgaacgttctt tttcgcaacgggtttgccgccagaacacagctgaagcttcgaggggctcgcatct ctccttcacgcgcccgccgcccacctgaggccgccatccacgccggttgagtc gcgttctgccgcctcccgcctgtggtgcctcctgaactgcgtccgccgtctaggta agtttaaagctcaggtcgagaccgggcctttgtccggcgctcccttggagcctac ctagactcagccggctctccacgctttgcctgaccctgcttgctcaactctacgtctt tgtttcgttttctgttctgcgccgttacagatccaagctgtgaccggcgcctacctga gatcaccggcgaaggagggccaccatgtacaggatgcaactcctgtcttgcattg cactaagtcttgcacttgtcacgaattcgatatcggccatggcggaagtgcagctg caggcttccgggggagtatttgtgcagtcggggggtcattgcgactgagctgc gccgcatccggagcaacttcaacatttgacggtatgggctggtttcgtcaggcc ctggcaaggagagagagtcgtttccgccatctcctacgaacaagggtcgtatac atactacgctgacagcgtaaagggaagatttacaattagccgggataactccaaa aacatggtctatctccagatgaacagcctcagggccgaggacacagctacgtatt actgtgcacctgcatatgagggtgacctgtatgcatttgactcgtacgggggaca ggggacgcaggtaactgtgagtagcgcggccgctagatctcctccactcaaaga gtgtcccccatgcgcagctccagacctcttgggtggaccatccgtcttcatcttccc |

TABLE 6-continued nucleotide sequences for practicing the invention

| SEQ ID NO | nucleotide sequence |
|---|---|
| | tccaaagatcaaggatgtactcatgatctccctgagccctatggtcacatgtgtggt<br>ggtggatgtgagcgaggatgacccagacgtccagatcagctggtttgtgaacaa<br>cgtggaagtacacacagctcagacacaaacccatagagaggattacaacagtac<br>tctccgggtggtcagtgccctccccatccagcaccaggactggatgagtggcaa<br>ggagttcaaatgcaaggtcaacaacagagccctcccatcccccatcgagaaaac<br>catctcaaaacccagagggccagtaagagctccacaggtatatgtcttgcctcca<br>ccagcagaagagatgactaagaaagagttcagtctgacctgcatgatcacaggc<br>ttcttacctgccgaaattgctgtggactggaccagcaatgggcgtacagagcaaa<br>actacaagaacaccgcaacagtcctggactctgatggttcttacttcatgtacagc<br>aagctcagagtacaaaagagcacttgggaaagaggaagtcttttcgcctgctcag<br>tggtccacgagggtctgcacaatcaccttacgactaagaccatctcccggtctctg<br>ggtaaatgagctagctggccagacatgataagatacattgatgagtttggacaaa<br>ccacaactagaatgcagtgaaaaaaatgctttatttgtgaaatttgtgatgctattgct<br>ttatttgtaaccattataagctgcaataaacaagttaacaacaacaattgcattcatttt<br>atgtttcaggttcaggggggaggtgtgggaggttttttaaagcaagtaaaacctctac<br>aaatgtggtatggaattaattctaaaatacagcatagcaaaactttaacctccaaatc<br>aagcctctacttgaatccttttctgagggatgaataaggcataggcatcaggggct<br>gttgccaatgtgcattagctgtttgcagcctcaccttctttcatggagtttaagatata<br>gtgtattttcccaaggtttgaactagctcttcatttctttatgttttaaatgcactgacct<br>cccacattcccttttagtaaaatattcagaaataatttaaatacatcattgcaatgaa<br>aataaatgttttttattaggcagaatccagatgctcaaggccttcataatatcccc<br>agtttagtagttggacttagggaacaaaggaaccttaatagaaattggacagcaa<br>gaaagcgagcttctagcttatcctcagtcctgctcctctgccacaaagtgcacgca<br>gttgccggccgggtcgcgcagggcgaactcccgccccccacggctgctcgccg<br>atctcggtcatggccggcccggaggcgtcccggaagttcgtggacacgacctcc<br>gaccactcggcgtacagctcgtccaggccgcgcacccacacccaggccaggg<br>tgttgtccggcaccacctggtcctggaccgcgctgatgaacagggtcacgtcgtc<br>ccggaccacaccggcgaagtcgtcctccacgaagtcccgggagaacccgagc<br>cggtcggtccagaactcgaccgctccggcgacgtcgcgcgcggtgagcaccg<br>gaacggcactggtcaacttggccatgatggctcctcctgtcaggagaggaaaga<br>gaagaaggttagtacaattgctatagtgagttgtattatactatgcagatatactatg<br>ccaatgattaattgtcaaactagggctgcagggttcatagtgccacttttcctgcact<br>gccccatctcctgcccacccttccaggcatagacagtcagtgacttaccaaact<br>cacaggagggagaaggcagaagcttgagacagacccgcgggaccgccgaac<br>tgcgaggggacgtggctagggcggcttcttttatggtgcgccggccctcggagg<br>cagggcgctcggggaggcctagcggccaatctgcggtggcaggaggcgggg<br>ccgaaggccgtgcctgaccaatccggagcacataggagtctcagcccccgcc<br>ccaaagcaagggaagtcacgcgcctgtagcgccagcgtgttgtgaaatgggg<br>gcttgggggggttggggccctgactagtcaaaacaaactcccattgacgtcaatg<br>gggtggagacttggaaatccccgtgagtcaaaccgctatccacgccattgatgt<br>actgccaaaaccgcatcatcatggtaatagcgatgactaatacgtagatgtactgc<br>caagtaggaaagtcccataaggtcatgtactgggcataatgccaggcgggccatt<br>taccgtcattgacgtcaataggggggcgtacttggcatatgatacacttgatgtactg<br>ccaagtgggcagtttaccgtaaatactccacccattgacgtcaatggaaagtccct<br>attggcgttactatgggaacatacgtcattattgacgtcaatgggcggggtcgtt<br>gggcggtcagccaggcgggccatttaccgtaagttatgtaacgcctgcaggttaa<br>ttaagaacatgtgagcaaaaggccagcaaaaggccaggaaccgtaaaaaggcc<br>gcgttgctggcgtttttccataggctccgcccccctgacgagcatcacaaaaatcg<br>acgctcaagtcagaggtggcgaaacccgacaggactataaagataccaggcgtt<br>tccccctggaagctccctcgtgcgctctcctgttccgaccctgccgcttaccggat<br>acctgtccgcctttctcccttcgggaagcgtggcgctttctcatagctcacgctgta<br>ggtatctcagttcggtgtaggtcgttcgctccaagctgggctgtgtgcacgaaccc<br>cccgttcagcccgaccgctgcgccttatccggtaactatcgtcttgagtccaaccc<br>ggtaagacacgacttatcgccactggcagcagccactggtaacaggattagcag<br>agcgaggtatgtaggcggtgctacagagttcttgaagtggtggcctaactacggc<br>tacactagaagaacagtatttggtatctgcgctctgctgaagccagttaccttcgga<br>aaaagagttggtagctcttgatccggcaaacaaaccaccgctggtagcggtggtt<br>tttttgtttgcaagcagcagattacgcgcagaaaaaaaggatctcaagaagatcctt<br>tgatcttttctacggggtctgacgctcagtggaacgaaaactcacgttaagggattt<br>tggtcatggctagttaattaacatttaaatcagcggccggccgcaataaaatatcttt<br>attttcattacatctgtgtgttggttttttgtgtgaatcgtaactaacatacgctctccat<br>caaaacaaaacgaaacaaaacaaactagcaaaataggctgtccccagtgcaagt<br>gcaggtgccagaacatttctctat |

REFERENCES

Throughout this application, various references describe the state of the art to which this invention pertains. The disclosures of these references are hereby incorporated by reference into the present disclosure.

1. Goedert, M. & Spillantini, M. G. A century of Alzheimer's disease. Science 314, 777-781 (2006).
2. Cummings, J., Lee, G., Mortsdorf, T., Ritter, A. & Zhong, K. Alzheimer's disease drug development pipeline: 2017. Alzheimers Dement. Transl. Res. Clin. Interv. 3, 367-384 (2017).
3. Nelson, P. T. et al. Correlation of Alzheimer Disease Neuropathologic Changes With Cognitive Status: A Review of the Literature. J. Neuropathol. Exp. Neurol. 71, 362-381 (2012).

4. Schwarz, A. J. et al. Regional profiles of the candidate Tau PET ligand 18F-AV-1451 recapitulate key features of Braak histopathological stages. Brain J. Neurol. 139, 1539-1550 (2016).
5. Wilcock, G. K. & Esiri, M. M. Plaques, tangles and dementia. A quantitative study. J. Neurol. Sci. 56, 343-356 (1982).
6. von Bergen, M. et al. Assembly of Tau protein into Alzheimer paired helical filaments depends on a local sequence motif ((306)VQIVYK(311)) forming beta structure. Proc. Natl. Acad. Sci. U.S.A 97, 5129-5134 (2000).
7. Seidler, P. M. et al. Structure-based inhibitors of Tau aggregation. Nat. Chem. 10, 170-176 (2018).
8. Sawaya, M. R. et al. Atomic structures of amyloid cross-beta spines reveal varied steric zippers. Nature 447, 453-457 (2007).
9. Fitzpatrick, A. W. P. et al. Cryo-EM structures of Tau filaments from Alzheimer's disease. Nature (2017). doi: 10.1038/nature23002
10. Ghetti, B. et al. Invited review: Frontotemporal dementia caused by microtubule-associated protein Tau gene (MAPT) mutations: a chameleon for neuropathology and neuroimaging. Neuropathol. Appl. Neurobiol. 41, 24-46 (2015).
11. Despres, C. et al. Identification of the Tau phosphorylation pattern that drives its aggregation. Proc. Natl. Acad. Sci. U.S.A (2017). doi:10.1073/pnas.1708448114
12. Cohen, T. J. et al. The acetylation of Tau inhibits its function and promotes pathological Tau aggregation. Nat. Commun. 2, 252 (2011).
13. Derisbourg, M. et al. Role of the Tau N-terminal region in microtubule stabilization revealed by new endogenous truncated forms. Sci. Rep. 5, 9659 (2015).
14. Guillozet-Bongaarts, A. L. et al. Phosphorylation and cleavage of Tau in non-AD tauopathies. Acta Neuropathol. (Berl.) 113, 513-520 (2007).
15. Novak, M., Kabat, J. & Wischik, C. M. Molecular characterization of the minimal protease resistant tau unit of the Alzheimer's disease paired helical filament. EMBO J. 12, 365-370 (1993).
16. Clavaguera, F. et al. Transmission and spreading of tauopathy in transgenic mouse brain. Nat. Cell Biol. 11, 909-913 (2009).
17. Evans, L. D. et al. Extracellular Monomeric and Aggregated Tau Efficiently Enter Human Neurons through Overlapping but Distinct Pathways. Cell Rep. 22, 3612-3624 (2018).
18. Frost, B., Jacks, R. L. & Diamond, M. I. Propagation of Tau Misfolding from the Outside to the Inside of a Cell. J. Biol. Chem. 284, 12845-12852 (2009).
19. Sanders, D. W. et al. Distinct tau prion strains propagate in cells and mice and define different tauopathies. Neuron 82, 1271-1288 (2014).
20. Weingarten, M. D., Lockwood, A. H., Hwo, S. Y. & Kirschner, M. W. A protein factor essential for microtubule assembly. Proc. Natl. Acad. Sci. U.S.A 72, 1858-1862 (1975).
21. Hoover, B. R. et al. Tau mislocalization to dendritic spines mediates synaptic dysfunction independently of neurodegeneration. Neuron 68, 1067-1081 (2010).
22. Katsinelos, T. et al. Unconventional Secretion Mediates the Trans-cellular Spreading of Tau. Cell Rep. 23, 2039-2055 (2018).
23. Sultan, A. et al. Nuclear tau, a key player in neuronal DNA protection. J. Biol. Chem. 286, 4566-4575 (2011).
24. Wang, Y. et al. The release and trans-synaptic transmission of Tau via exosomes. Mol. Neurodegener. 12, 5 (2017).
25. Hamers-Casterman, C. et al. Naturally occurring antibodies devoid of light chains. Nature 363, 446-448 (1993).
26. Herce, H. D. et al. Cell-permeable nanobodies for targeted immunolabelling and antigen manipulation in living cells. Nat. Chem. 9, 762-771 (2017).
27. Li, T. et al. Cell-penetrating anti-GFAP VHH and corresponding fluorescent fusion protein VHHGFP spontaneously cross the blood-brain barrier and specifically recognize astrocytes: application to brain imaging. FASEB J. Off. Publ. Fed. Am. Soc. Exp. Biol. 26, 3969-3979 (2016).
28. Lippens, G. et al. Studying the natively unfolded neuronal Tau protein by solution NMR spectroscopy. Protein Pept. Lett. 13, 235-246 (2006).
29. Mukrasch, M. D. et al. Structural polymorphism of 441-residue tau at single residue resolution. PLoS Biol. 7, e34 (2009).
30. Tanaka, T. & Rabbitts, T. H. Intrabodies based on intracellular capture frameworks that bind the RAS protein with high affinity and impair oncogenic transformation. EMBO J. 22, 1025-1035 (2003).
31. Vielemeyer, O. et al. Characterization of single chain antibody targets through yeast two hybrid. BMC Biotechnol. 10, 59 (2010).
32. Holmes, B. B. et al. Proteopathic tau seeding predicts tauopathy in vivo. Proc. Natl. Acad. Sci. U.S.A 111, E4376-4385 (2014).
33. Asuni, A. A., Boutajangout, A., Quartermain, D. & Sigurdsson, E. M. Immunotherapy targeting pathological tau conformers in a tangle mouse model reduces brain pathology with associated functional improvements. J. Neurosci. Off. J. Soc. Neurosci. 27, 9115-9129 (2007).
34. Boutajangout, A., Quartermain, D. & Sigurdsson, E. M. Immunotherapy targeting pathological tau prevents cognitive decline in a new tangle mouse model. J. Neurosci. Off. J. Soc. Neurosci. 30, 16559-16566 (2010).
35. Troquier, L. et al. Targeting phospho-Ser422 by active Tau Immunotherapy in the THYTau22 mouse model: a suitable therapeutic approach. Curr. Alzheimer Res. 9, 397-405 (2012).
36. Dai, C.-L., Tung, Y. C., Liu, F., Gong, C.-X. & Iqbal, K. Tau passive immunization inhibits not only tau but also AP pathology. Alzheimers Res. Ther. 9, 1 (2017).
37. Congdon, E. E. & Sigurdsson, E. M. Tau-targeting therapies for Alzheimer disease. Nat. Rev. Neurol. (2018). doi:10.1038/s41582-018-0013-z
38. Pain, C., Dumont, J. & Dumoulin, M. Camelid single-domain antibody fragments: Uses and prospects to investigate protein misfolding and aggregation, and to treat diseases associated with these phenomena. Biochimie 111, 82-106 (2015).
39. Li, T. et al. Camelid single-domain antibodies: A versatile tool for in vivo imaging of extracellular and intracellular brain targets. J. Control. Release Off. J. Control. Release Soc. 243, 1-10 (2016).
40. Nobuhara, C. K. et al. Tau Antibody-Targeting Pathological Species Block Neuronal Uptake and Interneuron Propagation of Tau in Vitro. Am. J. Pathol. (2017). doi:10.1016/j.ajpath.2017.01.022
41. Spencer, B. et al. Selective targeting of 3 repeat Tau with brain penetrating single chain antibodies for the treatment of neurodegenerative disorders. Acta Neuropathol. (Berl.) 136, 69-87 (2018).

42. Mirbaha, H. et al. Inert and seed-competent tau monomers suggest structural origins of aggregation. eLife 7, (2018).
43. Mok, S.-A. et al. Mapping interactions with the chaperone network reveals factors that protect against tau aggregation. Nat. Struct. Mol. Biol. 25, 384-393 (2018).
44. Moutel, S. et al. NaLi-H1: A universal synthetic library of humanized nanobodies providing highly functional antibodies and intrabodies. eLife 5, (2016).
45. Matz, J. & Chames, P. Phage display and selections on purified antigens. Methods Mol. Biol. Clifton N.J. 907, 213-224 (2012).
46. Danis, C. et al. Nuclear Magnetic Resonance Spectroscopy for the Identification of Multiple Phosphorylations of Intrinsically Disordered Proteins. J. Vis. Exp. JoVE (2016). doi:10.3791/55001
47. Luna-Vargas, M. P. A. et al. Enabling high-throughput ligation-independent cloning and protein expression for the family of ubiquitin specific proteases. J. Struct. Biol. 175, 113-119 (2011).
48. Cadwell, R. C. & Joyce, G. F. Randomization of genes by PCR mutagenesis. PCR Methods Appl. 2, 28-33 (1992).
49. Bartel P. L & Sternglanz R. Cellular interactions in development: A practical approach. in Cellular interactions in development: A practical approach (ed. Hartley D. A) 153-179 (1993).
50. Vojtek, A. B. & Hollenberg, S. M. Ras-Raf interaction: two-hybrid analysis. Methods Enzymol. 255, 331-342 (1995).
51. Fromont-Racine, M., Rain, J. C. & Legrain, P. Toward a functional analysis of the yeast genome through exhaustive two-hybrid screens. Nat. Genet. 16, 277-282 (1997).
52. Karlsson, R., Katsamba, P. S., Nordin, H., Pol, E. & Myszka, D. G. Analyzing a kinetic titration series using affinity biosensors. Anal. Biochem. 349, 136-147 (2006).
53. Banning, C. et al. A flow cytometry-based FRET assay to identify and analyse protein-protein interactions in living cells. PloS One 5, e9344 (2010).
54. Zhang, Y., Chang, C., Gehling, D. J., Hemmati-Brivanlou, A. & Derynck, R. Regulation of Smad degradation and activity by Smurf2, an E3 ubiquitin ligase. Proc. Natl. Acad. Sci. U.S.A 98, 974-979 (2001).
55. Leroy, K., Bretteville, A., Schindowski, K., Gilissen, E., Authelet., M. De Decker, R., Yilmaz, Z., Buee, L. & Brion, J P. Early axonopathy preceding neurofibrillary tangles in mutant tau transgenic mice. Am J Pathol. 171(3):976-92 (2007).
56. Albert, M., Mairet-Coello, G., Danis, C., Lieger, S., Caillierez, R., Carrier, S., Skrobala, E., Landrieu, I., Michel, A., Schmitt, M., Citron, M., Downey, P., Courade, J P., Buee, L. & Colin, M. Prevention of tau seeding and propagation by immunotherapy with a central tau epitope antibody. Brain. 142(6):1736-1750 (2019).

The invention claimed is:

1. An isolated anti-Tau single domain antibody, wherein said isolated anti-Tau single domain antibody binds to an epitope consisting of residues SVQIVYKPV (SEQ ID NO: 1) of the Tau protein with a KD of 150 nM or less, 80 nM or less, or 50 nM or less, wherein the isolated anti-Tau single domain antibody comprises a single heavy chain variable region having at least 90% of identity with a sequence set forth as SEQ ID NO: 2, wherein said isolated anti-Tau single domain antibody has a heavy chain comprising i) a VH-CDR1 having 1 conservative substitutions within the VH-CDR1 of single domain antibody Z70 (SEQ ID NO: 3), ii) a VH-CDR2 having 1 conservative substitutions within the VH-CDR2 of single domain antibody Z70 (SEQ ID NO: 4) and iii) a VH-CDR3 having 1 conservative substitutions within the VH-CDR3 of single domain antibody Z70 (SEQ ID NO: 5).

2. The isolated anti-Tau single domain antibody according to claim 1, wherein said heavy chain (VH) variable region has an amino acid sequence as set forth as SEQ ID NO: 2.

3. The isolated anti-Tau single domain antibody according to claim 1 which is a humanized single domain antibody.

4. The isolated anti-Tau single domain antibody according to claim 1, wherein said isolated anti-Tau single domain antibody comprises a CDR1 having a sequence set forth as SEQ ID NO: 3, a CDR2 having a sequence set forth as SEQ ID NO:4 and a CDR3 having a sequence set forth as SEQ ID NO: 5.

5. The isolated anti-Tau single domain antibody according to claim 1, which comprises a heavy chain framework region sharing a homology or identity of 80% or more with a framework region having an amino acid sequence consisting of SEQ ID NOs: 8 to 11.

6. The isolated anti-Tau single domain antibody according to claim 1 wherein said isolated anti-Tau single domain antibody is able to reduce the level of pathological aggregation of Tau protein.

7. A pharmaceutical composition comprising the isolated anti-Tau single domain antibody according to claim 1.

* * * * *